US011079665B2

(12) United States Patent
Yan et al.

(10) Patent No.: US 11,079,665 B2
(45) Date of Patent: Aug. 3, 2021

(54) LASER PROJECTION APPARATUS

(71) Applicant: Hisense Laser Display Co., Ltd., Shandong (CN)

(72) Inventors: Ke Yan, Shandong (CN); Youliang Tian, Shandong (CN); Wei Li, Shandong (CN); Yun Zhao, Shandong (CN)

(73) Assignee: HISENSE LASER DISPLAY CO., LTD., Qingdao (CN)

( * ) Notice: Subject to any disclaimer, the term of this patent is extended or adjusted under 35 U.S.C. 154(b) by 20 days.

(21) Appl. No.: 16/744,722

(22) Filed: Jan. 16, 2020

(65) Prior Publication Data
US 2020/0301265 A1 Sep. 24, 2020

Related U.S. Application Data

(63) Continuation of application No. PCT/CN2019/125368, filed on Dec. 13, 2019.

(30) Foreign Application Priority Data

Mar. 20, 2019 (CN) .......................... 201910214208.6
Jun. 20, 2019 (CN) .......................... 201910538767.2
Jun. 20, 2019 (CN) .......................... 201910539490.5

(51) Int. Cl.
*G03B 21/20* (2006.01)
*H04N 9/31* (2006.01)
(Continued)

(52) U.S. Cl.
CPC ......... *G03B 21/2033* (2013.01); *G02B 27/14* (2013.01); *G03B 21/208* (2013.01);
(Continued)

(58) Field of Classification Search
CPC ............... G03B 21/145; G03B 21/208; G03B 21/2013; G03B 21/2033; G03B 21/2053;
(Continued)

(56) References Cited

U.S. PATENT DOCUMENTS

2010/0283975 A1   11/2010   Hsiung et al.
2012/0154766 A1*  6/2012   Choi .................... G02B 27/145
                                                    353/94
(Continued)

FOREIGN PATENT DOCUMENTS

CN     2702333 Y     5/2005
CN     1779555 A     5/2006
(Continued)

OTHER PUBLICATIONS

International Search Report with translation and Written Opinion with translation of the International Searching Authority regarding PCT/CN/2019/112480 dated Feb. 3, 2020, 15 pages.
(Continued)

*Primary Examiner* — Sultan Chowdhury
(74) *Attorney, Agent, or Firm* — Brinks Gilson & Lione

(57) ABSTRACT

The present disclosure describe embodiments of a laser projection apparatus. The apparatus includes: an apparatus housing, a laser source system, an optical illumination system and a lens system. The laser source system includes: a first laser assembly configured to emit a first laser beam, a second laser assembly configured to emit a second laser beam and a third laser assembly configured to emit a third laser beam; a first laser combining lens configured to reflect the third laser beam; a second laser combining lens configured to transmit the second laser beam and reflect the third laser beam; and a third laser combining lens configured to transmit the first laser beam and reflect the second and third laser beams. The optical illumination system is configured to
(Continued)

modulate laser beams to generate a modulated beam. The lens system is configured to project the modulated beam onto a projection screen.

20 Claims, 26 Drawing Sheets

(51) Int. Cl.
  *G02B 27/14* (2006.01)
  *G03B 33/12* (2006.01)
(52) U.S. Cl.
  CPC ..... *G03B 21/2013* (2013.01); *G03B 21/2066* (2013.01); *G03B 21/2073* (2013.01); *G03B 33/12* (2013.01); *H04N 9/3164* (2013.01)
(58) Field of Classification Search
  CPC .......... G03B 21/2066; G03B 21/2073; G03B 33/06; G03B 33/08; G03B 33/12; H04N 9/315; H04N 9/3105; H04N 9/3138; H04N 9/3152; H04N 9/3155; H04N 9/3158; H04N 9/3161; H04N 9/3164; H04N 9/3173
  See application file for complete search history.

(56) References Cited

U.S. PATENT DOCUMENTS

| | | | |
|---|---|---|---|
| 2012/0212711 A1 | 8/2012 | Goto | |
| 2013/0141553 A1 | 6/2013 | Li et al. | |
| 2013/0250250 A1 | 9/2013 | Lin et al. | |
| 2013/0286359 A1* | 10/2013 | Motoya | G03B 21/204 353/31 |
| 2014/0016102 A1 | 1/2014 | Chen et al. | |
| 2015/0002823 A1 | 1/2015 | Yan | |
| 2016/0119595 A1 | 4/2016 | Lyubarsky et al. | |
| 2017/0111621 A1* | 4/2017 | Tian | G02B 26/0875 |
| 2018/0348612 A1 | 12/2018 | Nakajima et al. | |
| 2018/0364552 A1 | 12/2018 | Chien et al. | |

FOREIGN PATENT DOCUMENTS

| | | |
|---|---|---|
| CN | 101285996 A | 10/2008 |
| CN | 101377613 A | 3/2009 |
| CN | 201576164 U | 9/2010 |
| CN | 102402110 A | 4/2012 |
| CN | 102621791 A | 8/2012 |
| CN | 102645831 A | 8/2012 |
| CN | 102722071 A | 10/2012 |
| CN | 102799057 A | 11/2012 |
| CN | 202837785 U | 3/2013 |
| CN | 103324013 A | 9/2013 |
| CN | 203217229 U | 9/2013 |
| CN | 104122742 A | 10/2014 |
| CN | 102985869 B | 2/2015 |
| CN | 104808426 A | 7/2015 |
| CN | 106019784 A | 10/2016 |
| CN | 106647127 A | 5/2017 |
| CN | 106707668 A | 5/2017 |
| CN | 206557518 U | 10/2017 |
| CN | 107490875 A | 12/2017 |
| CN | 107608166 A | 1/2018 |
| CN | 108398804 A | 8/2018 |
| CN | 207689821 U | 8/2018 |
| CN | 208092417 U | 11/2018 |
| CN | 109143742 A | 1/2019 |
| CN | 208506479 U | 2/2019 |
| CN | 109407450 A | 3/2019 |
| CN | 208752376 U | 4/2019 |
| CN | 109839796 A | 6/2019 |
| CN | 109884851 A | 6/2019 |
| WO | WO2012129788 A1 | 4/2012 |

OTHER PUBLICATIONS

International Search Report and Written Opinion of the International Searching Authority for corresponding International application No. PCT/CN2019/125368 dated Mar. 12, 2020, 16 pages.
International Search Report and Written Opinion of the International Searching Authority for corresponding International application No. PCT/CN2019/125369 dated Mar. 19, 2020, 17 pages.
International Search Report and Written Opinion of the International Searching Authority for corresponding International application No. PCT/CN2019/125370 dated Feb. 26, 2020, 16 pages.
International Search Report and Written Opinion of the International Searching Authority for corresponding International application No. PCT/CN2019/125371 dated Mar. 19, 2020, 15 pages.
International Search Report and Written Opinion of the International Searching Authority for corresponding International application No. PCT/CN2019/125372 dated Mar. 13, 2020, 14 pages.

* cited by examiner

LASER PROJECTION APPARATUS

CROSS-REFERENCE TO RELATED APPLICATIONS

This disclosure is a continuation application of International Patent Application No. PCT/CN2019/125368 filed on Dec. 13, 2019, which claims priorities to Chinese Patent Application No. 201910214208.6, filed with the Chinese Patent Office on Mar. 20, 2019, Chinese Patent Application No. 201910538767.2, filed with the Chinese Patent Office on Jun. 20, 2019, and Chinese Patent Application No. 201910539490.5, filed with the Chinese Patent Office on Jun. 20, 2019, all of which are incorporated herein by reference in their entireties.

TECHNICAL FIELD

The present disclosure relates to the field of laser projection technologies, and in particular, to a laser projection apparatus.

BACKGROUND

A laser source has advantages of good monochromaticity, high luminance, and long service life. Therefore, the laser source is an ideal light source, and is widely used in laser projection apparatuses such as laser televisions and laser projectors.

SUMMARY

The present disclosure describes embodiments of a laser projection apparatus. The projection apparatus includes: an apparatus housing, and a laser source system, an optical illumination system and a lens system that are disposed in the apparatus housing. The laser source system includes: a first laser assembly disposed on a first plane and configured to emit a first laser beam; a second laser assembly disposed on a second plane perpendicular to the first plane and configured to emit a second laser beam; and a third laser assembly arranged side by side with the second laser assembly on the second plane, wherein the second laser assembly is more proximate to the first laser assembly than the third laser assembly, and the third laser assembly is configured to emit a third laser beam; a first laser combining lens disposed at a position opposite to the third laser assembly, and configured to reflect the third laser beam; a second laser combining lens disposed at a junction of the second laser beam and the third laser beam, and configured to transmit the second laser beam and reflect the third laser beam; a third laser combining lens disposed at a junction of the first laser beam and both the second laser light and the third laser light propagating from the second laser combining lens, and configured to transmit the first laser beam and reflect the second laser beam and the third laser beam, so that the first laser beam, the second laser beam and the third laser beam are directed toward an laser outlet of the laser source system. The optical illumination system is configured to modulate laser beams emitted from the laser source system to generate a modulated beam. The lens system is configured to project the modulated beam onto a projection screen.

BRIEF DESCRIPTION OF THE DRAWINGS

In order to describe technical solutions in embodiments of the present disclosure more clearly, the accompanying drawings used in the description of embodiments will be introduced briefly. Obviously, the accompanying drawings to be described below are merely some embodiments of the present disclosure, and a person of ordinary skill in the art may obtain other drawings according to these drawings.

FIG. 5C-2 is a schematic assembly diagram of another laser assembly, in accordance with some embodiments of the present disclosure;

FIG. 5E-1 is a schematic diagram showing an exploded structure of another laser assembly, in accordance with some embodiments of the present disclosure;

FIG. 5E-2 is a schematic diagram showing an exploded structure of yet another laser assembly, in accordance with some embodiments of the present disclosure;

FIG. 5F-1 is a schematic diagram showing a structure of an MCL laser;

FIG. 5F-2 is a schematic diagram of a circuit package structure of the laser in FIG. 5F-1;

FIG. 6A-1 is a schematic diagram showing a structure of a heat dissipation system of a laser source, in accordance with some embodiments of the present disclosure;

FIG. 6A-2 is a schematic exploded diagram of a heat dissipation system of a laser source, in accordance with some embodiments of the present disclosure;

DETAILED DESCRIPTION

The technical solutions in some embodiments of the present disclosure will be described with reference to the accompanying drawings in some embodiments of the present disclosure. Obviously, the described embodiments are merely some but not all of embodiments of the present disclosure. All other embodiments obtained by a person of ordinary skill in the art based on the embodiments of the present disclosure shall be included in the protection scope of the present disclosure.

In the description of the embodiments of the present disclosure, it will be noted that term "installation", "connected", or "attached" is to be understood broadly. For example, it may be a fixed connection, a detachable connection, or an integral connection; and it may be a direct connection, or may be an indirect connection through an intermediate medium, and may be internal communication between two elements. Specific meanings of the above terms in the present disclosure may be understood by those skilled in the art according to specific situations.

In the description and in the claims, terms other than those expressly stated may have nuanced meanings implied in the context. Similarly, phrase "in one embodiment" or "in some embodiments" does not necessarily refer to same embodiment(s), and phrase "in another embodiment" or "in some other embodiments" does not necessarily refer to different embodiment(s). Similarly, phrase "in one example" or "in some examples" does not necessarily refer to same example(s), and phrase "in another example" or "in some other examples" does not necessarily refer to different example(s). For example, a subject that is requested to be protected is intended to include, in whole or in part, exemplary embodiments or a combination of examples.

First, a structure and a working process of a laser projection apparatus according to some embodiments of the present disclosure will be described based on the laser projection apparatus shown in FIG. 1A.

Figure 1A:
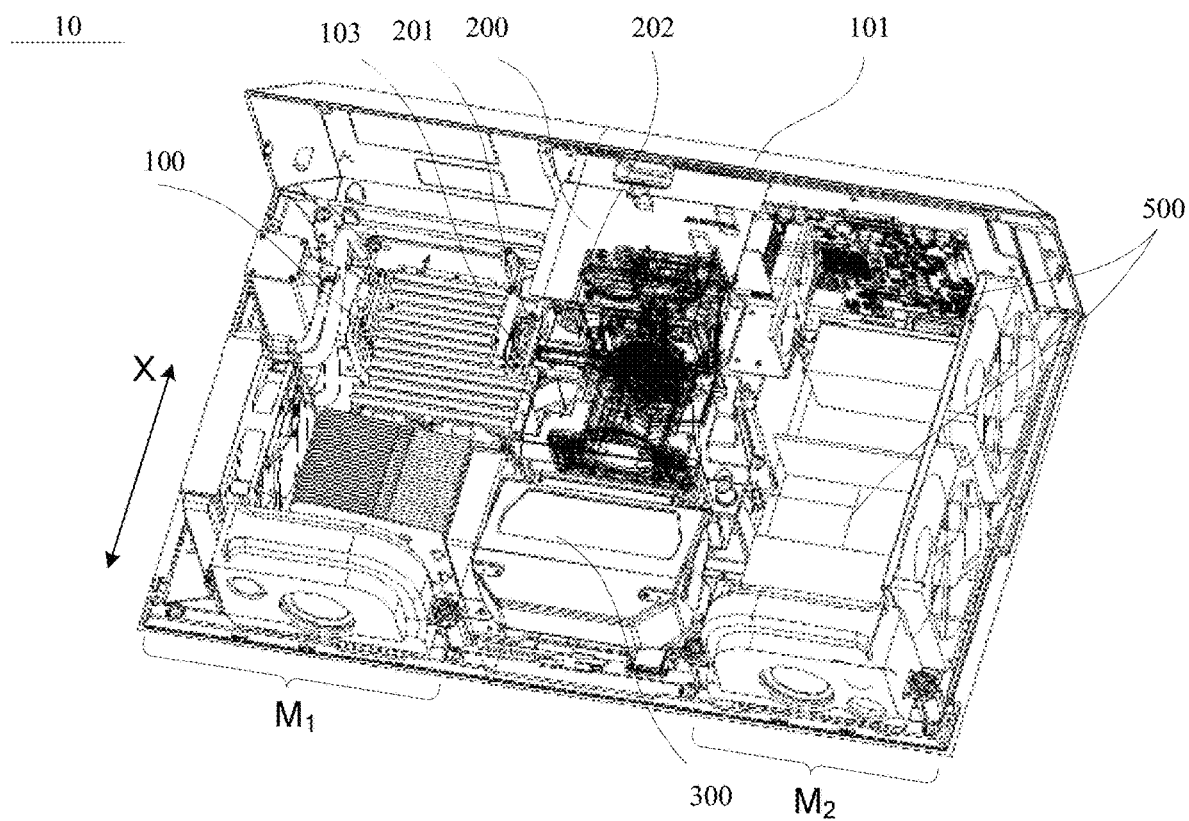
FIG. 1A is a schematic diagram showing a whole structure of a laser projection apparatus, in accordance with some embodiments of the present disclosure.

FIG. 1A is a schematic diagram showing a structure of a laser projection apparatus. As shown in FIG. 1A, the laser projection apparatus 10 includes an apparatus housing 101 and a plurality of optical portions. The plurality of optical portions include a laser source 100, an optical engine 200, and a lens 300. Each optical portion (such as the laser source 100, the optical engine 200, or the lens 300) is encapsulated in a corresponding housing, and meets certain sealing or air-tight requirements. For example, the laser source 100 may be hermetically sealed through a corresponding housing, which may better solve a light attenuation problem of the laser source 100.

The laser source 100, the optical engine 200, and the lens 300 are installed in the apparatus housing 101. The optical engine 200 is connected to the lens 300 and the optical engine 200 and the lens 300 are disposed along a first direction X of the apparatus housing 101 to divide space in the apparatus housing 101 into a first region $M_1$ and a second region $M_2$. The first region $M_1$ is provided with the laser source 100 therein, and the second region $M_2$ is provided with at least one circuit board therein. As shown in FIG. 1A, the first direction X may be a width direction of the laser projection apparatus 10, and according to a usage manner, the first direction X may be opposite to a viewing direction of a user. The first region $M_1$ is located at a first side of the lens 300 and the optical engine 200. That is, the first region $M_1$ refers to a space enclosed by the optical engine 200, the lens 300, and a portion of the apparatus housing 101. The second region $M_2$ is located at a second side of the lens 300 and the optical engine 200. That is, the second region $M_2$ refers to a space enclosed by the optical engine 200, the lens 300, and another portion of the apparatus housing 101. The laser source 100 is a pure three-color laser source, and is able to emit a red laser beam, a blue laser beam and a green laser beam. Therefore, the laser source 100 is configured to provide illumination beams to the optical engine 200.

Figure 5A:
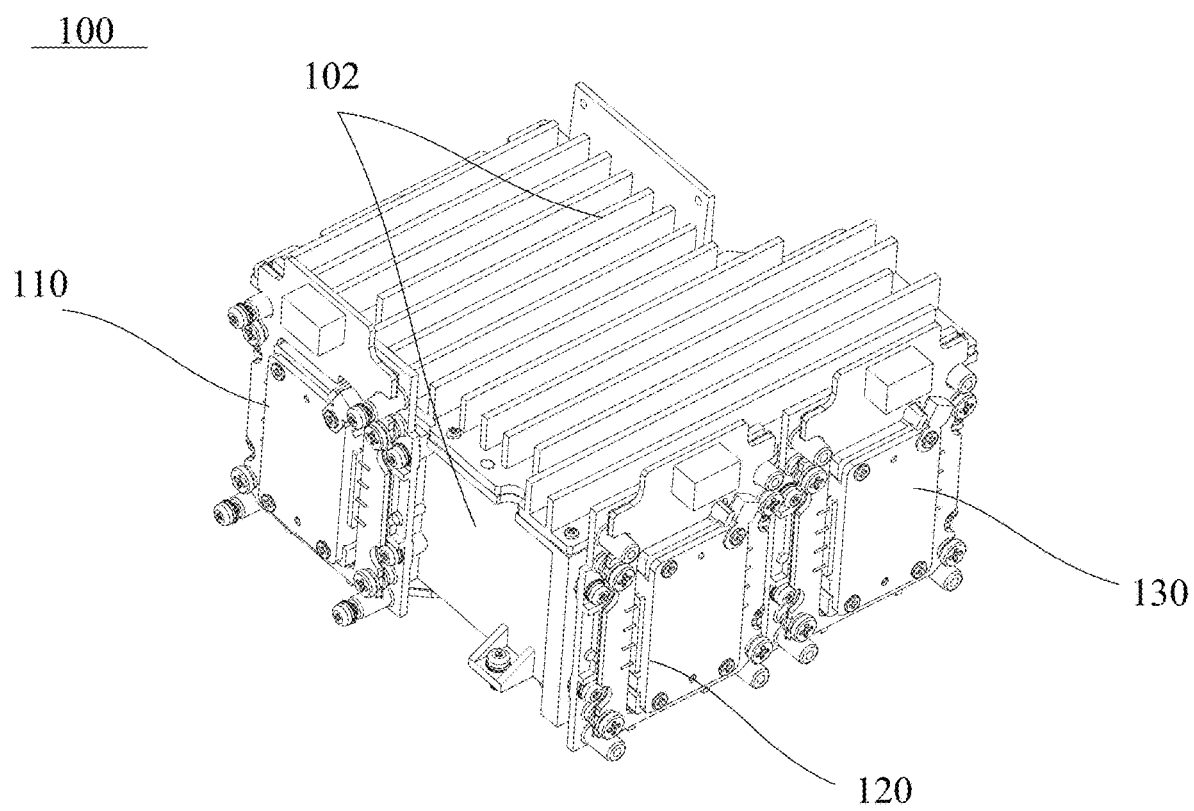
FIG. 5A is a schematic diagram showing a structure of a laser source in the laser projection apparatus shown in FIG. 1A.
Figure 5B:
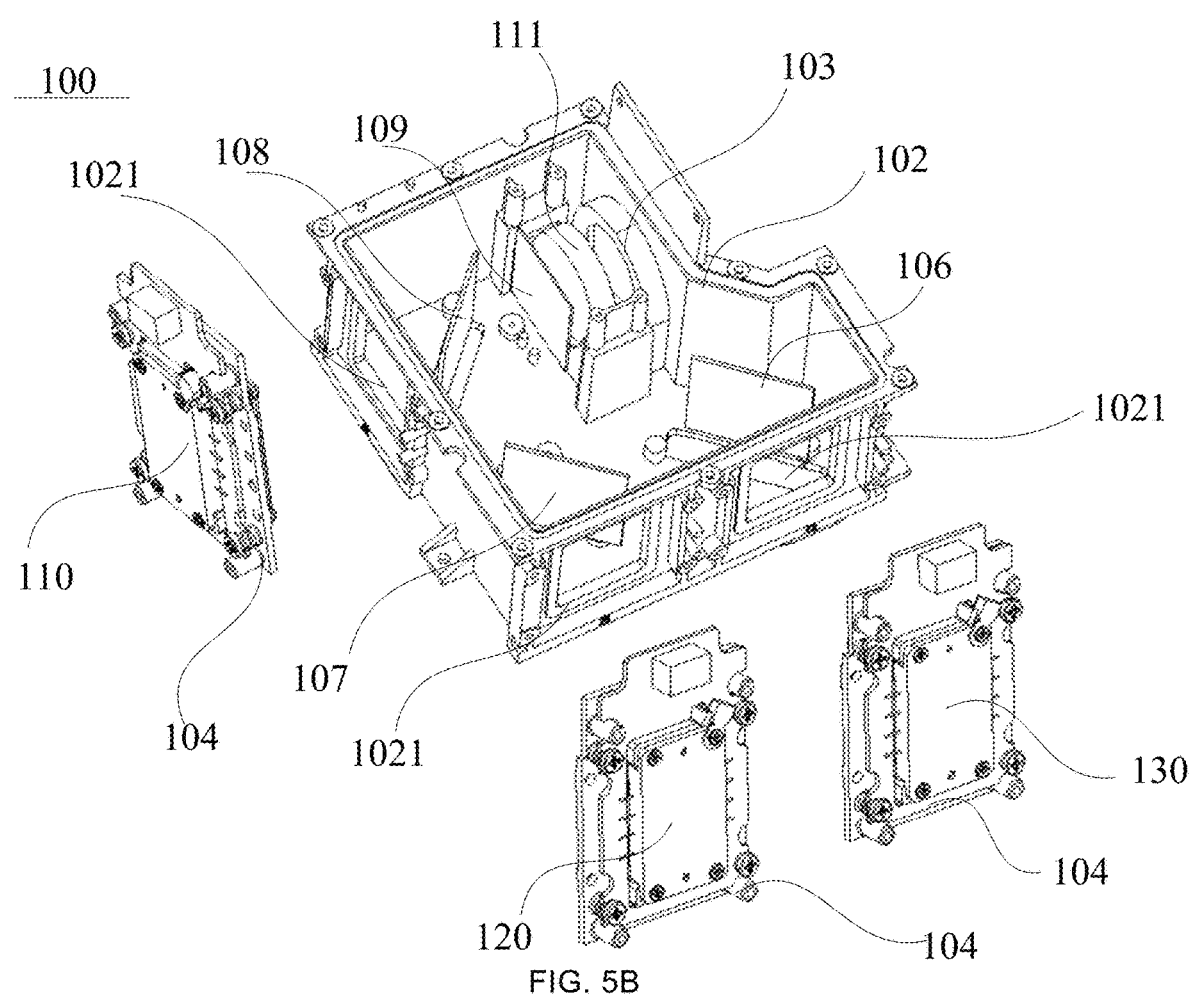
FIG. 5B is a schematic exploded diagram of the structure of FIG. 5A.

Referring to FIGS. 1A and 5B, the laser source 100 has a first laser outlet 103, the optical engine 200 has a second laser inlet 201 and a third laser outlet 202, and the optical engine 200 is provided with a laser modulator therein. According to a design of an illumination laser path inside the optical engine, the second laser inlet 201 and the third laser outlet 202 are located on different side walls of the optical engine that are in a perpendicular relationship. The perpendicular relationship of different side walls herein refers to a perpendicular relationship in spatial positions. Different side walls may be different side walls of an optical engine housing in a cuboid shape, or may be different side walls of an optical engine housing in an irregular three-dimensional shape. The first laser outlet 103 of the laser source 100 is connected to the second laser inlet 201 of the optical engine 200. Laser beams emitted by the laser source 100 enter an inside of the optical engine 200, and then reach the laser modulator, and are output to the lens 300 through the third laser outlet 202 of the optical engine 200 after being modulated by the laser modulator.

Figure 1B:
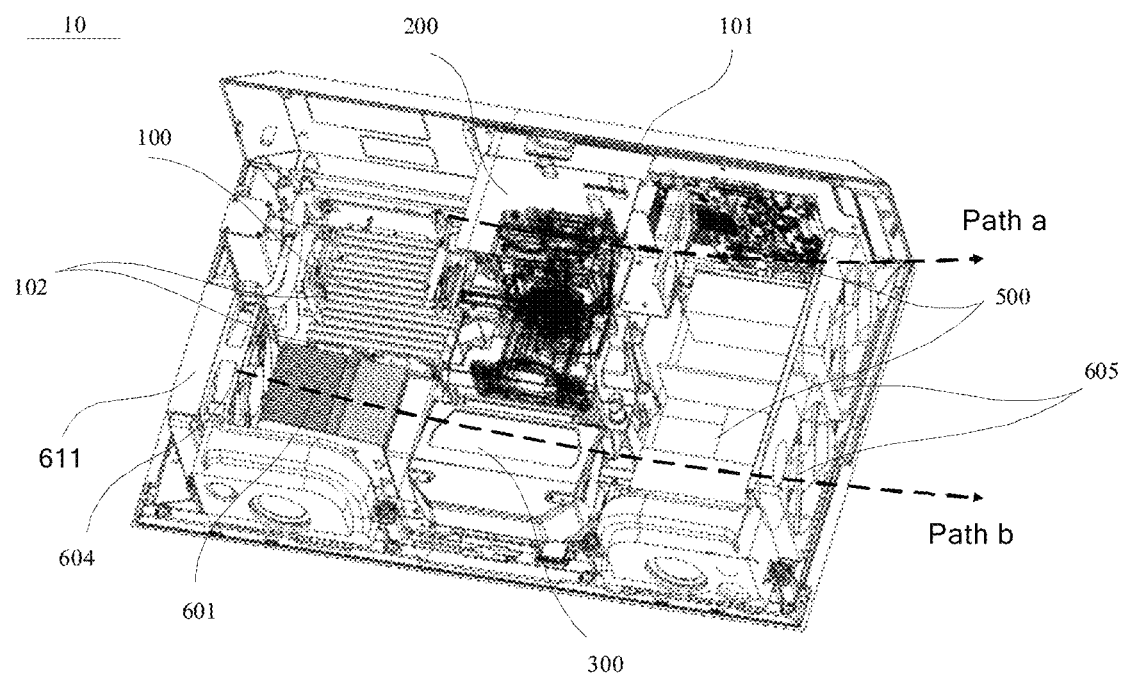
FIG. 1B is a schematic diagram showing a whole heat dissipation structure of a laser projection apparatus, in accordance with some embodiments of the present disclosure.
Figure 1C:
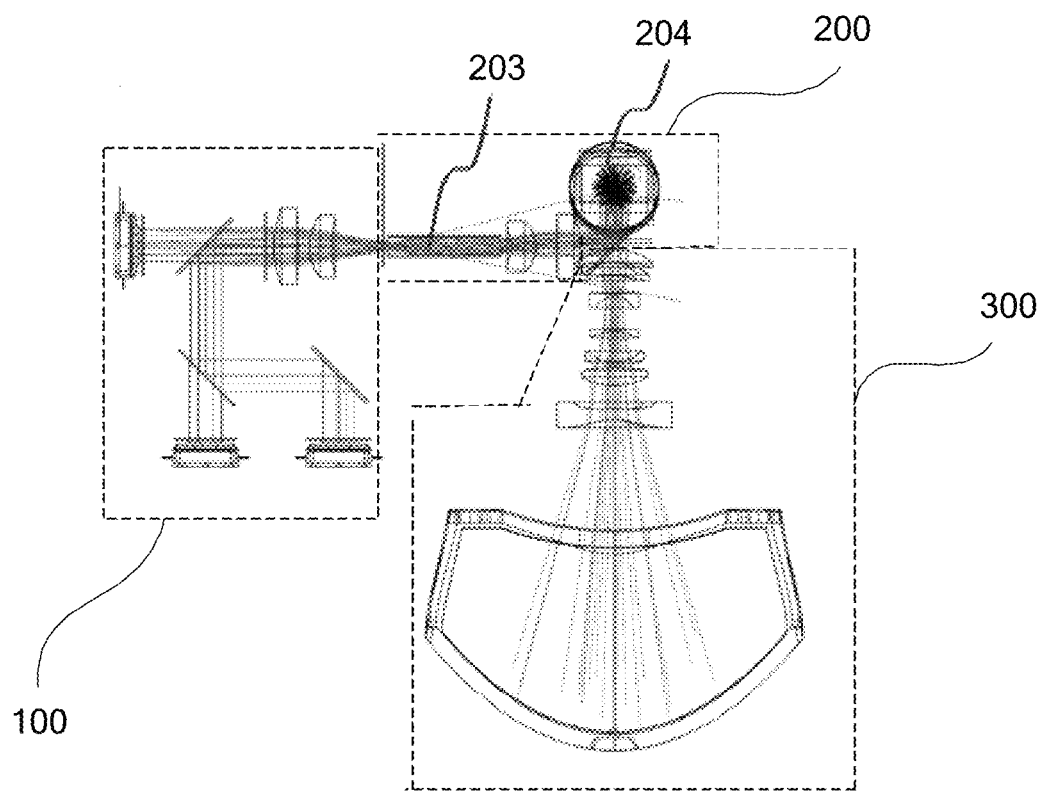
FIG. 1C is a schematic diagram showing a principle of a laser path of a laser projection apparatus, in accordance with some embodiments of the present disclosure.

FIG. 1C is a schematic diagram showing a principle of a laser path of a laser projection apparatus. As shown in FIG. 1C, the laser projection apparatus is divided into three optical portions according to different optical functions, i.e., the laser source 100, the optical engine 200, and the lens 300. The laser source 100 includes laser assemblies of three colors and a plurality of optical lenses, and the plurality of optical lenses are able to homogenize and shrink the laser beams. Here, "shrink" a laser beam may refer to make a cross-section area of the laser beam smaller. The laser beams emitted by the laser source 100 enter the optical engine 200. The optical engine includes a laser pipe 203. Usually, the laser pipe 203 is located at a front end of the optical engine, and first receives the illumination beams emitted by the laser source. The laser pipe 203 has a laser mixing function and a homogenizing function. The optical engine further includes some lens groups, so that the illumination beams may enter the laser modulator, such as a laser valve 204. After the laser valve 204 modulates the laser beams, the laser beams enter lens groups of the lens 300 for imaging.

The laser modulator included in the optical engine 200 is a core component of the laser projection apparatus. The laser modulator (such the laser valve) may be a three-piece liquid crystal display (LCD) laser valve, or a liquid crystal on silicon (LCOS) laser valve, or a digital micro-mirror device (DMD) laser valve. The DMD laser valve is applied to a digital light processing (DLP) projection architecture.

Figure 2:
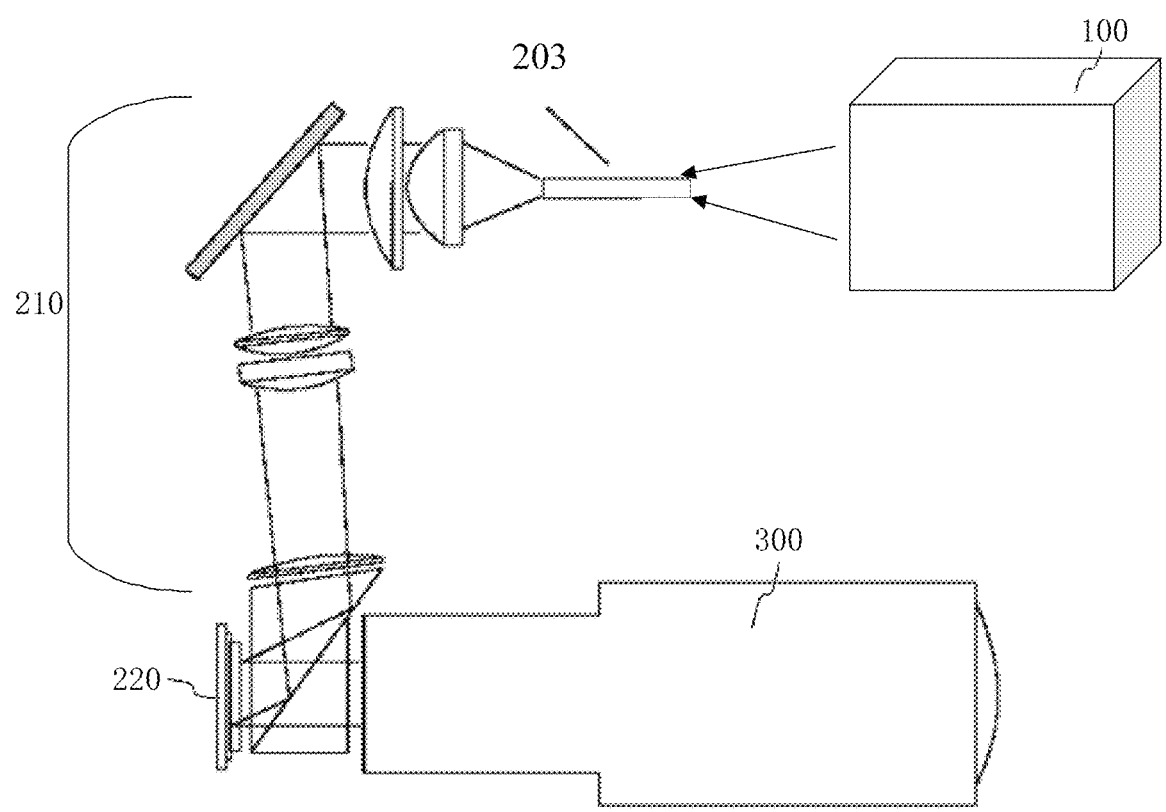
FIG. 2 is a schematic diagram of a DLP projection architecture, in accordance with some embodiments of the present disclosure.

FIG. 2 shows a DLP projection architecture. A DMD array is a core device of an entire projection architecture. The following will be described by taking an application of a single chip DMD as an example. The DMD 220 is a reflective laser valve device. The illumination beams output from the laser source 100 usually pass through an illumination laser path 210 at a front end of the DMD 220. After passing through the illumination laser path 210, the illumination beams are made to conform to an illumination size and an incident angle required by the DMD 220. A surface of the DMD 220 includes thousands of micro-reflectors. Each micro-reflector may be individually driven to deflect. For example, each micro-reflector may be driven to deflect by a range of plus or minus 12 degrees (i.e., −12° to +12°) or a range of plus or minus 17 degrees (i.e., −17° to +17°). A laser beam reflected at a negative deflection angle is referred to as an OFF laser beam, and the OFF laser beam is an ineffective laser beam, which is usually irradiated on the housing or is absorbed by a laser absorption device. A laser beam reflected at a positive deflection angle is referred to as an ON laser beam. The ON laser beam is an effective laser beam that enters the lens 300 at a positive deflection angle after each micro-reflector on the surface of the DMD laser valve receives an irradiation of the illumination beam, and is used to project an image.

In some embodiments of the present disclosure, the optical engine 200 is applied to the DLP projection architecture and a DMD reflective laser valve is used as the laser modulator.

Referring to FIG. 1A, the lens 300 is connected to the optical engine 200 through the third laser outlet 202 of the optical engine 200. For example, end faces of respective corresponding housings (i.e., a lens housing and an optical engine housing) are fixed by screws. And, in some examples, a part of the lens groups of the lens 300 extend into the third laser outlet 202 of the optical engine 200.

The lens 300 includes a combination of a plurality of lens, the combination of a plurality of lens is usually divided by group, and is divided into a three-segment combination including a front group, a middle group and a rear group, or a two-segment combination including a front group and a rear group. The front group is a lens group proximate to a laser-emitting side of the laser projection apparatus, and the rear group is a lens group proximate to a laser-emitting side of the laser modulator. According to the plurality of combinations of the lens groups described above, the lens 300 may also be a zoom lens, or a prime adjustable-focus lens, or a prime lens.

In some embodiments, the laser projection apparatus is an ultra-short-focus projection apparatus. The lens 300 is an ultra-short-focus projection lens, and a projection ratio of the lens 300 is usually less than 0.3, such as 0.24. The ultra-short-focus projection lens may be the lens including a refractive lens group 310 and a reflector group 320 shown in FIG. 3, and the reflector group 320 may include a curved reflector. As shown in FIG. 3B, projected laser beams are emitted obliquely upward onto a projection screen 400 for imaging after passing through the lens 300, which is different from a conventional laser-emitting manner in which an optical axis of the projected laser beams is located on a center perpendicular line in a projected image. The ultra-short-focus projection lens usually has an offset of 120% to 150% relative to the projected image.

A size of a DMD chip is very small, such as 0.66 inches, 0.65 inches, or 0.47 inches. However, the projected image usually has a size of more than 70 inches, such as a size between 80 inches and 150 inches. Therefore, as for the lens 300, if a hundredfold magnification needs to be achieved, and aberrations need to be corrected to obtain a good resolution, thereby presenting a high-definition projected image, a design difficulty of the ultra-short-focus projection lens is much greater than that of a telephoto projection lens.

In the ultra-short-focus projection apparatus, a center perpendicular line of a laser-emitting surface of the DMD laser valve is usually parallel to but does not coincide with an optical axis of the lens. That is, the DMD is biased to the lens 300. In this way, a laser beam emitted from the laser-emitting surface of the DMD obliquely enters the lens 300 at a certain angle, and after a transmission and a reflection by partial regions of the plurality of lenses, the projected laser beam is finally emitted obliquely upward from the lens 300.

As the laser modulator, the DMD laser valve is driven by an electric signal to modulate the laser beam, so that the laser beam carries image information, and is finally enlarged by the lens to form a projected image.

Figure 3A:
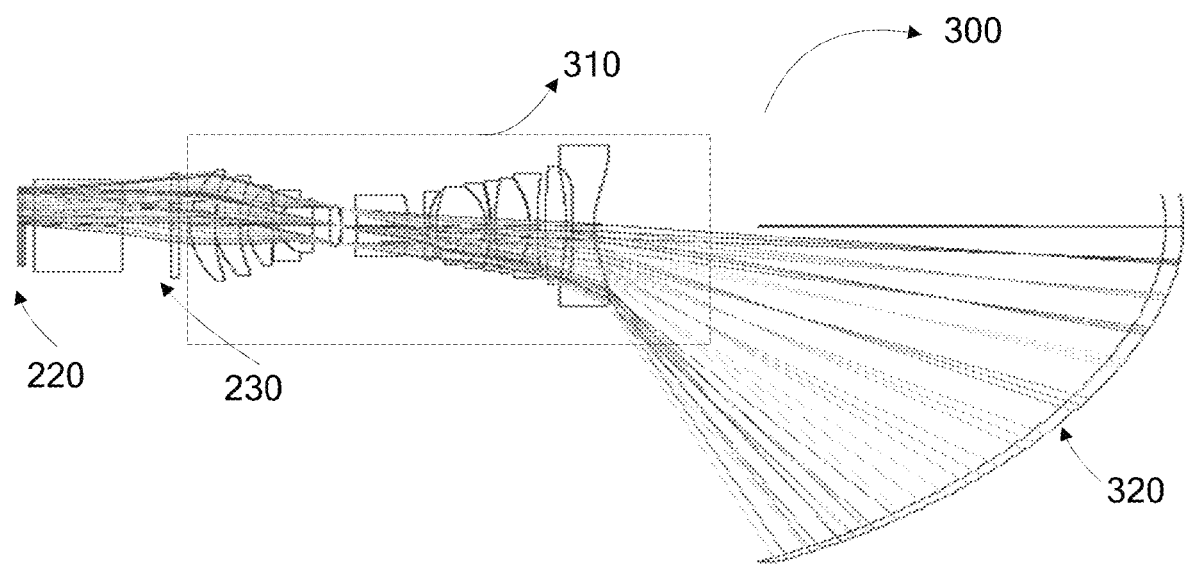
FIG. 3A is a schematic diagram of an ultra-short-focus projection imaging laser path, in accordance with some embodiments of the present disclosure.
Figure 3B:
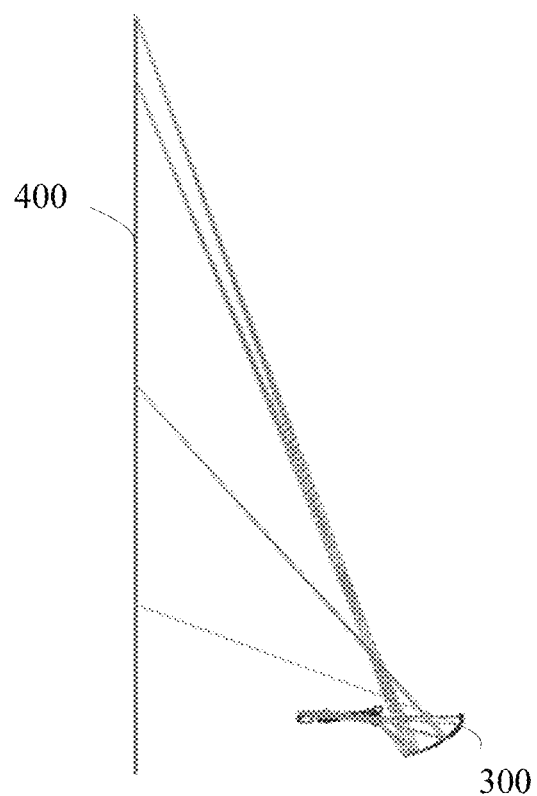
FIG. 3B is a schematic diagram of an ultra-short-focus projection system, in accordance with some embodiments of the present disclosure.

Based on a relatively fixed resolution of the DMD laser valve, in order to form an image with a higher definition and a higher resolution, as shown in FIG. 3A, a vibrating lens 230 may also be provided in a laser path from the laser modulator(such as the DMD laser valve) to the lens 300. The vibrating lens 230 has a transmissive flat plate structure. Through a one-dimensional vibration, the vibrating lens 230 will sequentially change angles of beams of sub-images transmitted, so that two adjacent sub-images may be imaged on the projection screen after being misplaced and superimposed. By using a visual retention effect of human eyes, information of the two sub-images is superimposed into information of one image, and image details perceived by the human eyes are increased, and the resolution of the image is improved.

The vibrating lens 230 may also perform a two-dimensional movement. For example, the vibrating lens 230 may move at upper, lower, left and right positions, so that four sub-images may be superimposed together. By using the above information superposition principle, an effect of improving the resolution perceived by the human eyes may be achieved. Regardless of whether two sub-images are superimposed or four sub-images are superimposed, the two sub-images or the four sub-images are obtained by decomposing a high-resolution image in advance. And, only in a case where a decomposition manner is matched with a movement manner of the vibrating lens 230, the two sub-images or the four sub-images may be able to be correctly superimposed without an image chaos.

The vibrating lens 230 is usually provided between the DMD laser valve and the lens. In some embodiments of the present disclosure, laser beams transmitted between the DMD laser valve and the lens may be approximately regarded as parallel laser beams. A parallelism of the parallel laser beams may still be maintained well after the parallel laser beams are refracted by the flat-plate-shaped vibrating lens 230. It will be noted that, after a laser beam with a large divergence angle being refracted by the flat plate-shaped vibrating lens 230, if the divergence angle is greatly changed, a luminance or a chromaticity may be uneven in a case where beams of two sub-images passing through the vibrating lens are superimposed.

Referring to FIG. 1A, a plurality of circuit boards 500 are disposed in the space enclosed by the optical engine 200, the lens 300, and another part of the apparatus housing 101 (i.e., the second region $M_2$). The plurality of circuit boards 500 include a power board, a television (TV) board, a control board, and a display board. The plurality of circuit boards 500 are usually disposed in a stack. For example, a part of the plurality of circuit boards 500 may be stacked in a direction perpendicular to a bottom wall of the apparatus housing 101, and another part may be stacked in a direction parallel to the bottom wall of the apparatus housing 10 (e.g., the first direction X).

In the laser projection apparatus 10, structures such as a sound, a fan, and a heat dissipation device are also disposed inside the apparatus housing 101.

In the laser projection apparatus provided by the above embodiments, the optical engine 200 and the lens 300 are arranged in the first direction X of the apparatus housing 101, and divide the laser projection apparatus 10 into two portions. The two portions are respectively the left portion and the right portion (i.e., the first region $M_1$ and the second region $M_2$) shown in FIG. 1A. One portion (such as the first region $M_1$) may accommodate the laser source, and the other portion (such as the second region $M_2$) may accommodate the plurality of circuit boards. Such a division may be regarded as a division into an optical region and an electrical region. It will be noted that, a driving circuit is also usually disposed in the optical region. However, the driving circuit in the optical region has a smaller volume and a lower complexity than circuit portions such as the display board, a signal board and the power board. Therefore, it may be considered that the left portion (i.e., the first region $M_1$) is the optical region, and the right portion (i.e., the second region $M_2$) is the electrical region. Arranging different portions separately not only facilitates an assembly and an adjustment of the laser projection apparatus 10, but also facilitates to meet respective design requirements of the optical portions and the circuit portions, such as design requirements of heat dissipation, wiring, and electromagnetic testing.

In the laser projection apparatus provided by some embodiments, the optical engine 200 and the lens 300 are arranged in a same direction, and a portion of the lens groups of the lens 300 extend into the inside of the optical engine 200, which is beneficial to reduce a volume of an assembly composed of the optical engine 200 and the lens. According to laser exit characteristics of the reflective laser valve, although the reflective laser valve is subject to architectures of different illumination laser paths, the laser beams emitted by the laser source 100 may finally enter the lens 300 after deflections for a plurality of times. Comparing a direction of a laser beam emitted from the first laser outlet 103 of the laser source 100 with a direction of a laser beam incident on a laser-entry surface of the lens 300, it may be considered that a direction of an optical axis of a laser beam emitted by the laser source 100 is perpendicular to a direction of an optical axis of a laser beam entering the lens 300 in space. The laser source 100, the optical engine 200, and the lens 300 form an L-shape after being assembled, which provides a structural basis for a deflection of the optical axes of the laser beams, and reduces a design difficulty of laser paths in which the laser beams enter the lens 300 from the optical engine 200. In addition, an overall layout of the laser projection apparatus is very compact, and an architecture of the laser paths is also very simple.

In some embodiments of the present disclosure, the laser source 100 is used to provide illumination for the optical engine 200. For example, the laser source 100 provides the illumination beams for the optical engine 200 by sequentially outputting illumination beams of three primary colors.

It will be noted that, the laser source 100 may also non-sequentially output the illumination beams, that is, there is a period in which the illumination beams of different primary colors are output together. For example, there is a period in which a red illumination beam and a green illumination beam are output together, thereby increasing a proportion of a yellow illumination beam in a beam cycle. In this way, it is beneficial to improve a luminance of an image. For another example, a red illumination beam, a green illumination beam, and a blue illumination beam are simultaneously output in a certain period. The illumination beams of the three colors are superimposed to form a white illumination beam, which may increase a luminance of a white field. Therefore, in a case where the optical engine 200 includes a three-piece LCD laser valve, in order to correspond to the three-piece LCD laser valve, laser beams of three primary colors in the laser source 100 may be simultaneously output to form a mixed white laser beam.

In some embodiments of the present disclosure, although the laser source 100 sequentially outputs the laser beams of the three primary colors, according to a trichromatic mixing principle, the human eyes are unable to distinguish different colors of the laser beams at a certain time, and what is perceived by the human eyes is still the mixed white laser beam. Therefore, a laser beam output from the laser source 100 is usually referred to as the mixed white laser beam.

FIG. 5A is a schematic diagram showing a partial structure of the laser source 100 in FIG. 1A, and FIG. 5B is a schematic exploded diagram of the structure of FIG. 5A. The three-color laser source will be described below in combination with drawings.

As shown in FIG. 5A, the laser source 100 includes a laser source housing 102, and a red laser assembly 110, a blue laser assembly 120, and a green laser assembly 130 that are installed on different side walls of the laser source housing 102. The red laser assembly 110 is able to emit a red laser beam, the blue laser assembly 120 is able to emit a blue laser beam, and the green laser assembly 130 is able to emit a green laser beam. The blue laser assembly 120 and the green laser assembly 130 are installed side by side on a same side wall, and are both perpendicular to the red laser assembly 110 in space. That is, a side wall of the laser source housing 102 where the blue laser assembly 120 and the green laser assembly 130 are located (e.g., a second side wall) is perpendicular to a side wall of the laser source housing 102 where the red laser assembly 110 is located (e.g., a first side wall), and the two side walls are both perpendicular to a bottom wall of the laser source housing 102 or the bottom wall of the apparatus housing 101. In this case, the green laser assembly and the blue laser assembly are located on a second plane, and the green laser assembly is arranged in parallel with the blue laser assembly on the second plane. The red laser assembly is located on a first plane perpendicular to the second plane, so that the red laser assembly is perpendicular to the green laser assembly and the blue laser assembly.

Figures 1, 5C:
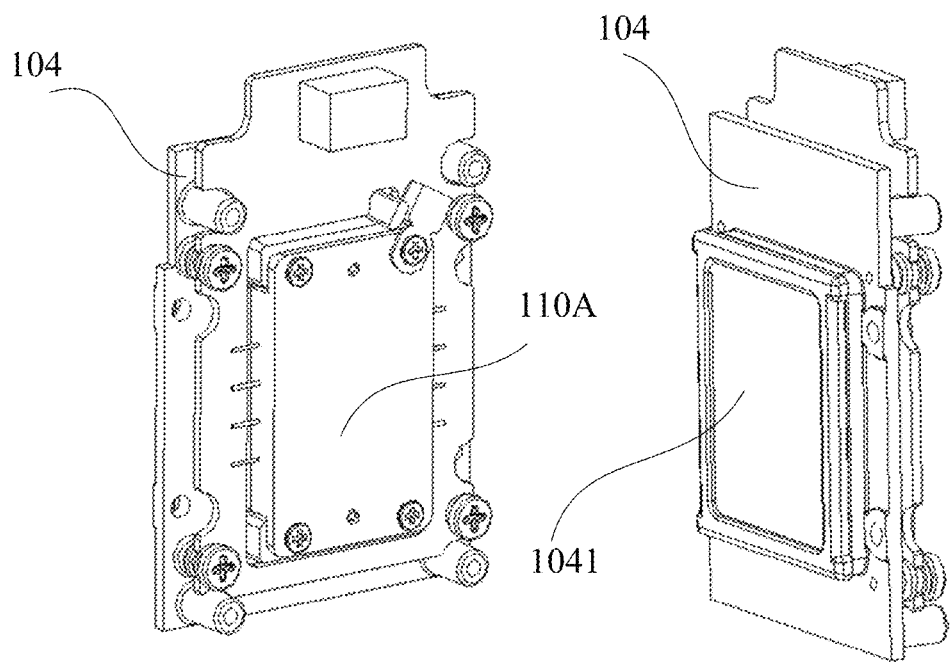
FIG. 5C-1 is a schematic assembly diagram of a laser assembly, in accordance with some embodiments of the present disclosure.
Figures 2, 5C:
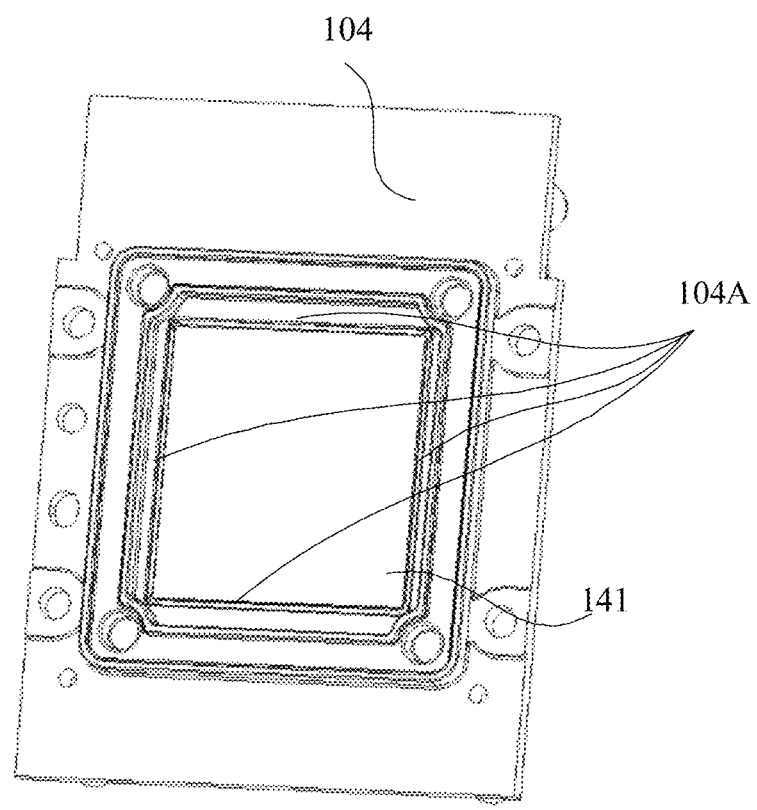
Figure 5D:
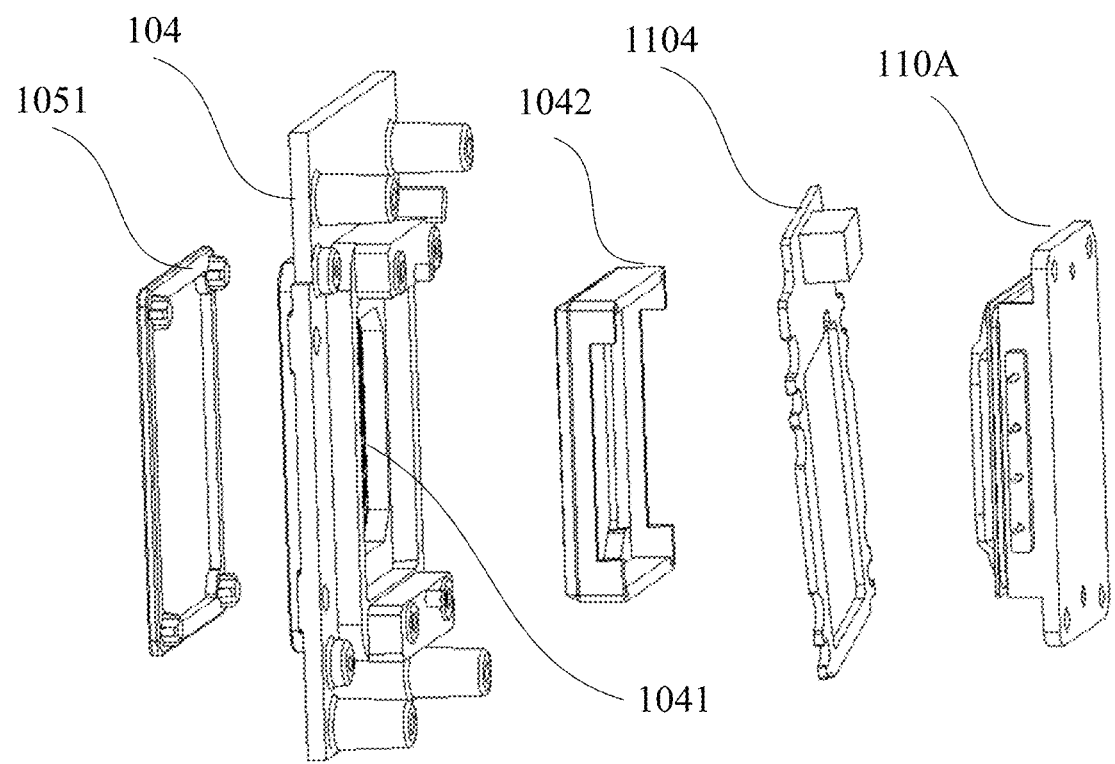
FIG. 5D is a schematic diagram showing an exploded structure of a laser assembly, in accordance with some embodiments of the present disclosure.
Figures 1, 5E:
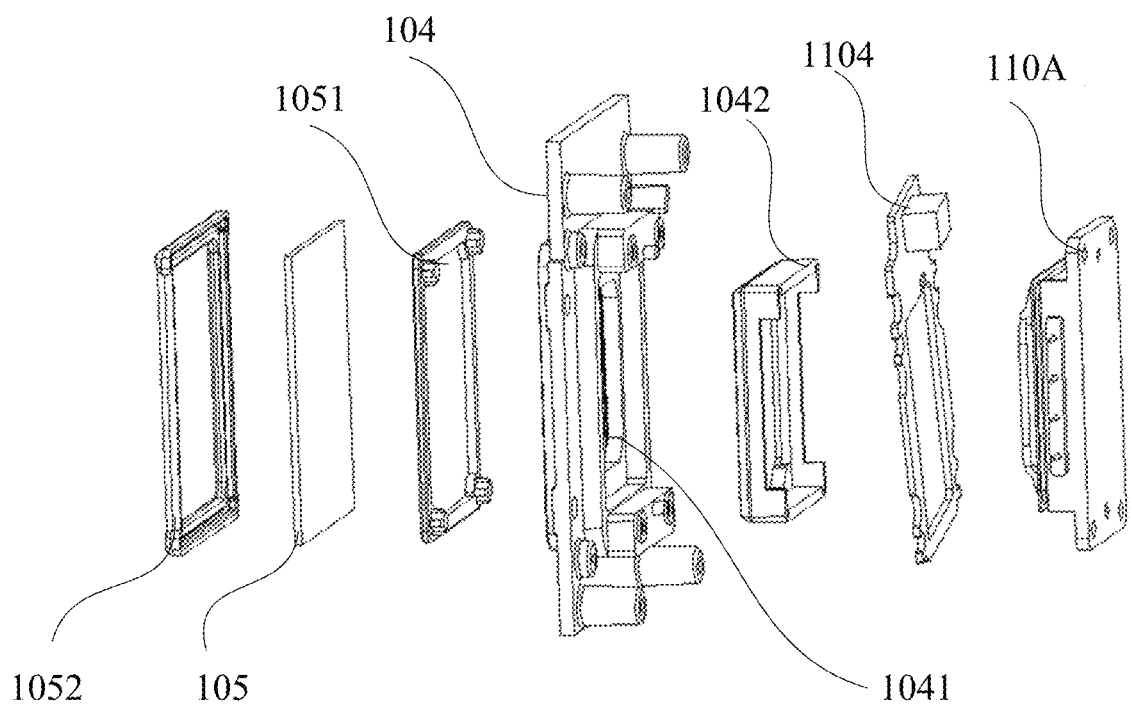
Figures 2, 5E:
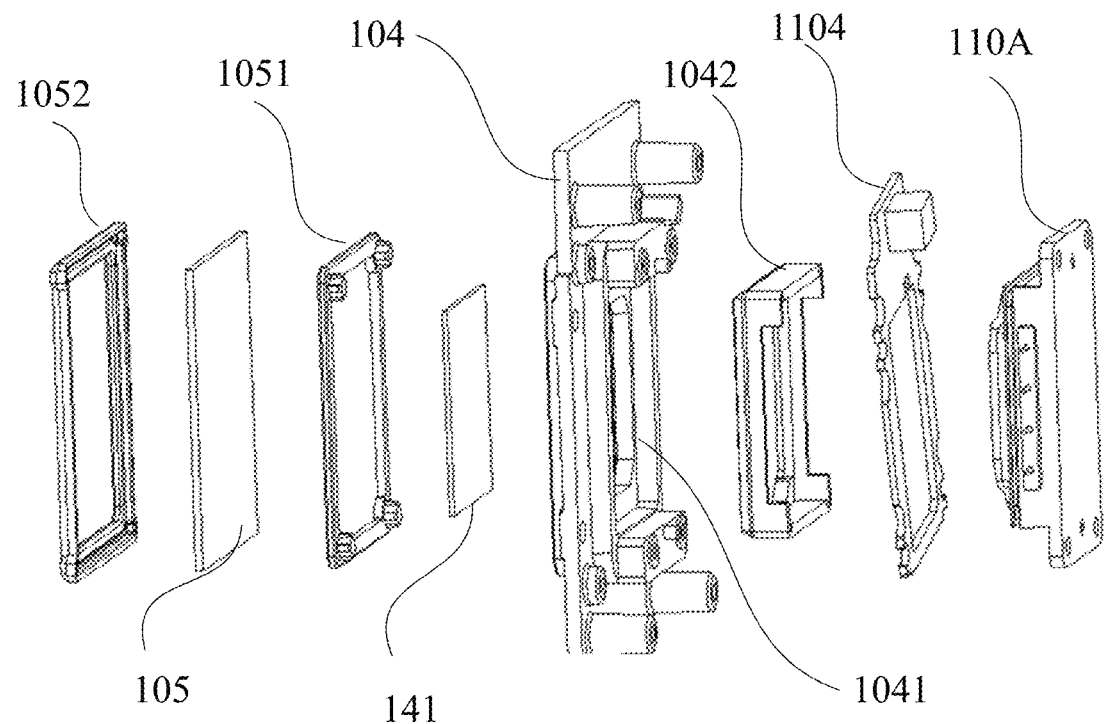
Figures 1, 5F:
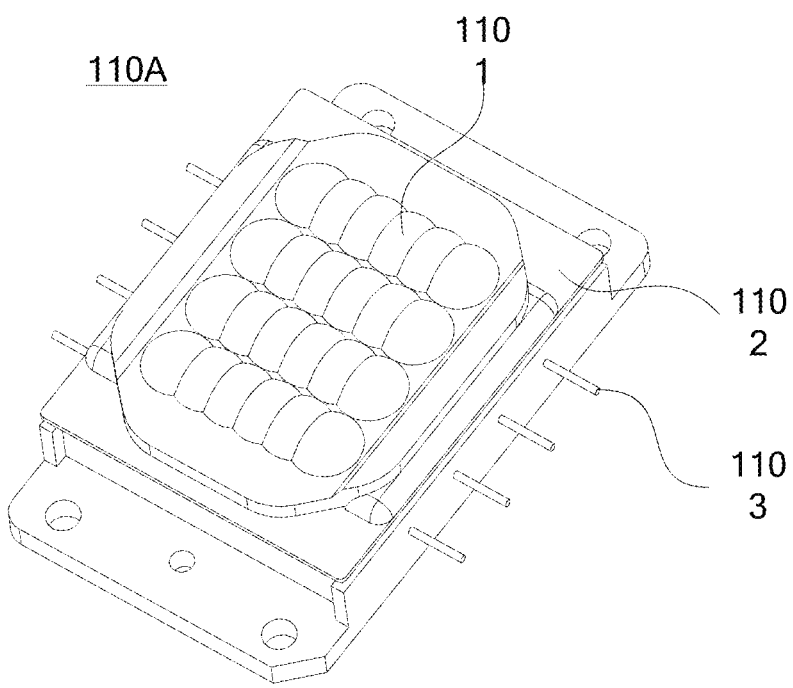
Figures 2, 5F:
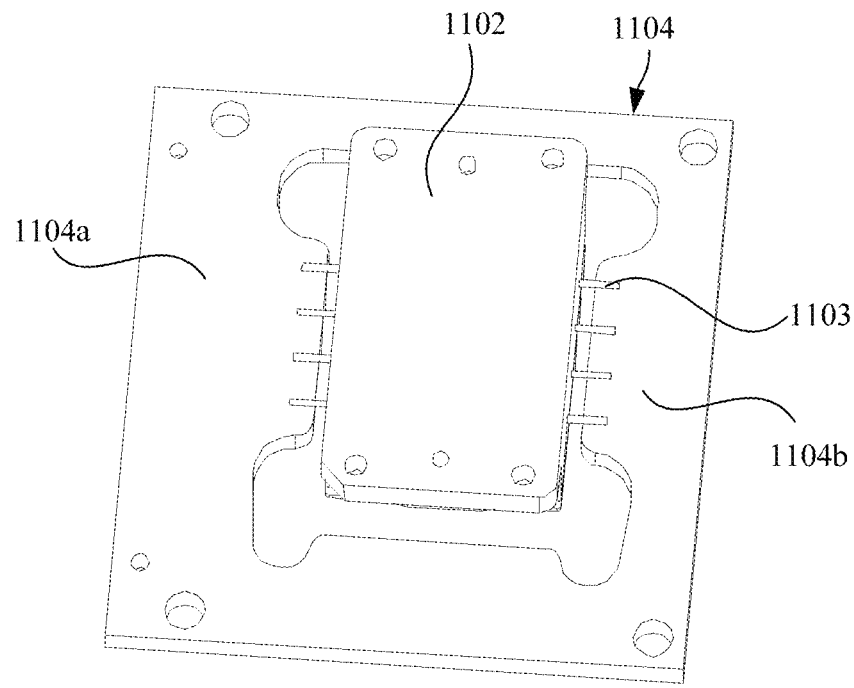
Figure 5G:
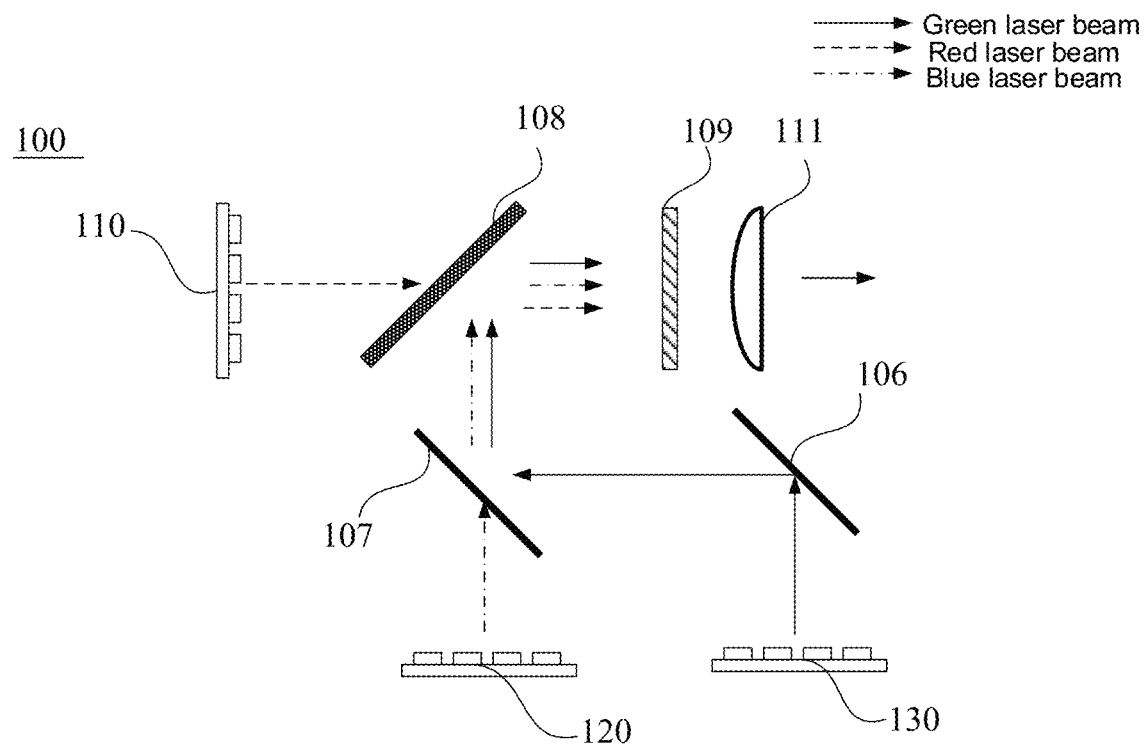
FIG. 5G is a schematic diagram showing a principle of a laser path of a laser source, in accordance with some embodiments of the present disclosure.

FIG. 5G is a schematic diagram showing a principle of a laser path of the laser source 100. As shown in FIG. 5G, a first laser assembly is the red laser assembly 110, and a first laser beam is the red laser beam. A second laser assembly is the blue laser assembly 120, and a second laser beam is the blue laser beam. A third laser assembly is the green laser assembly 130, and a third laser beam is the green laser beam. The blue laser assembly 120 and the green laser assembly 130 are arranged side by side. The blue laser assembly 120 is disposed more proximate to the red laser assembly 110 than the green laser assembly. A laser-emitting surface of the red laser assembly 110 faces the laser outlet of the laser source 100. That is, a laser beam emitted from the red laser assembly 110 may be directly output to the laser outlet of the laser source 100 after a single transmission, without a deflection of a laser path.

A laser beam emitted from the green laser assembly 130 is emitted from the laser outlet after being reflected three times, and a laser beam emitted from the blue laser assembly 120 is emitted from the laser outlet after a single transmission and a single reflection. It will be seen that, in the above schematic diagram showing the principle of the laser path, the red laser beam has the shortest laser path, the green laser beam has the longest laser path, and the green laser beam is reflected the most.

In some embodiments, referring to FIGS. 5A and 5B, the above laser assemblies of three colors respectively output rectangular laser spots. After the laser assemblies of respective colors are installed on the side walls of the laser source housing, a long side of a rectangular laser spot correspondingly output is perpendicular to the bottom wall of the laser source housing. In this way, the laser spots output by the laser assemblies of the three colors will not form a cross-shaped laser spot in a case of a combination of the laser spots, which is beneficial to a reduction of a size of a combined laser spot and a high homogeneity. It will be noted here that, in a case where the laser assemblies of the three colors sequentially output the red laser beam, the green laser beam, and the blue laser beam, the "combination of the laser spots" and the "combined laser spot" herein refer to a spot of the mixed white laser beam perceived by the human eyes.

As shown in FIGS. 5A and 5B, the laser source housing 102 includes a top cover and the bottom wall, and a plurality of side walls located between the top cover and the bottom wall. The first laser outlet 103 is located on one of the side walls. The laser source 100 further includes a plurality of optical lenses, and the plurality of optical lenses are disposed on the bottom wall of the laser source housing 102. The top cover of the laser source housing 102 is fin-shaped, which may increase a heat dissipation area. The side walls of the laser source housing 102 is provided with a plurality of openings 1021 to facilitate to install the above plurality of laser assemblies, so that a laser beam emitted from a laser assembly of any of the three colors may enter the laser source housing 102 through a corresponding opening, and then form a laser transmission path through the plurality of optical lenses. For example, the first side wall of the laser source housing 102 is provided with a first opening corresponding to the red laser assembly 110, and the second side wall of the laser source housing 102 is provided with a second opening corresponding to the blue laser assembly 120 and a third opening corresponding to the green laser assembly 130. For example without limitation, an "opening" may refer to a "window" or the like.

In some embodiments of the present disclosure, the top cover of the laser source housing 102 is further provided with some control circuit boards. Moreover, in the structure of the laser source housing 102 at a bottom wall angle of the laser source housing shown in FIG. 5I, a mounting position 1023 of an adjusting structure of the optical lenses is also reserved on the bottom wall.

Figure 5H:
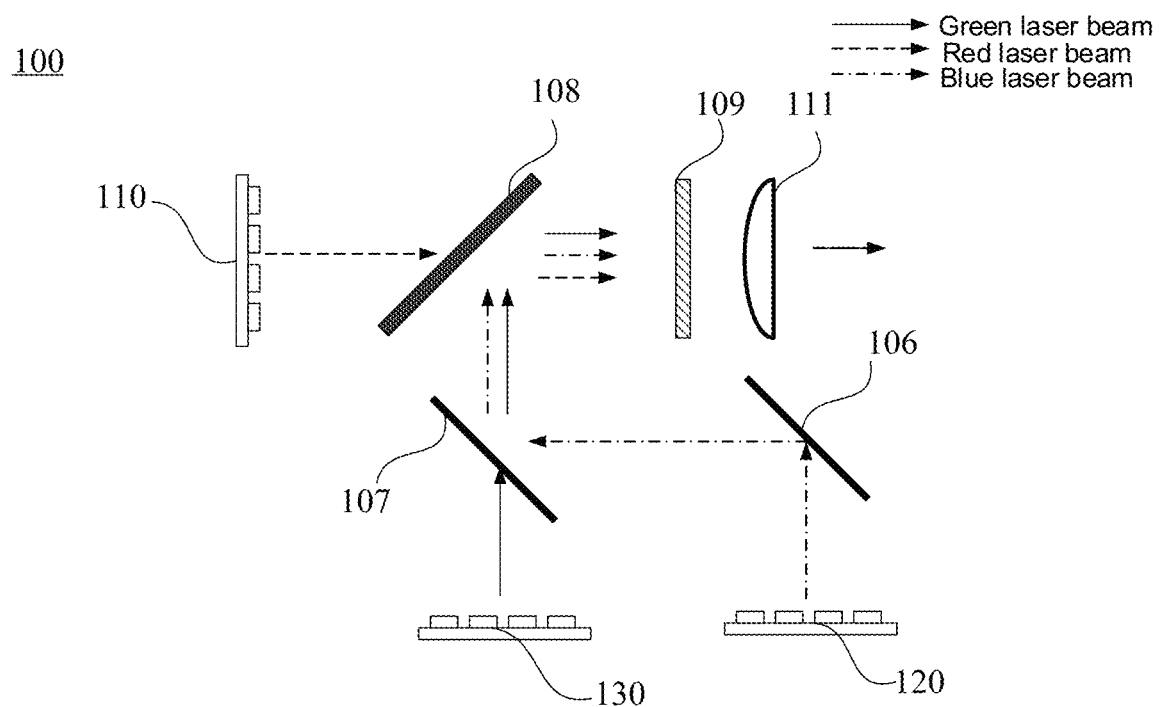
FIG. 5H is a schematic diagram showing a principle of a laser path of another optical source, in accordance with some embodiments of the present disclosure.
Figure 5I:
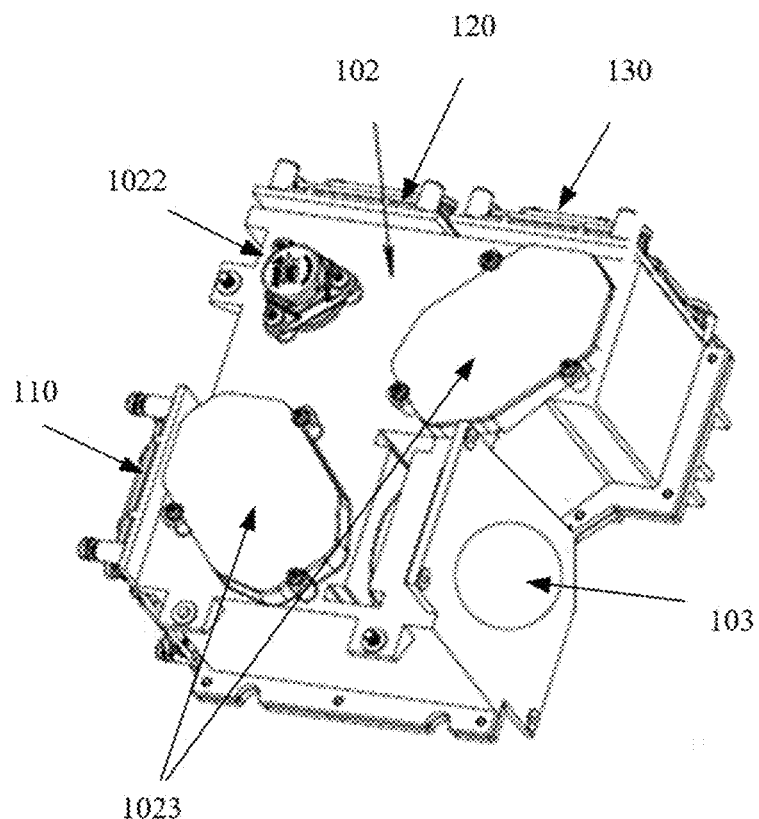
FIG. 5I is a schematic diagram showing a structure of the laser source shown in FIG. 5A at another angle.

In some embodiments, referring to FIG. 5I, the laser source 100 further includes an air pressure balancing device 1022 disposed on the bottom wall or the top cover of the laser source housing 102. The air pressure balancing device may release pressure. In a case where a temperature inside the laser source housing 102 rises too high, air pressure is released to an outside of the laser source housing 102 through the air pressure balancing device 1022, or an air containing space is formed by using the air pressure balancing device 1022 to increase a volume of an internal sealed space of the laser source 100. In this way, the air pressure in the laser source housing 102 may be balanced, and an operation reliability of each optical device in the laser source housing 102 may be improved.

In some examples, the air pressure balancing device 1022 is a filter valve. The filter valve is configured to connect the inside with the outside of the laser source housing 102 to exchange air. That is, in a case where the temperature inside the laser source housing 102 rises, internal air flows out. After the temperature drops and the inside of the laser source housing 102 is cooled down, external air may also enter the laser source housing 102. For example, the filter valve is an air-tight waterproof filter film, which may filter dust within a certain diameter range outside, and block the dust out to maintain a cleanliness inside the laser source housing.

In some other examples, the air pressure balancing device 1022 is a retractable airbag. The airbag may be made of elastic rubber. The airbag is configured to have an increased volume during an increase of the air pressure inside the laser source housing 102 to relieve the air pressure inside the laser source housing 102.

Assembly structures of the laser assemblies of the three colors and the laser source housing are substantially the same. Therefore, in order to briefly describe a connection manner between each laser assemblies and the laser source housing, the following will be described by taking an assembly structure of a laser assembly of any of the three colors as an example.

The laser assemblies of the three colors are all multi-chip laser diode (MCL) laser assemblies. Each MCL laser assembly includes a MCL laser and a laser driving circuit board disposed on a periphery of the MCL laser. The MCL laser includes a substrate and a plurality of laser-emitting chips that are encapsulated on the substrate to form an area laser source. The MCL laser 110A as shown in FIG. 5F-1 includes a metal substrate 1102, and a plurality of laser-emitting chips are encapsulated on the metal substrate 1102. The plurality of laser-emitting chips may be connected in series for driving, or may be connected in parallel in rows or columns for driving. The plurality of laser-emitting chips may be arranged in a 4×6 array, or may be arranged in other arrays, such as a 3×5 array, a 2×7 array, a 2×6 array, or a 4×5 array. An overall luminous power of a laser with a different number of arrays is different. There are pins 1103 protruding from two sides of the metal substrate 1102. Each pin is coupled to an electrical signal to drive the laser-emitting chips to emit laser beams. The MCL laser 110A further includes a collimating lens group 1101 covering laser-emitting surfaces of the plurality of laser-emitting chips, and the collimating lens group 1101 is usually fixed by an adhesive. The collimating lens group 1101 includes a plurality of collimating lenses, and the plurality of collimating lenses are usually in one-to-one correspondence with laser-emitting positions of the laser-emitting chips, and correspondingly collimate the laser beams.

As shown in FIG. 5F-2, the MCL laser assembly further includes the laser driving circuit board 1104 disposed on the periphery of the MCL laser. The laser driving circuit board 1104 has a flat-plate structure, and the laser driving circuit board is substantially parallel to or in a same plane as a laser-emitting surface of the MCL laser. There is at least one pin 1103 on two sides of the MCL laser. Each pin 1103 is soldered onto or plugged into the laser driving circuit board 1104, so that the MCL laser is electrically connected to the laser driving circuit board 1104. The laser driving circuit board 1104 is configured to provide a driving signal to the MCL laser. In some examples, the laser driving circuit board is integrally formed and surrounds the metal substrate 1102 of the MCL laser. In some other examples, the laser driving circuit board includes two independent circuit boards. That is, the laser driving circuit board includes a first portion 1104a and a second portion 1104b, and the MCL laser is enclosed by the two portions. In this way, a laser assembly encapsulated also substantially has a flat-plate structure, which facilitates to installation, saves space and is beneficial to miniaturize the laser source.

FIG. 5C-1 is a schematic diagram showing an assembly structure of a laser assembly of any of the three colors and a fixed support. FIG. 5D is a schematic diagram showing an exploded structure of a laser assembly of any of the three colors and a fixed support. A part of FIG. 5C-1 (the right drawing) shows an assembly structure of a laser assembly of any of the three colors and the fixed support when viewed from a front side, and the other of FIG. 5C-1 (the left drawing) shows an assembly structure of a laser assembly of any of the three colors and the fixed support when viewed from a back side.

Referring to FIG. 5B, the laser source 100 further includes fixed supports 104. A laser assembly of any of the three colors is installed at a corresponding opening 1021 of the laser source housing 102 through one fixed support 104, and the fixed support 104 and the laser source housing 102 are fixed by screws, thereby fixing the laser assembly at a position of the opening 1021. For example, in FIG. 5B, the red laser assembly 110 is installed at the first opening of the laser source housing 102 through a first fixed support, the blue laser assembly 120 is installed at the second opening of the laser source housing 102 through a second fixed support, and the green laser assembly 130 is installed at the third opening of the laser source housing 102 through a third fixed support.

In a case where a laser assembly of any of the three colors is the MCL laser assembly, the metal substrate of the MCL laser in the MCL laser assembly is provided with assembly hole(s), which may be fixed with a corresponding fixed support.

As shown in FIG. 5D, the fixed support 104 is a sheet metal piece having a laser-transmissive opening frame 1041. A front side of the laser-transmissive opening frame 1041 is installed proximate to the openings 1021 of the laser source housing 102, and a laser assembly of any of the three colors is installed on a mounting position on a back side of the laser-transmissive opening frame 1041. In addition, in order to improve a sealing performance of these structures after installed together, a third sealing member 1042 is disposed at the mounting position on the back side of the laser-transmissive opening frame 1041. The third sealing member 1042 is a frame-shaped rubber member having a protruding edge, which may wrap a front side of the MCL laser assembly, and then fix the MCL laser assembly at the mounting position. The third sealing member 1042 also has a buffer function to prevent the collimating lens group of the MCL laser assembly from being damaged due to a hard contact with the sheet metal piece.

The MCL laser assembly is composed of the MCL laser 110A and a corresponding laser driving circuit board 1104. The MCL laser assembly and the fixed support 104 form a single assembly unit after the MCL laser assembly is fixed on the fixed support 104, and are together installed at a position of a corresponding opening 1021 of the laser source housing 102. For example, there are studs around the opening 1021, and screws passing through studs of the fixed support are fastened into the studs around the opening.

The laser source 100 is provided with a plurality of optical lenses therein, and the plurality of optical lenses are all precise components, and an energy density of laser beams inside the laser source 100 during a transmission is very high. Therefore, if a cleanliness of an internal environment is not high, particles such as dust will accumulate on surfaces of the plurality of precise optical lenses, thereby resulting in a decrease in laser processing efficiency, and further resulting in adverse effects such as a light attenuation of the laser path and a decrease in a luminance of an entire image that is projected from the laser projection apparatus. A dust prevention inside the laser source 100 may alleviate the above light attenuation problem. For example, referring to FIGS. 5B and 5E-1, a sealing glass 105 is further provided at each opening 1021 of the laser source housing 102. The sealing glass 105 isolates the inside of the laser source housing 102 from the laser assemblies installed at the openings 1021. In this way, external dust may not enter the laser source housing 102 from the openings 1021. The sealing glass 105 may be disposed on an inner surface of the laser source housing 102, such as by means of adhesive bonding. Or, the sealing glass 105 may be disposed at a side of the laser source housing 102 proximate to the laser assembly. For example, by providing mounting positions on an outer surface of the laser source housing 102, the laser assembly and the sealing glass 105 are sequentially installed outside of the opening of the laser source housing.

In the exploded structure as shown in FIG. 5E-1, for a convenience of installation of the sealing glass 105, in some embodiments of the present disclosure, the sealing glass 105 is installed on a side of the opening 1021 proximate to the laser assembly. A first accommodating groove for accommodating a first sealing member 1051 is disposed on a front side of the fixed support 104, and a second accommodating groove for accommodating a second sealing member 1052 is provided at the opening 1021 of the laser source housing 102. The sealing glass 105 is located between the first sealing member 1051 and the second sealing member 1052. For example, the second sealing member 1052 is placed in the second accommodating groove at the opening 1021. The second sealing member 1052 is provided with a fixed groove matching the sealing glass 105, and the sealing glass 105 is placed in the fixed groove. The first sealing member 1051 is installed into the first accommodating groove of the laser-transmissive opening frame 1041 of the fixed support 104 though an interference fit. The laser assembly composed of the fixed support 104 and the MCL laser is then installed at the opening 1021 of the laser source housing 102. The first sealing member 1051 is pressed against the sealing glass 105, and with the laser assembly fixed, the sealing glass 105 is also clamped between the first sealing member 1051 and the second sealing member 1052.

In the above examples, a MCL laser assembly of any of the three colors is fixed to the fixed support by shoulder screws, and a shock absorber is also disposed between the shoulder screws and the fixed support, which may reduce a noise transmission during a driving process of the laser at a high frequency.

The assembly structure of the laser assembly and the laser source housing are described above. The above laser assembly is installed on the laser source housing, and emits a laser beam under the control of a driving signal. The laser beam forms a laser path inside the laser source housing, and cooperates with the optical engine and the lens to project an image.

In the laser projection apparatus, the laser source is a main heat source. Heat will be generated after high-density energy beams of the laser are irradiated onto surfaces of the optical lenses. The DMD chip has an area of a few tenths of an inch, but needs to withstand energy of the laser beams required for an entire projected image, and heat generated by the DMD chip is also very high. Moreover, the laser has a set operating temperature to form a stable laser output, thereby taking both of a service life and performances into account. In addition, the laser projection apparatus further includes a plurality of precise optical lenses, especially a plurality of lenses in the ultra-short-focus lens. If a temperature inside the entire apparatus is too high and heat accumulates, a "temperature drift" phenomenon of the lenses in the lens will occur, and an imaging quality of the laser projection apparatus will be seriously reduced. In addition, electronic devices on the circuit board will generate a certain amount of heat after being driven by the electrical signal, and each electronic device also has a set operating temperature. Therefore, a good heat dissipation and a temperature control are very important guarantees for a normal operation of the laser projection apparatus.

Referring to the structure of the laser projection apparatus shown in FIG. 1A and the structure of the laser projection apparatus shown in FIG. 1 B, in the space enclosed by the optical engine 200, the lens 300 and a portion of the apparatus housing 101 (i.e., the first region $M_1$), the laser source 100 and a second heat dissipation device are sequentially arranged along a direction pointing from the optical engine 200 to the lens 300. That is, the second heat dissipation device is arranged side by side with the laser source 100 along the first direction X. The laser source 100 is disposed proximate to one side wall of the apparatus housing 101, the second heat dissipation device is disposed proximate to another side wall of the apparatus housing 101 along the first direction X, and the two side walls are opposite to each other. For example, in the laser source heat dissipation system shown in FIGS. 6A-1 and 6A-2, the second heat dissipation device includes heat dissipation fin(s) 601 and heat pipe(s) 602, and the heat dissipation fin(s) 601 are disposed opposite to the side wall of the laser source housing 102 where the blue laser assembly 120 and the green laser assembly 130 are installed on. The blue laser assembly 120 and the green laser assembly 130 conduct heat to the heat dissipation fin(s) 601 through the heat pipe(s) 602.

Figures 1, 6A:
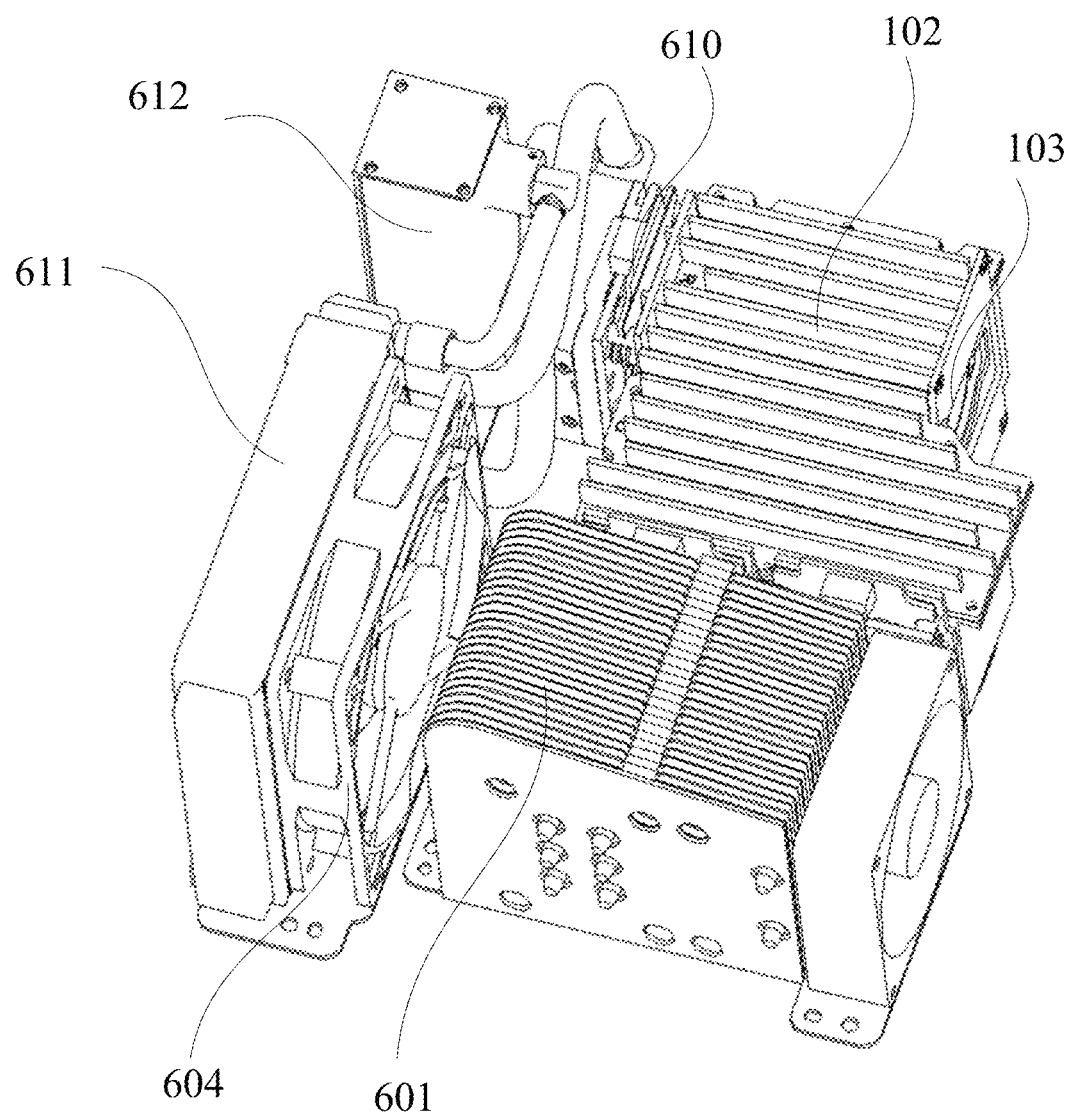
Figures 2, 6A:
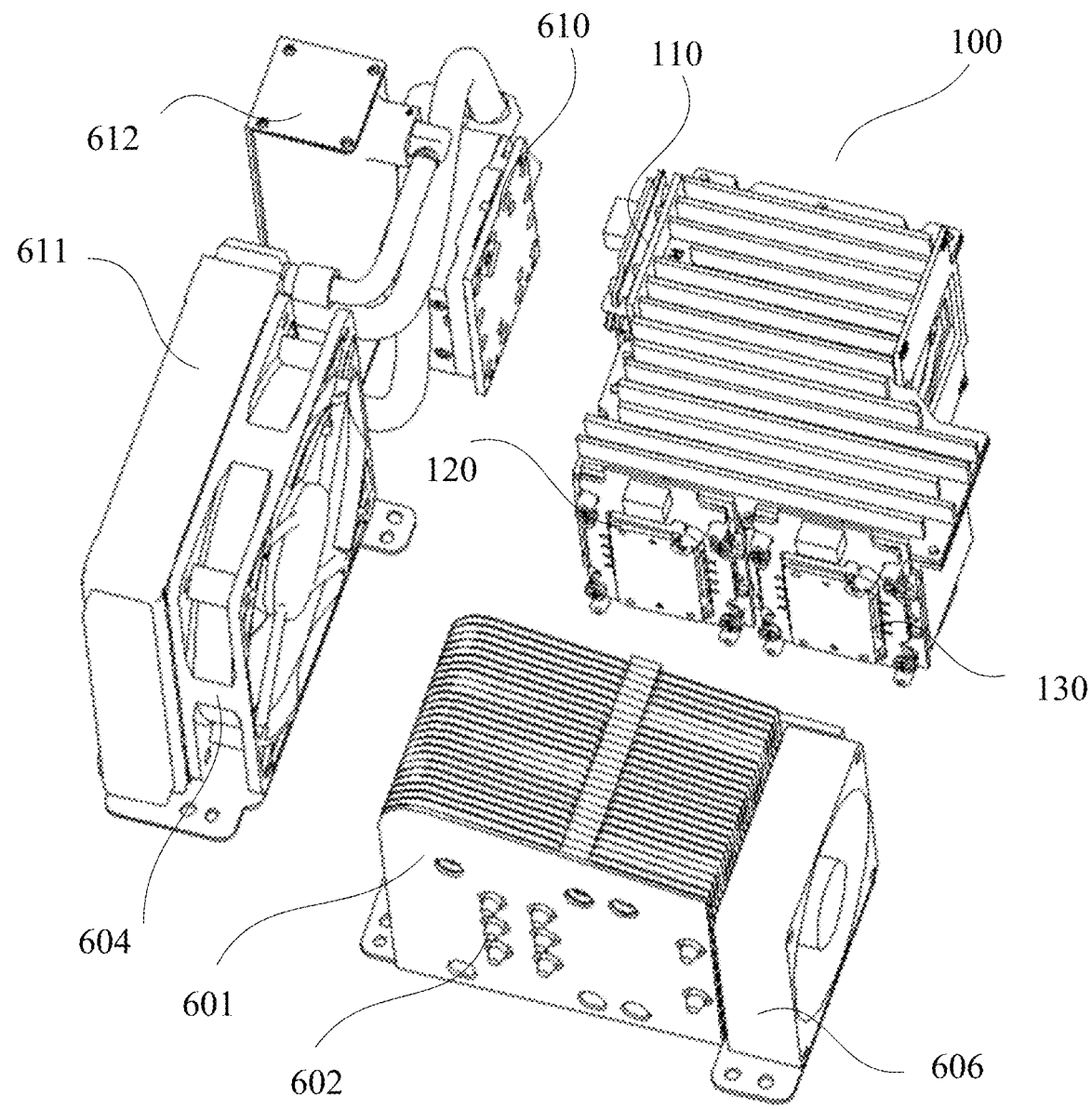
Figure 6B:
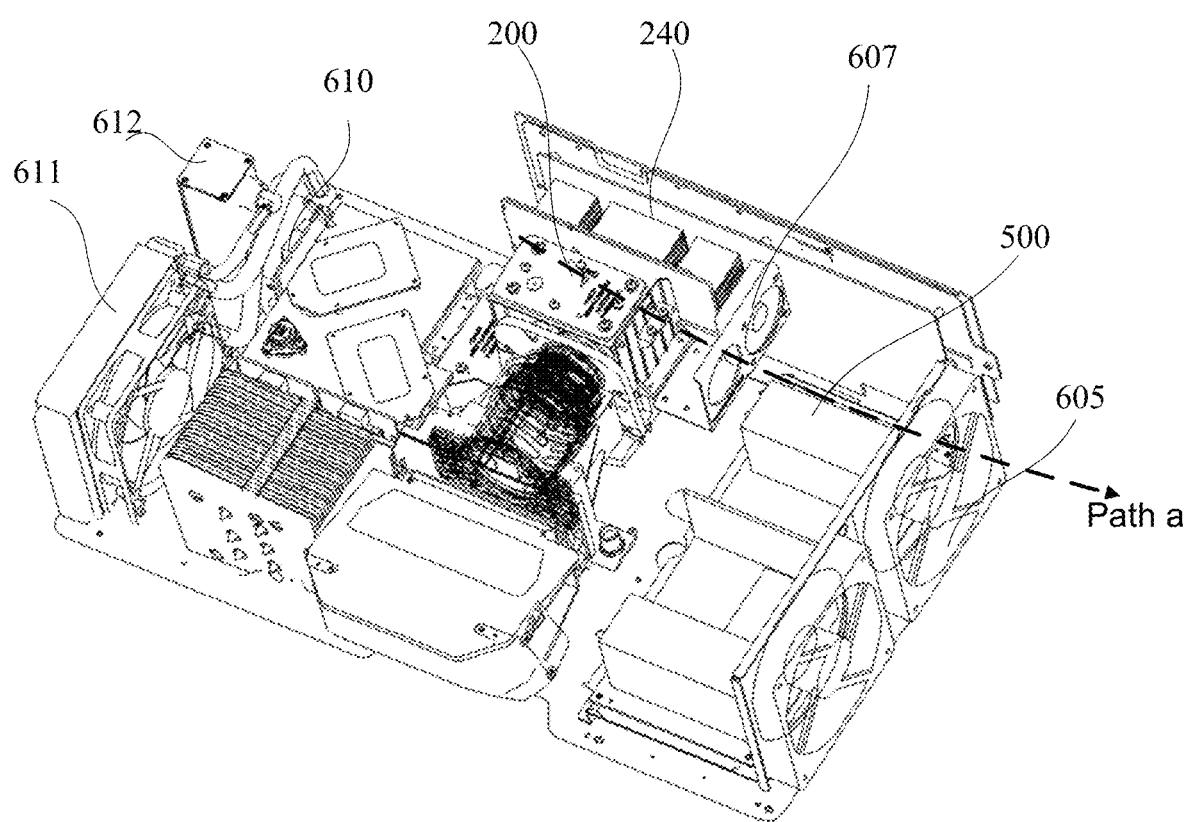
FIG. 6B is a schematic diagram of a heat dissipation path a, in accordance with some embodiments of the present disclosure.
Figure 6C:
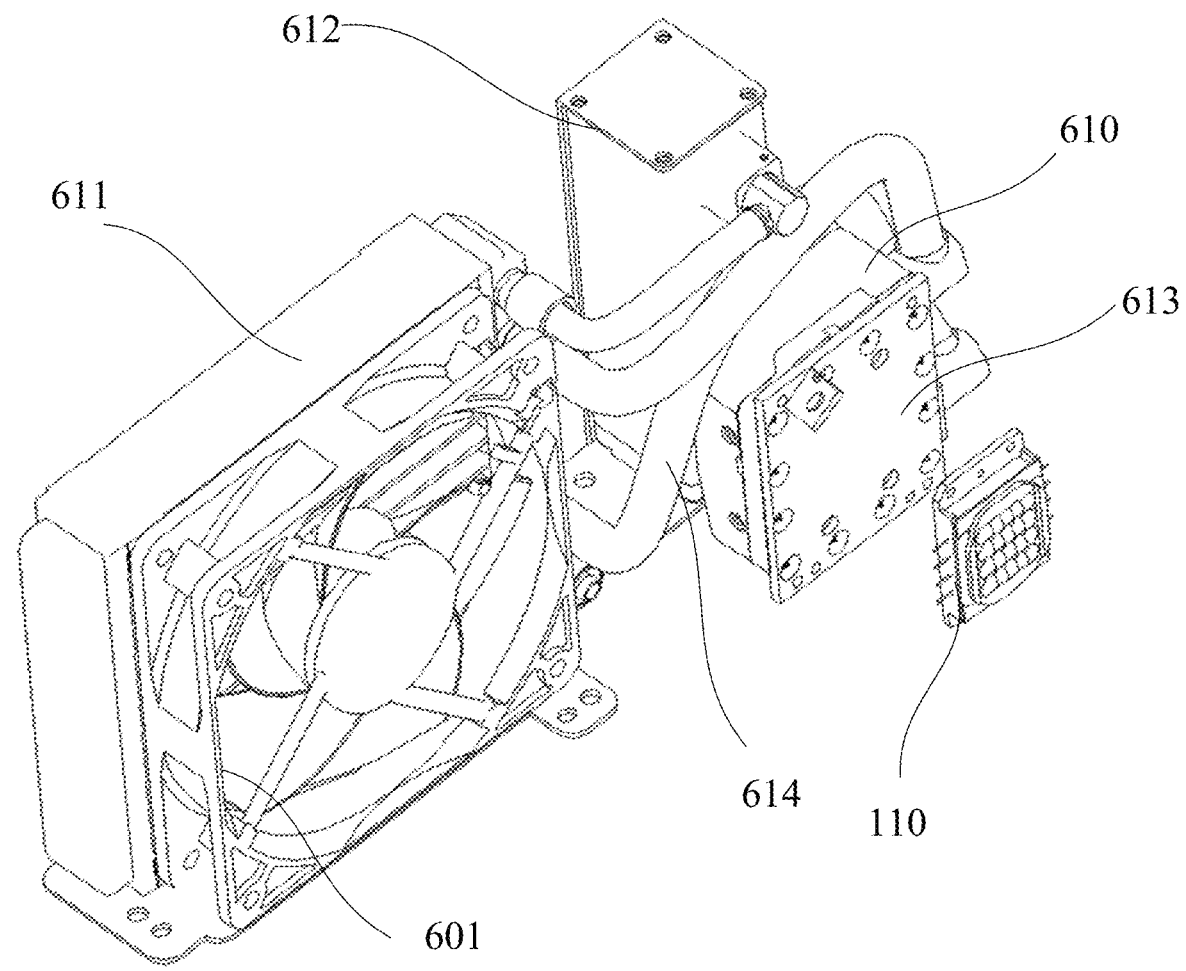
FIG. 6C is a schematic diagram of a heat dissipation system of a red laser assembly, in accordance with some embodiments of the present disclosure.
Figure 6D:
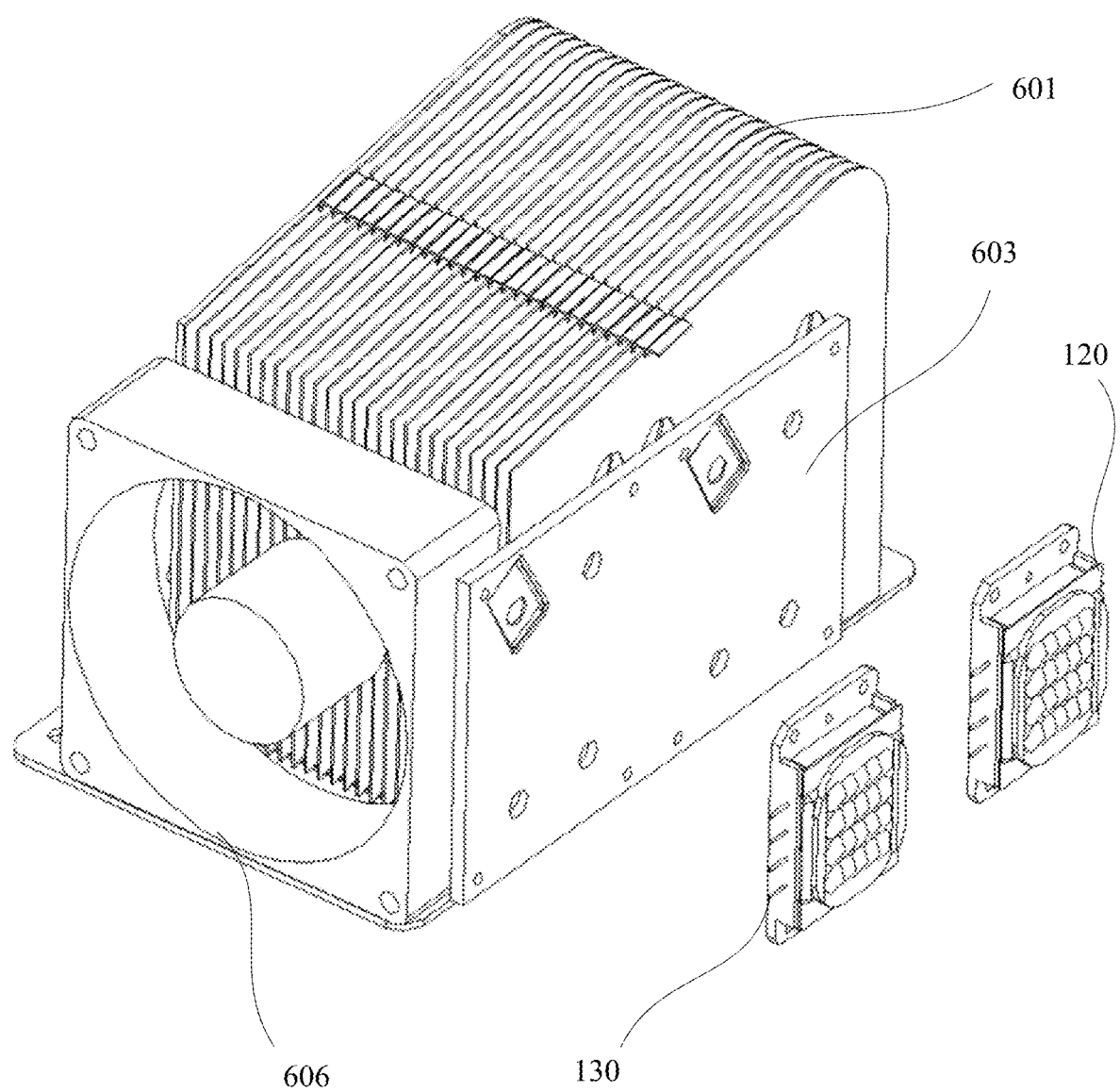
FIG. 6D is a schematic assembly diagram of a heat dissipation system of a blue laser assembly and a green laser assembly, in accordance with some embodiments of the present disclosure.
Figure 6E:
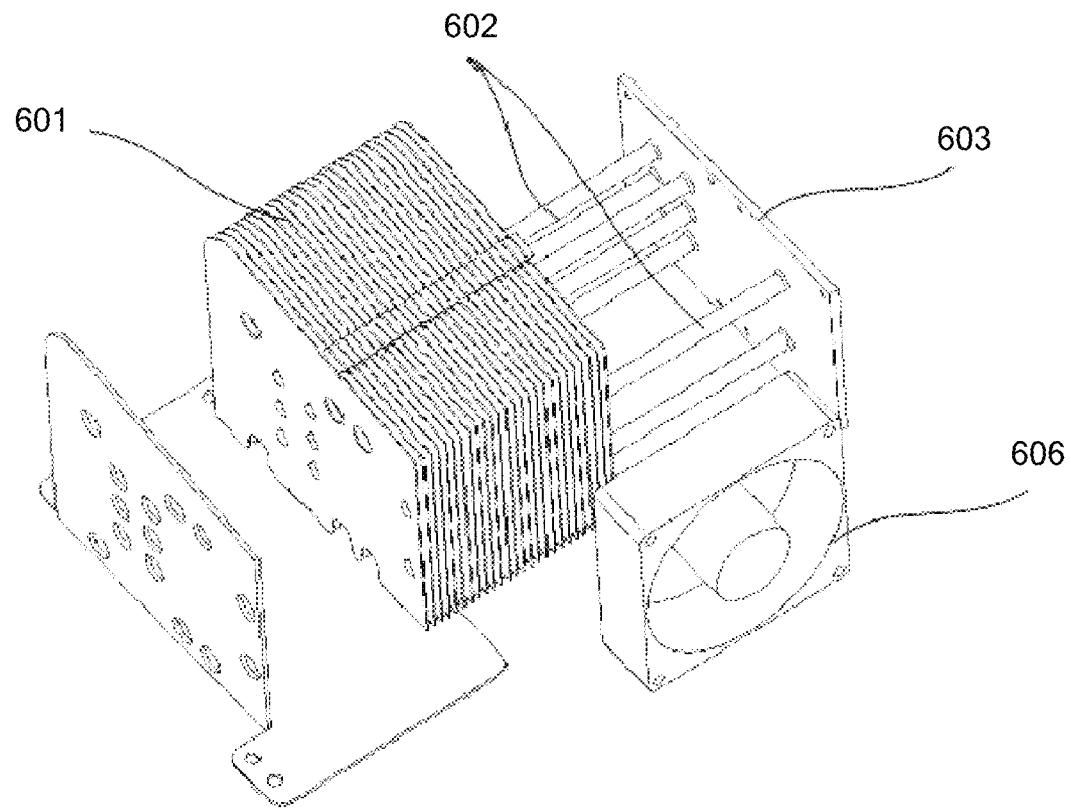
FIG. 6E is a schematic exploded diagram of a heat dissipation system of a blue laser assembly and a green laser assembly, in accordance with some embodiments of the present disclosure.

As shown in FIGS. 6D and 6E, the second heat dissipation device further includes a heat conduction block 603. The heat conduction block 603, the blue laser assembly 120 and the green laser assembly 130 are both in contact with a heat sink, so that heat is able to be conducted through the heat sink. The heat pipe(s) 602 are closed pipe(s) with a liquid inside, and heat conduction is achieved through a gas-liquid change of the liquid. Hot end(s) of the heat pipe(s) 602 are in contact with the heat conduction block 603 to achieve a heat transfer, and cold end(s) of the heat pipe(s) 602 are in contact with the heat dissipation fin(s) 601. The heat dissipation fin(s) 601 in contact with the cold end(s) of the heat pipe(s) 602 are usually cooled by means of air-cooling, so that the cold end(s) of the heat pipe(s) 602 are also cooled, and the gas is liquefied and returned to the hot end(s) of the heat pipe(s) 602. For example, there are a plurality of heat dissipation fins 601 and a plurality of heat pipes 602. The plurality of heat pipes 602 are arranged in parallel, and the plurality of heat dissipation fins 601 are wrapped on the plurality of heat pipes 602 arranged in parallel.

As shown in FIGS. 6A-1, 6A-2, and 6C, the laser projection apparatus further includes a first heat dissipation device, and the first heat dissipation device is located at a side of the laser source and a second heat dissipation device that is away from the optical engine and the lens. The first heat dissipation device includes a cooling head 610, a cooling drain 611, and pipes 614. The cooling head 610 is in contact with a side wall of the laser source housing 102 opposite to the first laser outlet 103 of the laser source 100. In some embodiments of the present disclosure, the side wall of the laser source housing 102 opposite to the first laser outlet 103 of the laser source 100 is provided with the red laser assembly 110, and the red laser assembly 110 is in contact with the cooling head 610. The cooling drain 611 is away from the red laser assembly 110. For example, the cooling drain 611 is disposed at a side of the second heat dissipation device away from the lens. The cooling head 610 and the cooling drain 611 are connected through one of the pipes 614, so that a cooling medium in the pipe 614 is circulated between the cooling head 610 and the cooling drain 611, and heat of the red laser assembly 110 may be dissipated in a liquid-cooling manner. For example, the cooling medium at the cooling drain 611 may be cooled by a fan. The cooled cooling medium, such as water that is usually used, flows back to the cooling head 610 again, and is sequentially circulated to conduct heat to the heat source (such as the red laser assembly 110). The first heat dissipation device further includes a pump configured to drive the cooling medium in the pipes 614 to keep flowing. In some embodiments of the present disclosure, an integrated arrangement of the pump and the cooling head is beneficial to reduce a volume of the component. The cooling head mentioned below may refer to an integrated structure of the cooling head and the pump.

The laser projection apparatus in some embodiments of the present disclosure further includes a liquid replenisher configured to replenish liquid to the first heat dissipation device, so that a pressure of the liquid in the first heat dissipation device is greater than a pressure outside the first heat dissipation device. In this way, external air will not enter a circulation system even if there is a volatilization of the cooling medium or a poor air-tightness of a connection between the pipes and other components, so that it will not cause noise in the circulation system and not cause a cavitation phenomenon and damage the device.

The cooling head 610 and the cooling drain 611 both have a smaller volume than a conventional heat dissipation fin, and both have more selections in terms of shape, structure and mounting position. Since the cooling head 610 and the cooling drain 611 are connected through the pipe 614 and always belong to a single circulation system, the cooling drain 611 may be disposed proximate to the cooling head 610, or have other relative positional relationships with the cooling head 610, which is determined by space of the laser projection apparatus. Therefore, the first heat dissipation device has more selections compared with the second heat dissipation device.

In some embodiments of the present disclosure, as shown in FIG. 6B, the cooling drain 611 and the liquid replenisher 612 are both arranged proximate to one side wall of the apparatus housing 101. The cooling drain 611 has a larger volume than the liquid replenisher 612 and the cooling head 610. Therefore, the liquid replenisher 612 and the cooling head 610 are arranged at one place, and the cooling drain 611 and both of the liquid replenisher 612 and the cooling head 610 are arranged side by side inside the apparatus housing 101.

As shown in FIG. 1B, a plurality of circuit boards 500 and second fan(s) 605 are further disposed in the space enclosed by the optical engine 200, the lens 300, and another portion of the apparatus housing 101. The second fan(s) 605 are disposed proximate to the apparatus housing 101, that is, the second fan(s) 605 are located at a side of the plurality of circuit boards 500 away from the optical engine 200 and the lens 300. There may be one or more second fans.

According to an airflow direction, the laser projection apparatus in some embodiments of the present disclosure has two main heat dissipation paths, that is, path a and path b. Heat of the core component of the optical engine, the DMD chip, is conducted along path a. Heat of the laser source 100 may be simultaneously conducted along path a and path b, and heat conducted along path b is more.

In the laser projection apparatus, the laser source 100 is disposed at a left side of the laser projection apparatus, the optical engine 200 and the lens 300 are disposed in a middle of the laser projection apparatus, and the circuit boards are disposed at a right side of the laser projection apparatus. The air flows from left to right whether along path a or path b, and a main path of path a is substantially parallel to a main path of path b.

In the laser projection apparatus, the laser source 100 is a pure three-color laser source, and the laser assemblies of different colors included in the laser source have different operating temperature requirements. An operating temperature of the red laser assembly is less than 50° C., and operating temperatures of the blue laser assembly and the green laser assembly are less than 65° C. An operating temperature of the DMD chip in the optical engine is usually controlled at approximately 70° C., and an operating temperature of the lens is usually controlled below 85° C. Since operating temperatures of different electronic devices are different, an operating temperature of the circuit board is usually between 80° C. and 120° C. It will be seen that, temperature tolerance values of the optical portions are different from temperature tolerance values of the circuit portions, and operating temperature tolerance values of the optical portions are usually lower than those of the circuit portions, Therefore, the air is blown from the optical portions to the circuit portions, and a purpose of heat dissipation of the two portions may be achieved, and respective normal operations may be maintained.

As shown in FIG. 6B, path a is located in an upper half of the laser projection apparatus. Air in path a mainly takes away heat of the laser valve in the optical engine 200, flows through a portion of the circuit boards 500, and is discharged out of the apparatus housing through the second fan(s) 605. In addition, the heat of the laser valve (the DMD chip) may be dissipated through a radiator 240 in an air-cooling manner through a fourth fan 607, so that the air flows through a portion of the circuit boards along path a. The second fan(s) 605 are air intake fan(s), and a direction of air formed by the second fan(s) 605 is the same as a direction of air formed by the fourth fan 607, so that the air formed by the fourth fan 607 may still have a very high flow velocity after flowing through the radiator 240 and the plurality of circuit boards, and hot air may be smoothly discharged out of the apparatus housing 101.

As shown in FIG. 1B, path b is located in a lower half of the laser projection apparatus. In the laser projection apparatus shown in FIG. 1B, the cooling drain 611 and the heat dissipation fins 601 are sequentially arranged along a direction of path b. The cooling drain 611 is disposed at one side of the heat dissipation fins 601 and the lens 300 is disposed at another side of the heat dissipation fins 601. In order to dissipate heat of the cooling drain 611 and the heat dissipation fins 601 in time, a first fan 604 is disposed between the cooling drain 611 and the heat dissipation fins 601. The first fan 604 is an air intake fan for the cooling drain 611, and is a blower fan for the heat dissipation fins 601. The first fan 604 absorbs the heat of the cooling drain 611 to form a first stream of air, and the first stream of air is blown to the heat dissipation fins 601. The heat dissipation fins 601 have a plurality of sets of air channels that are parallel. After the first stream of air flows through surfaces of these heat dissipation fins and the air channels inside these heat dissipation fins, a second stream of air is formed, and the second stream of air is then blown to the lens 300. The second stream of air may flow along a space around a housing of the lens 300 and a bottom space of the housing of the lens 300, and take away heat on a surface of the housing of the lens.

It will be noted that, since the operating temperature of the red laser assembly is less than 50° C., for example, in a case where the operating temperature is controlled below 45° C., the liquid-cooling manner is used. A difference between a surface temperature of the cooling drain and a surface temperature of the cooling head is controlled within a range of 1° C. to 2° C. That is, if the surface temperature of the cooling head is 45° C., the surface temperature of the cooling drain is within a range of 43° C. to 44° C. The surface temperature of the cooling head refers to a temperature of a surface where the cooling head is in contact with a heat sink of the red laser assembly. For example, the first fan takes in air with an ambient temperature, and the ambient temperature is usually within a range of 20° C. to 25° C. The heat of the cooling drain is dissipated in the air-cooling manner, and the surface temperature of the cooling drain is reduced to 43° C. The operating temperatures of the blue laser assembly and the green laser assembly are below 65° C., and thus a temperature of the heat dissipation fins needs to be within a range of 62° C. to 63° C. A difference between the temperature of the heat dissipation fins and temperatures of the heat sinks of the blue laser assembly and the green laser assembly is in a range of 2° C. to 3° C. It will be seen that, the temperature of the cooling drain is lower than the temperature of the heat dissipation fins. Therefore, the cooling drain is disposed at a front end of the heat dissipation path and is also located in front of the heat dissipation fins in the heat dissipation path. The air formed by rotation of the fan is blown to the heat dissipation fins again after the heat of the cooling drain is dissipated by using the air formed by rotation of the fan, and may still be used to dissipate heat of the heat dissipation fins.

Similarly, the operating temperature of the lens is controlled at 85° C., and the temperature of the heat dissipation fins is 63° C., which is still lower than the operating temperature of the lens. Therefore, the second stream of air after passing through the heat dissipation fins is still a cold stream of air relative to the lens, and may be used for heat dissipation. An operating temperature of the circuit boards is usually higher than the operating temperature of the lens. Therefore, air after a heat dissipation on the lens is still cold air relative to most of the circuit boards, which may still continue to flow through a plurality of circuit boards for heat dissipation.

In path b, since there are a plurality of heat source components that need heat dissipation, and a resistance of the air is also large, in order to increase the flow velocity, and quickly discharge the hot air in this path out of the apparatus housing, the second fans 605 are also disposed at an air outflow side of the circuit boards proximate to the apparatus housing. In this case, there are a plurality of second fans 605. A portion of the second fans 605 are configured to form the heat dissipation path a, and the other portion of the second fan 605 and the first fan 604 jointly drive the air to sequentially flow through the cooling drain 611, the heat dissipation fins 601, the lens 300 and at least a portion of the circuit boards 500 so as to form the heat dissipation path b.

It will be noted that, the first fan may also be disposed at a front end of the cooling drain. That is, the first fan may be disposed between the apparatus housing and the cooling drain. In this case, the first fan is a blower fan relative to the cooling drain. That is, air blown by the first fan is first blown to the cooling drain, and then to the heat dissipation fins.

Only in a case where the air flows can it take away the heat. As shown in FIG. 6A-2, in order to increase a flow velocity of the air for heat dissipation, a third fan 606 may be disposed between the heat dissipation fins and the lens. The third fan 606 is an air intake fan for the heat dissipation fins 601 and is a blower fan for the lens 300. In this way, the second stream of air is accelerated, that is, a flow velocity of the second stream of air is increased, and a capability of the second stream of air to carry heat is also improved. Cooperating with air intake of the second fans 605, the third fan 606 blows the second stream of air to the circuit boards and discharges the second stream of air out of the apparatus housing through the second fans 605.

In heat dissipation path a or heat dissipation path b, the air substantially flows linearly, and rarely detours and turns, which may reduce the resistance of the air, and facilitates the air carrying the heat to flow away at a fast flow velocity, and facilitates the heat dissipation of the heat source components.

In some embodiments of the present disclosure, operating temperature threshold values of the cooling drain, the heat dissipation fins, the lens, and the circuit boards are progressively increased. Arrangement manners of the above structures are also beneficial to design the heat dissipation paths. In this way, the air for heat dissipation can flow from a component with a low operating temperature threshold value to a component with a high operating temperature threshold value. In a same heat dissipation path, heat may be dissipated from a plurality of heat source components in sequence, which may not only meet heat dissipation requirements of the plurality of heat source components, but also improve a heat dissipation efficiency of the laser projection apparatus.

In addition, it will be noted that the cooling drain may also be disposed in the heat dissipation path a. That is, the cooling drain is located in a same heat dissipation path as the DMD chip. In order to improve a heat transfer coefficient, a structural improvement may be performed on the surface of the heat dissipation fins to increase a heat dissipation area, or to increase the flow velocity of the air, so as to improve a heat dissipation capability.

In the laser projection apparatus provided by the above embodiments, a range of a luminous power of the red laser assembly may be 24 W to 56 W, a range of a luminous power of the blue laser assembly may be 48 W to 115 W, and a range of a luminous power of the green laser assembly may be 12 W to 28 W. For example, the luminous power of the red laser assembly is 48 W, the luminous power of the blue laser assembly is 82 W, and the luminous power of the green laser assembly is 24 W. The laser assemblies of the three colors are all MCL laser assemblies. Compared with a BANK laser assembly, a volume of the MCL laser assembly is smaller at a same luminous power.

According to the above description, in the laser projection apparatus, heat radiation requirements of the laser source 100 are the most stringent, and the laser source 100 is a portion whose operating temperature is relatively low in the entire apparatus. The operating temperature of the red laser assembly is lower than the operating temperature of the blue laser assembly and the operating temperature of the green laser assembly, which is determined by a light-emitting principle of the red laser beam. The blue laser beam and the green laser beam are generated by using a gallium arsenide light-emitting material, and the red laser beam is generated by using a gallium nitride light-emitting material. The red laser beam has a low luminous efficiency and generates a great amount of heat. Requirements for a temperature of the light-emitting material of the red laser beam are also very stringent. Therefore, in a case where heat of a laser source component composed of the lasers of the three colors is dissipated, different heat dissipation structures need to be provided according to requirements for temperatures of different laser assemblies. In this way, a laser of each of the three colors may be ensured to be in a good operating state, and service lives of the laser assemblies are increased, and luminous efficiencies of the laser assemblies are more stable.

A temperature difference between a hot end and a cold end of the heat source may be controlled at approximately 3° C. by using an air-cooling heat dissipation manner, and a temperature difference controlled by using a liquid-cooling heat dissipation manner may be more accurate and within a smaller range, such as with a range of 1° C. to 2° C. Heat of the red laser assembly with a lower operating temperature threshold value is dissipated by using the liquid-cooling manner (i.e., by using the first heat dissipation device), and heat of the blue laser assembly and the green laser assembly with relatively higher operating temperature threshold values are dissipated by using the air-cooling manner (i.e., by using the second heat dissipation device). In this way, the heat of the laser source may be dissipated with a lower heat dissipation cost in a case of meeting requirements for the operating temperature of the red laser assembly, and a smaller temperature difference control is met, and requirements for rotation speeds of the fans may be reduced. Moreover, a cost of a component using the air-cooling heat dissipation manner is lower than that of a component using the liquid-cooling heat dissipation manner.

Therefore, in the laser projection apparatus in some embodiments of the present disclosure, the heat of the laser source is dissipated by using a mixed manner of the liquid-cooling manner and the air-cooling manner, which may meet the operating temperatures of different laser assemblies, and is economical and reasonable.

In some embodiments, referring to FIG. 6C, a metal substrate on a back of the red laser assembly 110 is connected to the cooling head 610 through the first heat conducting block 613. An area of the first heat conducting block 613 is greater than an area of a heat conduction surface of the cooling head 610. The area of the first heat conducting block 613 is also greater than an area of a heat conducting surface of the heat sink on the back of the red laser assembly 110. In this way, heat of the heat sink of the laser assembly is quickly concentrated and transferred to the cooling head 610, and a heat conduction efficiency is improved.

In the heat dissipation system shown in FIG. 6C, an outlet of the cooling head 610 is connected to an inlet of the cooling drain 611 through one of the pipes 614, and an outlet of the cooling drain 611 is connected to an inlet of the cooling head 610 through another of the pipes 614. The liquid replenisher 612 is also disposed in the first heat dissipation device composed of the cooling head 610, the cooling drain 611 and the pipes 614. As mentioned earlier, the liquid replenisher 612 is used to circularly replenish a coolant for the system. Therefore, the liquid replenisher may be provided at a plurality of positions in an entire circulation system. According to factors such as structure and space of the system, there may be one or more liquid replenishers, each of which may be connected to the pump, or may be disposed proximate to the cooling drain 611.

In some embodiments of the present disclosure, the operating temperature of the blue laser assembly is the same as the operating temperature of the green laser assembly, and the two laser assemblies share a single heat dissipation fin structure. For example, as shown in FIGS. 6D and 6E, the heat sinks on backs of the blue laser assembly 120 and the green laser assembly 130 are in contact with the heat pipes 602 through the heat conducting block 603, and the heat pipes 602 extend into the heat dissipation fins 601. Corresponding to the laser assemblies of different colors, for example, a portion of the heat conducting block 603 corresponding to the blue laser assembly 120 is a second heat conducting block for ease of distinction, and a portion of the heat conducting block 603 corresponding to the green laser assembly 130 is a third heat conducting block. The second heat conducting block and the third heat dissipation conducting block may be two separate components to respectively conduct heat for different laser assemblies. Or, the second heat conducting block and the third heat dissipation conducting block may be of a whole structure, which facilitates an installation, and in a case where heat dissipation requirements of the two laser assemblies are the same, it is also easy to control the temperatures.

In some embodiments, there are a plurality of heat pipes, and the number of heat pipes corresponding to the blue laser assembly is the same as the number of heat pipes corresponding to the green laser assembly. For example, the plurality of heat pipes are straight heat pipes. A plurality of through holes are disposed inside the heat dissipation fins 601 for inserting the plurality of heat pipes. The heat dissipation fins 601 are disposed proximate to the blue laser assembly and the green laser assembly. In this way, the plurality of heat pipes may be directly inserted into the heat dissipation fins 601 without bending. Moreover, the straight heat pipes are beneficial to reduce a transmission resistance during the gas-liquid change inside the heat pipes, and are helpful to improve the heat conduction efficiency.

Through the above combined heat dissipation structure, the heat of the laser source may be dissipated, thereby ensuring a normal operation of the laser source of the three-color. The laser source emits the laser beams of the three colors to provide high-quality illumination beams, and the laser beams of the three colors are projected to form a projected image with a high luminance and a good color. Since the laser assemblies of the three colors are arranged at different spatial positions, in a cavity of the laser source, a plurality of optical lenses are needed to combine laser beams in different directions, and to perform a laser processing such as homogenization.

In the laser projection apparatus provided by some embodiments of the present disclosure, and in the schematic diagram showing a principle of a laser path of a laser source shown in FIG. 5G, the green laser beam emitted from the green laser assembly 130 is incident on a second laser combining lens 107 after being reflected by a first laser combining lens 106. The blue laser beam emitted from the blue laser assembly 120 transmits the second laser combining lens 107, and the green laser beam is reflected and output by the second laser combining lens 107. In this way, the blue laser beam and the green laser beam may be combined and then output through the second laser combining lens 107.

An output direction of the blue laser beam and the green laser beam that are output through the second laser combining lens 107 is perpendicular to an output direction of the red laser beam emitted from the red laser assembly 110, and the two output directions have a junction. A third laser combining lens 108 is provided at a junction of the three laser beams. The third laser combining lens 108 is able to transmit the red laser beam, and reflect the green laser beam and the blue laser beam. After being processed through the third laser combining lens 108, the laser beams of the three colors form a single laser beam. The single laser beam enters a homogenizing component 109, and exits from the laser outlet of the laser source 100 after shrinking by a converging lens group 111.

In a structure of the laser source as shown in FIG. 5B, the blue laser assembly 120 and the green laser assembly 130 are installed side by side on a side wall of the laser source housing 102. The red laser assembly 110 is installed on another side wall of the laser source housing 102, and the two side walls of the laser source housing are perpendicular to each other. The laser assemblies of the three colors respectively output rectangular laser spots. After each laser assembly is installed on the side wall of the laser source housing 102, a long side of a rectangular light spot correspondingly output by the laser assembly is perpendicular to the bottom wall of the laser source housing 102.

The laser source housing 102 is further provided with a plurality of laser combining lenses and a converging lens group therein. The first laser combining lens 106 is disposed to be inclined toward a light-emitting surface of the green laser assembly 130 and reflects the green laser beam to the second laser combining lens 107. The second laser combining lens 107 is disposed to be inclined toward a light-emitting surface of the blue laser assembly 120, and transmits the blue laser beam and reflects the green laser beam to the third laser combining lens 108. The first laser combining lens 106 and the second laser combining lens 107 are arranged substantially in parallel, and are arranged at 45 degrees to light-emitting surfaces of corresponding laser assemblies. The first laser combining lens 106 and the second laser combining lens 107 are clamped to the bottom wall of the laser source housing 102 through bases. In addition, considering an assembly tolerance, installation angles of the first laser combining lens 106 and the second laser combining lens 107 may also be fine-tuned, for example, within a range of plus or minus 3 degrees (i.e., −3° to +3°).

The third laser combining lens 108 is disposed to be inclined toward a light-emitting surface of the red laser assembly 110. Here, the third laser combining lens 108 is approximately at an angle of 135 degrees to an optical axis of the red laser beam, that is, the third laser combining lens 108 is substantially perpendicular to the second laser combining lens 107. The third laser combining lens 108 transmits the red laser beam and reflects the blue laser beam and the green laser beam, and combines the laser beams of the three colors and then output the laser beam combined to the converging lens group 111. The third laser combining lens 108 is disposed proximate to the converging lens group 111. Similarly, the third laser combining lens 108 is also clamped to the bottom wall of the laser source housing 102 through a base, and is configured in a way that an installation angle is adjustable within a range of 3 degrees.

For example, the first laser combining lens is a reflector, and the second laser combining lens and the third laser combining lens are both dichroic lenses.

Laser reflectivities of the second laser combining lens and third laser combining lens are both greater than their laser transmittances. For example, the laser reflectivities of the two laser combining lenses for respective optimized color lights may reach 99%, and the laser transmittances of the two laser combining lenses for respective optimized color light are usually within a range of 95% to 97%.

The laser assemblies of the three colors provided by some embodiments of the present disclosure are all MCL laser assemblies. As shown in FIG. 5F-1, a MCL laser of each MCL laser assembly includes a plurality of laser-emitting chips encapsulated on a metal substrate. Due to different laser-emitting principles, luminous powers of laser-emitting chips of different colors are also different. For example, a luminous power of each green chip is approximately 1 W, while a luminous power of each blue chip is above 4 W. In a case where the lasers of the three colors include a same number of chips, for example, the laser-emitting chips of the lasers of the three colors are encapsulated in a 4×6 array, overall luminous powers of the lasers are also different. For example, the luminous power of the green laser assembly is less than that of the red laser assembly, and is also less than that of the blue laser assembly. The luminous power of the red laser assembly is less than that of the blue laser assembly.

Figure 7:
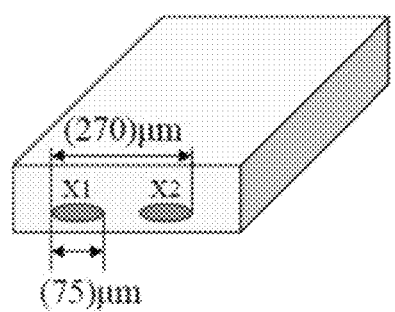
FIG. 7 is a schematic diagram showing a structure of a light-emitting chip of a red laser assembly, in accordance with some embodiments of the present disclosure.

In the above example, the laser-emitting chips of the red laser assembly, the blue laser assembly and the green laser assembly are encapsulated in a same array, for example, in a 4×6 array. However, due to a different laser-emitting principle of a red laser-emitting chip, as shown in FIG. 7, there are two laser-emitting points (X1 and X2, a size of X1 being 75 μm, and a distance between an outer edge of X1 and an outer edge of X2 being 270 μm) at a single red laser-emitting chip, which makes divergence angles of the red laser beam in a fast axis direction and a slow axis direction greater than those of the blue laser beam and those of the green laser beam. The optical lens has a certain laser receiving range or has a better laser processing performance in a certain angle range. During a transmission in the laser path, due to large divergence angles of the red laser beam, as for a red laser beam passing through a same optical lens, the longer the laser path that the red laser beam passes through, the more serious a divergence degree of the red laser beam is. As a result, an efficiency of processing the red laser beam of follow-up optical lenses is reduced. Although the luminous power of the red laser assembly is greater than the luminous power of the green laser assembly, a laser loss rate of the red laser beam is greater than that of the green laser beam and that of the blue laser beam after the laser beams of the three colors pass through laser paths having a same length. A ranking of the laser loss rates is that: the laser loss rate of the red laser beam is greater than the laser loss rate of the green laser beam, and the laser loss rate of the green laser beam is greater than the laser loss rate of the blue laser beam (the laser loss rate of the red laser beam>the laser loss rate of the green laser beam>the laser loss rate of the blue laser beam). A ranking of the luminous powers is that: the luminous power of the green laser assembly is less than the luminous power of the red laser assembly, and the luminous power of the red laser assembly is less than the luminous power of the blue laser assembly (the luminous power of the green laser assembly<the luminous power of the red laser assembly<the luminous power of the blue laser assembly).

In the structure of the laser source 100 shown in FIG. 5B, the laser-emitting surface of the red laser assembly 110 faces the first laser outlet 103 of the laser source 100. After the red laser beam is emitted from the laser-emitting surface of the red laser assembly 110, the red laser beam passes through the homogenizing element 109 and the converging lens group 111 after being transmitted once, and then exits from the first laser outlet 103. The blue laser beam passes through the homogenizing element 109 and the converging lens group 111 after being transmitted once and being reflected once, and then exits from the first laser outlet 103. The green laser beam passes through the homogenizing element 109 and the converging lens group 111 after being reflected three times, and exits from the first laser outlet 103. It will be seen that, before the laser beams output from the first laser outlet 103 of the laser source 100, the laser path of the red laser beam is shorter than the laser paths of the blue laser beam and the green laser beam. In this way, a laser loss of the red laser beam during the transmission in the laser path may be reduced. And, without considering an influence of the laser path on the laser loss, a ratio of laser energy of the red laser beam after passing through the third laser combining lens to laser energy of the red laser beam before passing through the third laser combining lens (i.e., a laser energy efficiency) may reach approximately 97%×1=97%. It will be noted that, as for a calculation of the laser energy efficiency of the red laser beam here, a situation in which the red laser beam has large divergence angles and there is a laser loss of a large angle is not considered, and only influences of the transmittance and the reflectivity of the optical lens are considered.

The green laser beam is reflected three times. In a case of only considering influences of the transmittance and the reflectivity on the laser loss, a ratio of laser energy of the green laser beam after passing through the third laser combining lens may reach approximately 99%×99%×99%≈97%. After the blue laser beam is transmitted and reflected once, a ratio of laser energy of the blue laser beam after passing through the third laser combining lens may reach approximately 99%×97*≈96%. The laser path of the blue laser beam is shorter than the laser path of the green laser beam. Therefore, comprehensively considering losses of the transmittances and the reflectivities of the laser beams due to optical elements and losses of the laser beams due to different lengths of the laser paths, the laser loss rates of the blue laser beam and the green laser beam after passing through the third laser combining lens are substantially regarded as the same, and are very close to the laser loss rate of the red laser beam after passing through the third laser combining lens. Therefore, based on the layouts of the laser assemblies of the three colors, and under different optical characteristics of the lasers of three colors, the losses of the laser beams of respective colors in the transmission process may be well balanced, so that a power ratio of the laser beams of the three colors are close to a preset value, and no obvious imbalance will occur, which is also conducive to achieving a color ratio conforming to a theoretical design and a desired white balance. After the laser beams of the three colors are combined and then output from the third laser combining lens, the laser paths that the laser beams of the three colors pass through are the same, and thus it is easy for the laser beams of the three colors to have a same laser loss.

The arrangements of the laser assemblies of the three colors described above are also beneficial to dissipate heat of the red laser assembly, the blue laser assembly and the green laser assembly according to different heat dissipation requirements. The red laser assembly is very sensitive to temperature, and the operating temperature is usually controlled below 50° C. The operating temperatures of the blue laser assembly and the green laser assembly are higher than that of the red laser assembly. There is a relatively obvious temperature difference between the operating temperatures of the laser assemblies of the two colors and the operating temperature of the red laser assembly, and the operating temperatures of the laser assemblies of two colors are usually controlled below 65° C. In this way, as for the blue laser assembly and the green laser assembly with same temperature control requirements, arranging the blue laser assembly and the green laser assembly together is also beneficial to share the heat dissipation structure for heat dissipation. The red laser assembly is separately located at another position of the laser source housing, and is spaced apart from the blue laser assembly and the green laser assembly by a certain distance, which may reduce heat radiations of the blue laser assembly and the green laser assembly as high-temperature heat sources to the red laser assembly as a low-temperature heat source, and reduce a heat load of the red laser assembly.

The above laser assemblies are all MCL laser assemblies. Compared with the conventional BANK laser assembly, the MCL laser assembly is significantly smaller in size. Therefore, in some embodiments of the present disclosure, the laser source 100 of the laser projection apparatus shown in FIGS. 1A and 5B has a volume that is significantly smaller than a volume in a case where the conventional BANK laser assembly is used. Thus, more space may be reserved near the laser source 100 and it facilitates a heat dissipation design. For example, positions of the radiator and the fans may be more flexible, and structures such as the circuit boards may also be further provided. It is also beneficial to reduce a length of the laser projection apparatus in a certain direction or a volume of the laser projection apparatus.

As a variation of FIG. 5G, different from the laser path shown in FIG. 5G, positions of the blue laser assembly and the green laser assembly may also be changed, for example, as shown in FIG. 5H. The positions of the blue laser assembly 120 and the green laser assembly 130 are reversed, so that the green laser assembly 130 is more proximate to the red laser assembly 110 than the blue laser assembly 120. In this case, the first laser assembly is the red laser assembly 110, and the first laser beam is the red laser beam. The second laser assembly is the green laser assembly 130, and the second laser beam is the green laser beam. The third laser assembly is the blue laser assembly 120, and the third laser beam is the blue laser beam. The green laser assembly 130 is disposed facing the second laser combining lens 107, and the blue laser assembly 120 is disposed facing the first laser combining lens 106. In this way, according to the above calculations of the transmittances and the reflectivities, the laser energy loss of the green laser beam is 1−97%×99%≈4%, and the laser energy loss of the blue laser assembly is 1−99%×99%×99%≈3%. Since the laser path of the green laser beam is shorter than the laser path of the blue laser beam, the laser loss rates of the green laser beam and the blue laser beam may be regarded as almost the same as a whole.

In the above embodiments, by providing the red laser assembly proximate to the laser outlet of the laser source, the blue laser beam and the green laser beam merge with the red laser beam after passing through deflected laser paths, so that the laser path of the red laser beam is the shortest, which may reduce the laser loss of red laser beam during the transmission. And the red laser beam is only transmitted by the optical element once, and the blue laser beam and the green laser beam are respectively transmitted and reflected for a plurality of times, and thereby the red laser beam has the lowest loss of the transmittance. Therefore, it may be ensured that the laser loss of the red laser beam before a combination of the laser beams is reduced as much as possible, which is beneficial to maintain a proportional relationship between powers of the laser beams of the three colors and a proportional relationship between colors of the laser beams of the three colors, so that the white balance of the system is close to a theoretical set value, and a high quality of the projected image is achieved.

Referring to FIGS. 5B, 5G and 5H, the laser source in some embodiments is applied to the laser projection apparatus. After passing through a laser combining lens group (the laser combining lens group includes the first laser combining lens 106, the second laser combining lens 107, and the third laser combining lens 108), the laser beams of the three colors also need to pass through the homogenizing element and the converging lens group to homogenize and shrink the laser beams, so as to improve laser collection efficiency and homogenization efficiency of a laser receiving element in the optical engine.

Figure 9A:
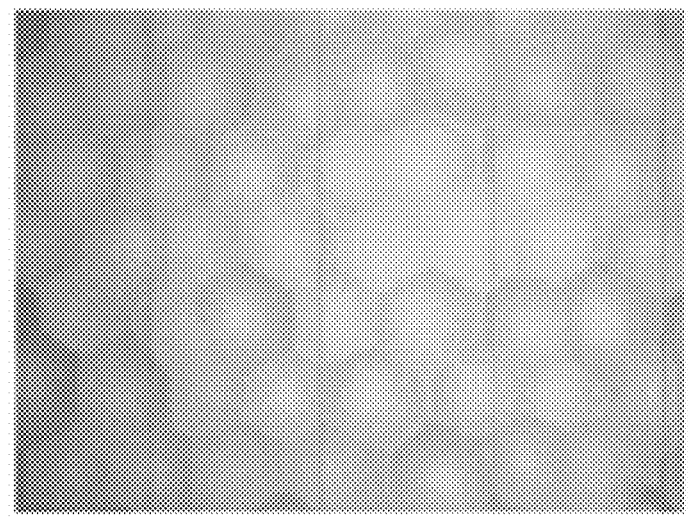
FIG. 9A is a schematic diagram showing a structure of a diffusion sheet, in accordance with some embodiments of the present disclosure.
Figure 9B:
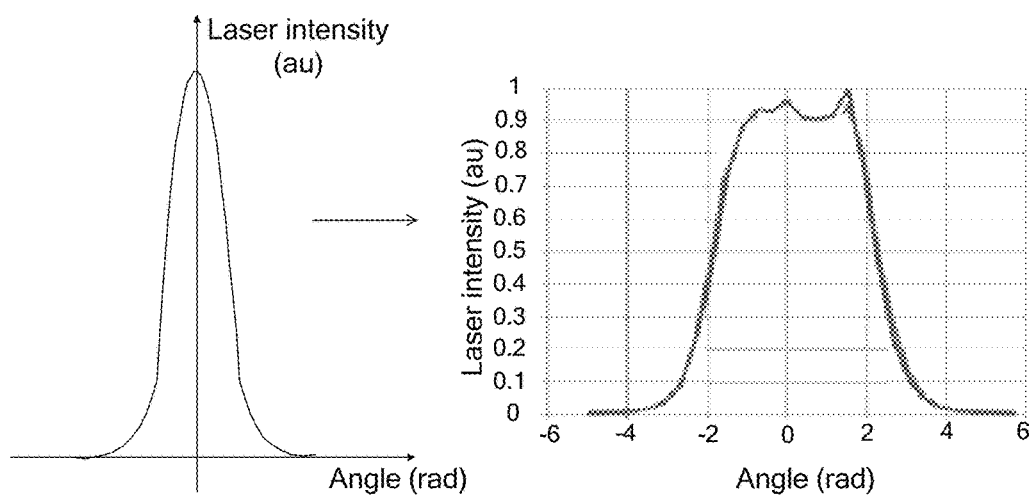
FIG. 9B is a schematic diagram showing an energy distribution of a laser beam after passing through the diffusion sheet shown in FIG. 9A, in accordance with some embodiments of the present disclosure.

In some embodiments, as shown in FIGS. 5B, 5G and 5H, the laser source 100 further includes the homogenizing element 109 and the converging lens group 111. The homogenizing element 109 is disposed between the third laser combining lens 108 and the converging lens group 111. For example, as shown in FIG. 9A, the homogenizing element is a homogenizing diffusion sheet having micro-structures that are regularly arranged. Micro-structures of a diffusion sheet that is commonly used currently are randomly and irregularly arranged. However, the micro-structures of the homogenizing diffusion sheet used in an architecture of the laser source in some embodiments of the present disclosure are regularly arranged. The homogenizing diffusion sheet uses a principle similar to that of a homogenization of a laser beam by a fly-eye lens, and may change an energy distribution of a laser beam from a Gaussian shape shown in the left drawing of FIG. 9B to the shape shown in the right drawing of FIG. 9B. As shown in FIG. 9B, energy near the optical axis at a center of the laser beam is greatly weakened and becomes gentle, and the divergence angle of the laser beam is also increased, so an energy homogenization effect is much better than the commonly used diffusion sheet with irregularly arranged micro-structures.

The micro-structures regularly arranged may be disposed on one side of the homogenizing diffusion sheet, or may be disposed on both sides of the homogenizing diffusion sheet respectively.

After a homogenization of the homogenizing diffusion sheet, the laser beams pass through the converging lens group to shrink sizes of the spots. On one hand, homogenizing laser beams with high-energy first may reduce an impact of an uneven energy distribution on rear-end elements. On another hand, performing the homogenization first and then performing a beam shrinking may also reduce a difficulty of re-homogenizing the laser spots after the beam shrinking.

For example, the homogenizing element 109 is a diffractive element, such as a linear grating, a two-dimensional grating (i.e., a two-dimensional diffractive element), or a Fresnel lens. A good homogenizing effect may also be achieved by providing the homogenizing element 109 as the diffractive element.

In some embodiments, the converging lens group includes a combination of two convex lenses, and any of the two convex lenses includes at least one of a plano-convex lens, a biconvex lens or a positive meniscus. For example, the combination of the two convex lenses includes a combination of a single biconvex lens and a single positive meniscus. The positive meniscus refers to a lens whose concaveness of a concave surface (a curvature of the concave surface) is less than a convexity of a convex surface (a curvature of the convex surface). That is, a curvature radius of the concave surface of the positive meniscus is less than that of the convex surface of the positive meniscus. The above two lenses are both spherical lenses. Of course, both of them may be aspheric lenses. Compared with the aspheric lenses, the spherical lenses are easier to be formed and accuracies thereof are easier to be controlled, and costs may also be reduced. In some embodiments of the present disclosure, the converging lens group is used to converge the laser beams. A focus of the converging lens group is provided at a laser receiving port of a rear-end laser receiving element. That is, a focal plane of the converging lens group is located at a laser-entry surface of the laser receiving element, which may improve a laser collection efficiency of the laser receiving element.

In some other embodiments, the converging lens group includes only one convex lens. In this way, the laser beams may also be converged, the number of the lenses is also reduced, and a structure of the converging lens group is simplified.

In some embodiments, as shown in FIG. 5B, the converging lens group is located at the first laser outlet 103 of the laser source housing 102. For example, a rear-end lens in the converging lens group or an entire lens group is installed at the first laser outlet 103, and a portion of the laser source housing 102 around the converging lens group 111 and the first laser outlet 103 is filled with a sealing member, such as a sealing rubber ring. In this way, the converging lens group is fixed, an airtightness inside the laser source housing 102 may also be maintained to prevent dust particles from entering the laser source housing 102 from the first laser outlet 103. In addition, directly fixing the converging lens group 111 to a position of the first laser outlet 103 is also beneficial to shorten the laser path and reduce a volume of the laser source housing 102.

A laser beam in a convergent state output from the first laser outlet 103 will be finally collected by the laser receiving element of an illumination laser path of the optical engine. As shown in the schematic diagram of the laser path shown in FIG. 8A, in some embodiments of the present disclosure, the laser receiving element 250 is a laser pipe. For example, the laser pipe has a rectangular laser-entry surface and a rectangular laser-emitting surface. The laser pipe functions as both the laser receiving element and a laser homogenizing element. The laser-entry surface of the laser pipe is the focal plane of the converging lens group 111. The laser beam is converged by the converging lens group 111 and the laser beam converged enters the laser pipe. The laser beam is reflected for a plurality of times inside the laser pipe and exits from the laser-emitting surface. Since the homogenizing diffusion sheet is provided in a front-end laser path, a good three-color mixing and homogenizing effect may be achieved after a homogenization of the laser pipe, and a quality of the illumination laser beam is improved.

Figure 8A:
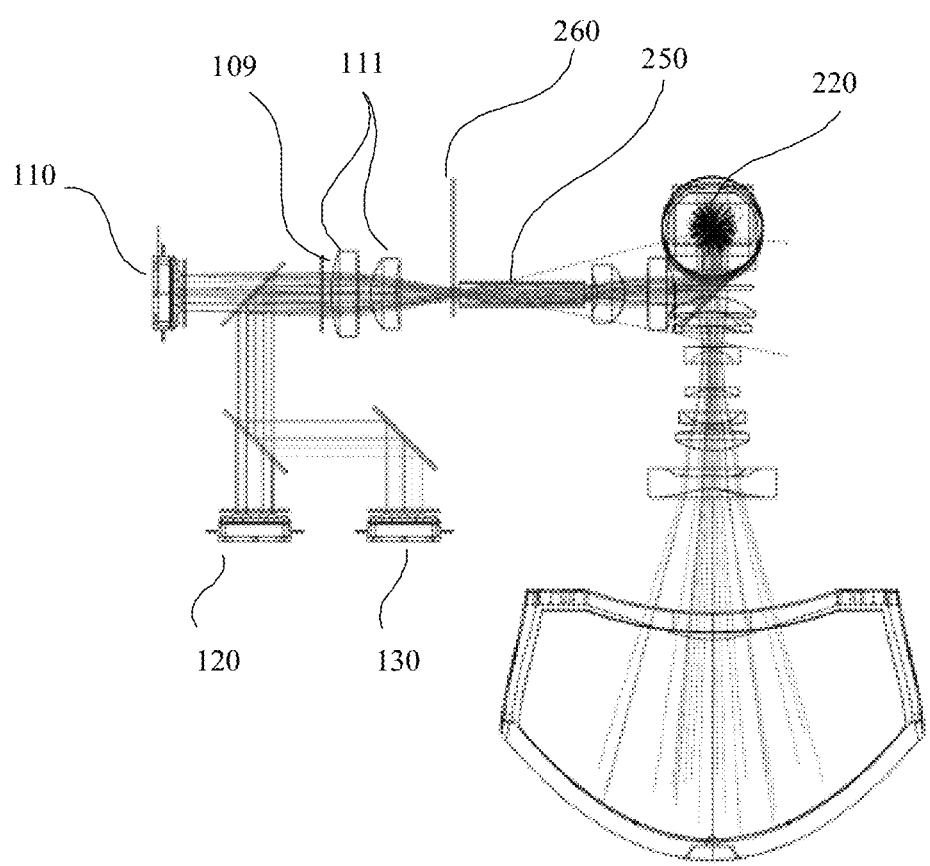
FIG. 8A is a schematic diagram showing a principle of a laser path of a laser projection system, in accordance with some embodiments of the present disclosure.

It will be noted that, the laser source is a pure three-color laser source, and speckle is a phenomenon unique to the laser beam. In order to obtain a high display quality of the projected image, the laser beams of the three colors needs to be subjected to a speckle elimination treatment. In some embodiments of the present disclosure, as shown in FIG. 8A, a diffusion wheel 260, that is, a rotating diffusion sheet, is disposed between the converging lens group 111 and the laser receiving element 250. The diffusion wheel 260 is further located in a converging laser path of the converging lens group 111. The distance between a wheel surface of the diffusion wheel 260 and the laser-entry surface of the laser receiving element 250 (such as the laser pipe) is approximately a range of 1.5 mm to 3 mm, for example, 1.5 mm, 2.0 mm, 2.5 mm or 3 mm. The diffusion wheel is able to diffuse a laser beam in a convergent state, increase the divergence angles of the laser beam, and increase a random phase of the laser beam. Since the human eyes have different sensitivities to speckles of laser beams of different colors, the diffusion wheel may be partitioned. For example, the diffusion wheel is divided into a first region and a second region. The first region is configured to transmit the red laser beam, and the second region is configured to transmit the blue laser beam and the green laser beam. A divergence angle of the first region is slightly greater than a divergence angle of the second region. Or, the diffusion wheel is divided into three regions respectively corresponding to the red laser beam, the green laser beam and the blue laser beam. Among the above three regions, a relationship among magnitudes of divergence angles of the regions corresponding to respective colors is as follows: a region corresponding to the red laser beam has a largest divergence angle and a region corresponding to the blue laser beam has a smallest divergence angle. In a case where the diffusion wheel has these corresponding regions, a rotation cycle of the diffusion wheel may be consistent with a cycle of the laser source. Usually, in a case where the diffusion wheel is a single diffusion sheet, the rotation cycle of the diffusion wheel is not particularly limited.

The laser pipe has a certain laser receiving range. For example, laser beams in a range of plus or minus 23 degrees (i.e., −23° to +23°) may enter the laser pipe and be used by a rear-end illumination laser path, while other laser beams with large angles are blocked out and become stray laser beams, and the laser loss is formed. A laser-emitting surface of the diffusion wheel is disposed proximate to the laser-entry surface of the laser pipe, which may increase an amount of laser beams received into the laser pipe after diffusion, and improve a laser utilization rate.

In some other examples, the laser receiving component is the fly-eye lens.

As described above, since the homogenizing diffusion sheet 109 is disposed in the front-end laser path, after the laser beams emitted by the laser source are homogenized, the laser beams are converged by the converging lens group 111 and the laser beams converged are incident on the diffusion wheel 260. The laser beams first pass through a stationary diffusion sheet (i.e., the homogenizing diffusion sheet 109), and then pass through a rotating diffusion sheet (i.e., the diffusion wheel 260). In this way, based on a homogenization of the laser beams by the stationary diffusion sheet, the laser beams are diffused and homogenized again by the rotating diffusion sheet, which may enhance a homogenization effect of the laser beams, and reduce an energy ratio of laser beams near optical axes to the entire laser beams, thereby reducing a coherence degree of the laser beams, and a speckle phenomenon in the projected image may be greatly alleviated.

It will be noted that, the laser source 100 may include at least one of the homogenizing diffusion sheet 109, the converging lens group 111, or the diffusion wheel 260. For example, in a laser path from the third laser combining lens 108 to the laser outlet of the laser source, the homogenizing diffusion sheet 109, the converging lens group 111 and the diffusion wheel 260 are arranged in sequence. An arrangement order of the homogenizing diffusion sheet 109, the converging lens group 111 and the diffusion wheel 260 is not changed in a case where one or two of the homogenizing diffusion sheet 109, the converging lens group 111 or the diffusion wheel 260 are omitted.

Figure 10:
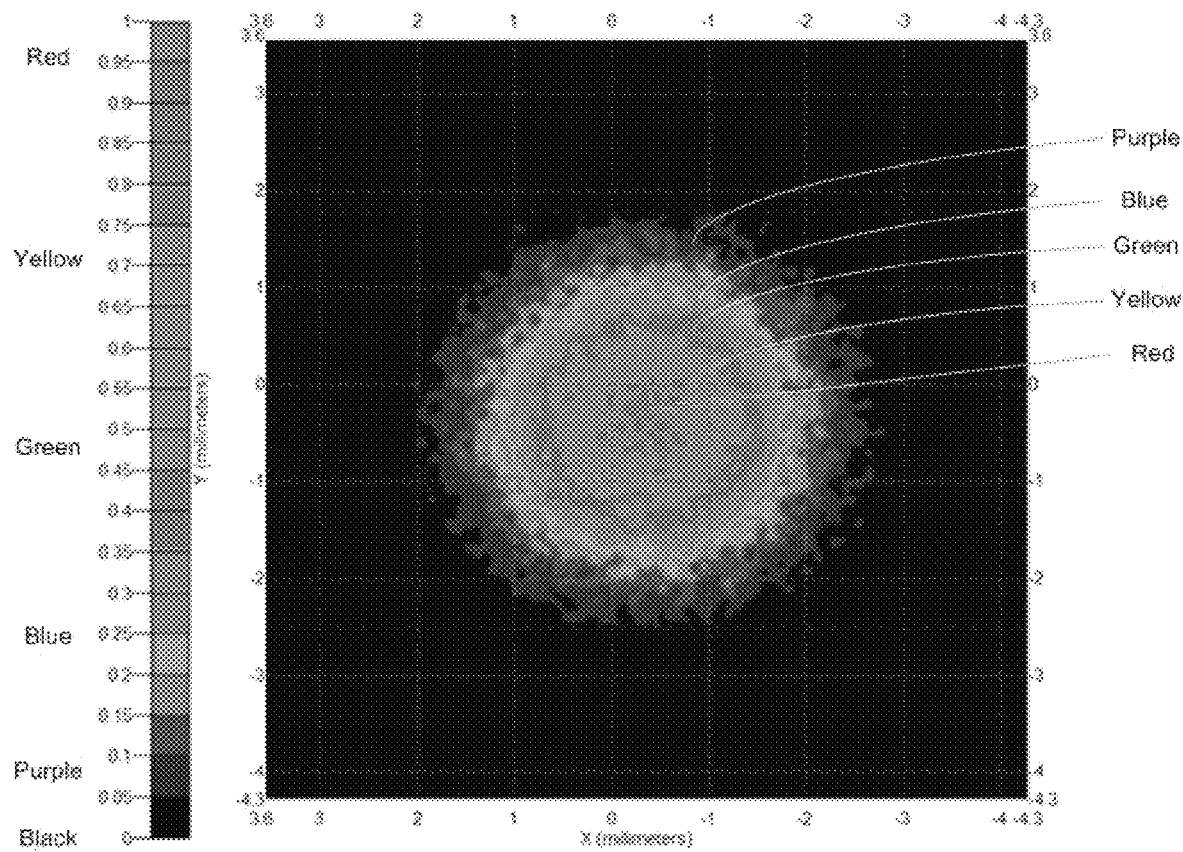
FIG. 10 is a schematic diagram of a laser spot formed by a laser beam emitted from a laser assembly, in accordance with some embodiments of the present disclosure.

In the laser source provided by the above embodiments, after the laser beams emitted by the laser source enter the laser pipe for a laser receipt, the laser beams are homogenized again by the laser pipe. A laser spot distribution measured on the laser-entry surface of the laser pipe may show an obvious color demarcation phenomenon in inner and outer circles. For example, in a schematic diagram of the laser spot shown in FIG. 10, the laser spot converged is circular. An outermost circle of the laser spot is purple, and concentric circles inside are sequentially blue, red, and other different colors. The divergence angles of the red laser assembly in the fast axis and the slow axis are greater than those of the blue laser assembly and those of the green laser assembly due to a different laser-emitting principle. Although in some embodiments of the present disclosure, the laser assemblies of the three colors include the same number of chips arranged in an array and have a same volume and a same appearance, due to characteristics of the red laser beam itself, a size of a laser spot of the red laser beam during transmission is greater than that of the blue laser beam and that of the green laser beam. This phenomenon already exists in a case of the combination of the laser beams of the three colors, and with an increase of a transmission distance of the laser path, the divergence angles of the red laser beam increase faster than the laser beams of other colors. Therefore, although the laser beams of the three colors combined may be homogenized and reduced, and the laser beams of the three colors combined may possibly be diffused and homogenized again by the rotating diffusion sheet, the size of the laser spot of the red laser beam may always be greater than that of the laser beams of other colors. A tested laser spot on the laser-entry surface of the laser pipe also shows this phenomenon.

In order to improve a coincidence of the laser spots of the three colors, a length of the laser pipe may be increased to improve a laser mixing and homogenizing effect. However, it may increase a length of the laser path, and increase a volume of the laser pipe.

Some embodiments of the present disclosure provide a solution. Based on principles of the laser paths shown in FIGS. 5G and 5H, a first diffusion sheet is disposed in the laser path of the blue laser beam, and the first diffusion sheet is configured to diffuse and transmit the blue laser beam. A second diffusion sheet is disposed in the laser path of the green laser beam, and the second diffusion sheet is configured to diffuse and transmit the green laser beam. For example, the first diffusion sheet is disposed between the laser-emitting surface of the blue laser assembly and a corresponding laser combining lens, and the second diffusion sheet is disposed between the laser-emitting surface of the green laser assembly and a corresponding laser combining lens.

Figure 8B:
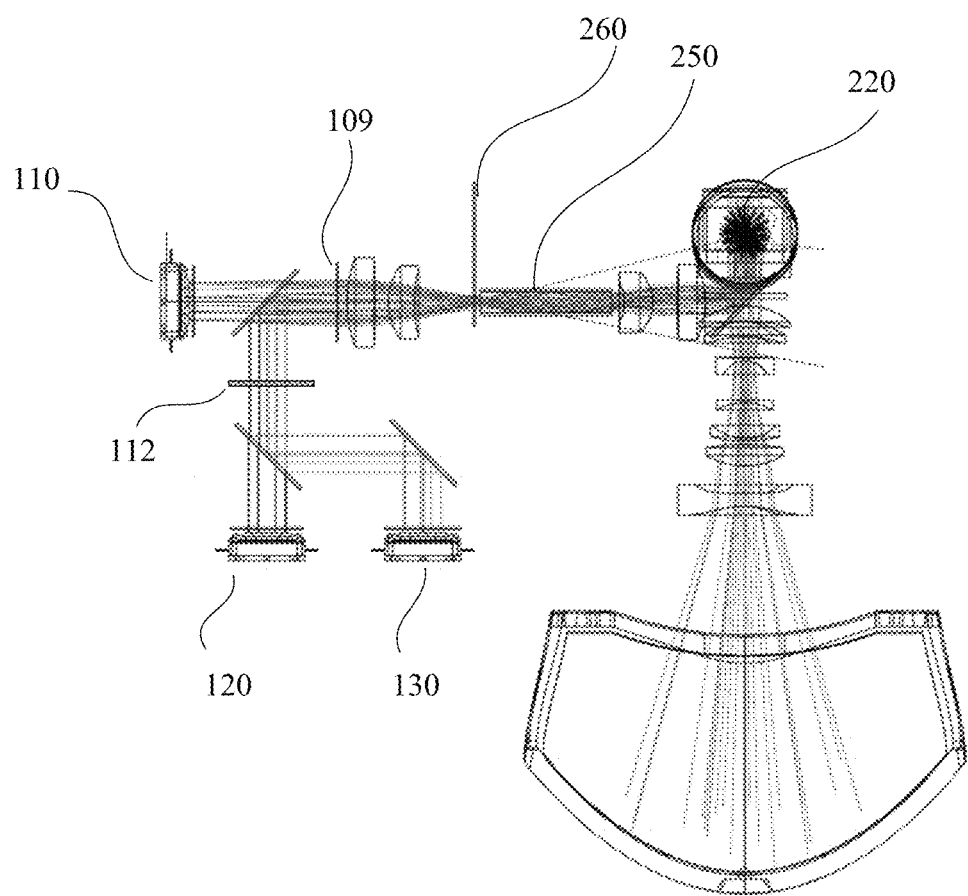
FIG. 8B is a schematic diagram showing a principle of a laser path of another laser projection system, in accordance with embodiments of the present disclosure.

In addition, some embodiments of the present disclosure also provide another solution. Based on the principles of the laser paths shown in FIGS. 5G and 5H, as shown in FIG. 8B, a third diffusion sheet 112 is provided in a combined laser path of the blue laser beam and the green laser beam, and the blue laser beam and the green laser beam are combined with the red laser beam after being diffused. The third diffusion sheet 112 is further disposed in a laser path from the second laser combining lens 107 to the third laser combining lens 108.

By providing the third diffusion sheet 112 in the laser path of the blue laser beam and the green laser beam, the blue laser beam and the green laser beam may be expanded. For example, a diffusion angle is set to a range of 1 degree to 3 degrees, after passing through the third diffusion sheet 112, the blue laser beam and the green laser beam that are expanded are combined with the red laser beam. In this case, the laser spots of the laser beams of the three colors are substantially equal in size, and a coincidence degree of the laser spots is improved. The laser spots of the three colors with a high coincidence degree are also conducive to a homogenization and an elimination of the speckles in a subsequent laser path, and improve a quality of the laser beams.

Figure 8C:
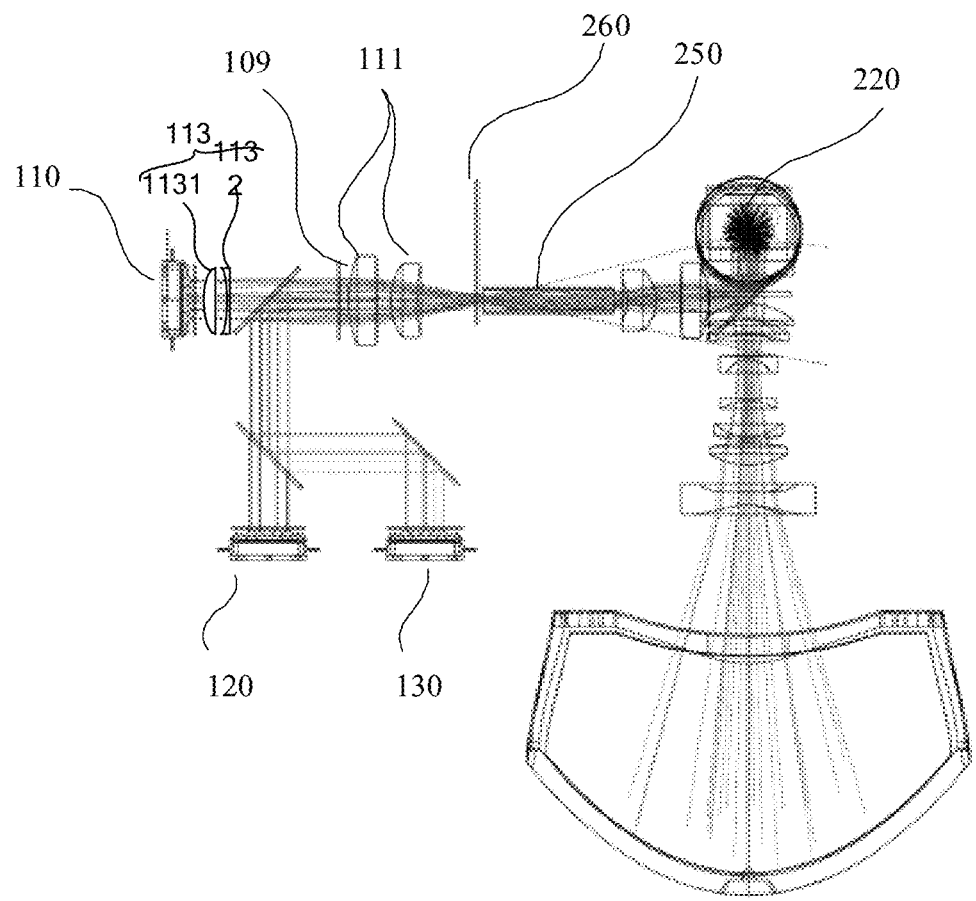
FIG. 8C is a schematic diagram showing a principle of a laser path of yet another laser projection system, in accordance with some embodiments of the present disclosure.

Some embodiments of the present disclosure provide yet another solution. Based on the principles of the laser paths shown in FIGS. 2A and 2B, as shown in FIG. 8C, a telescope system 113 is provided in the laser path of the red laser beam. The telescope system 113 is configured to transmit the red laser beam and shrink the red laser beam. For example, as shown in FIG. 8C, the telescope system includes a convex lens 1131 and a concave lens 1132. The convex lens 1131 is more proximate to the red laser assembly 110 than the concave lens 1132. In this way, the red laser beam emitted from the red laser assembly may shrink. As shown in FIG. 8C, the convex lens 1131 is a plano-convex lens, the plano-convex lens has a plane surface and a convex surface that are opposite to each other, and the convex surface of the plano-convex lens faces the red laser assembly 110. The concave lens 1132 is a plano-concave lens, and the plano-concave lens has a plane surface and a concave surface that are opposite to each other. The concave surface of the plano-concave lens faces the plane surface of the plano-convex lens.

A laser beam emitted by the laser is a linearly polarized laser beam. In a laser emission process of the red laser beam and laser emission processes of the blue laser beam and green laser beam, modes of resonant cavity oscillation are different, which causes that a polarization direction of a red linearly polarized laser beam is 90 degrees from that of a blue linearly polarized laser beam and that of a green linearly polarized laser beam. That is, the red laser beam is a P-polarized laser beam, the blue laser beam and the green laser beam are S-polarized laser beams.

In the above embodiments, in the laser source shown in FIGS. 1A and 5B, a polarization direction of the laser beam emitted from the red laser assembly is 90 degrees from that of the laser beam emitted from the blue laser assembly and that of the laser beam emitted from the green laser assembly. The red laser beam is a P-polarized laser beam, and the blue laser beam and the green laser beam are S-polarized laser beams. The laser beams of the three colors projected by the laser projection apparatus have different polarization directions.

In actual applications, in order to better restore colors and a contrast, the laser projection apparatus usually needs to be fitted with a projection screen with high benefits and a high contrast, such as an optical screen, which may well restore the projected image with a high luminance and a high contrast.

Figure 4A:
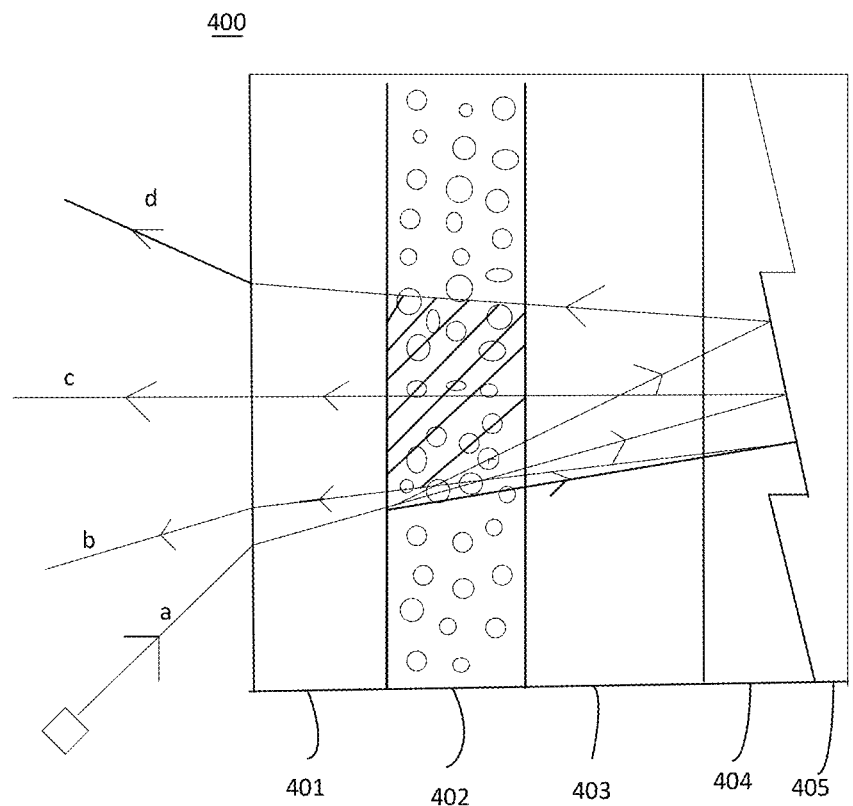
FIG. 4A is a schematic diagram showing a structure of an ultra-short-focus projection screen, in accordance with some embodiments of the present disclosure.

FIG. 4A shows an ultra-short-focus projection screen, which is a Fresnel optical screen. Along an incident direction of the projected beam, the Fresnel optical screen includes a substrate layer 401, a diffusion layer 402, a uniform medium layer 403, a Fresnel lens layer 404, and a reflection layer 405. A thickness of the Fresnel optical screen is usually between 1 mm and 2 mm, and a thickness ratio occupied by the substrate layer 401 is the largest. The substrate layer 401 also is a supporting layer of an entire screen, and has a certain laser transmittance and hardness. The projected beam first transmits the substrate layer 401, then enters the diffusion layer 402 for diffusion, and then enters the uniform medium layer 403. The uniform medium layer 403 is made of a uniform laser-transmitting medium, such as a medium that is the same as a material of the substrate layer 401. The laser beam transmits the uniform medium layer 403 and enters the Fresnel lens layer 404. The Fresnel lens layer 404 converges and collimates the laser beam, and the laser beam collimated is reflected by the reflection layer 405 and then passes through sequentially the Fresnel lens 404, the uniform medium layer 403, the diffusion layer 402, and the substrate layer 401 again and enters the user's eyes finally.

Figure 4B:
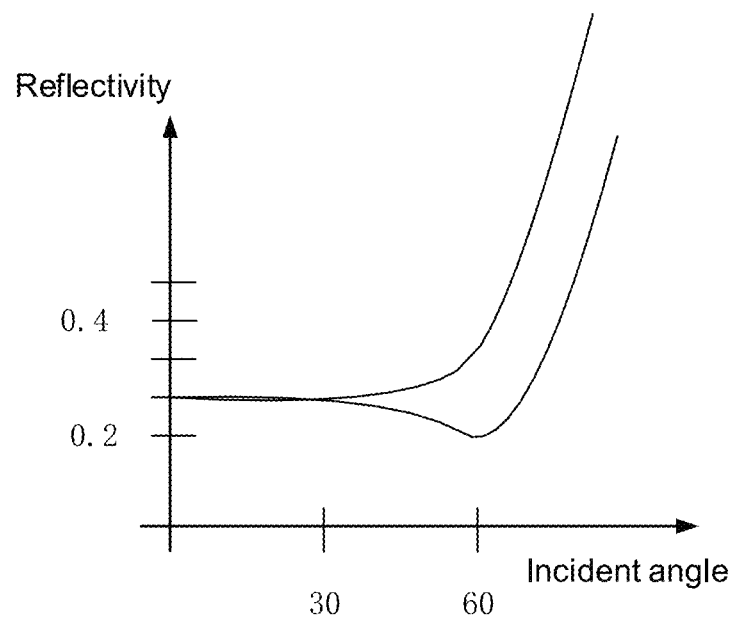
FIG. 4B is a diagram showing a change of a reflectivity of the projection screen in FIG. 4A to a projected beam.

A partial color cast may occur in the ultra-short-focus projection screen in a case of using the three-color laser source, which results in non-uniform chromaticity phenomena such as "color spots" and "color blocks". Reasons of this phenomenon are as follows. On one hand, in the lasers of the three colors that are currently used, polarization directions of the laser beams of different colors are different. There are usually a plurality of optical lenses, such as lenses and prisms, provided in an optical system. The optical lens itself has different transmittances for the P-polarized laser beam and the S-polarized laser beam and different reflectivities for the P-polarized laser beam and the S-polarized laser beam. For example, a transmittance of the optical lens for the P-polarized laser beam is relatively greater than a transmittance of the optical lens for the S-polarized laser beam. On another hand, due to a material and a structure of the screen, with a change of an incident angle of an ultra-short-focus projected beam, a transmittance and a reflectivity of the ultra-short-focus projection screen itself for the laser beams having different polarization directions will be obviously different. As shown in FIG. 4B, as for a red projected beam, in a case where a projection angle is approximately 60 degrees, after experiments, a reflectivity of the projection screen for a red projected beam of a P-type differs from a reflectivity of the projection screen for a red projected beam of an S-type by more than ten percentage points. That is, a reflectivity of the ultra-short-focus projection screen for the P-polarized laser beam is greater than that of the ultra-short-focus projection screen for the S-polarized laser beam. In this way, more P-polarized laser beams are reflected by the screen and enter the human eyes, while S-polarized laser beams reflected by the screen and entering the human eyes are reduced. A difference in transmittances between laser beams having a same color and different polarization directions and a difference in reflectivities between laser beams having a same color and different polarization directions also exist in a case where the projected beam is of different colors. In a case where the lasers beams of the three primary colors are in different polarization states, after passing through the projection optical system and the projection screen described above, the differences in transmittances and reflectivities (especially obvious differences in a transmittance and a reflectivity of the projection screen) may cause an imbalance of a laser flux of laser beams of different colors reflected by the screen into the human eyes, and eventually lead to the color cast phenomena in a local region on the projected image, which is especially obvious in a case where a color image is presented.

In order to solve the above problem, the present disclosure describes other embodiments with an improvement on the laser source provided by the foregoing embodiments.

In these embodiments, the blue laser assembly is disposed adjacent to the green laser assembly. Providing a phase retarder (such as a half-wave plate) in output paths of the blue laser beam and green laser beam before the blue laser beam and green laser beam enter the third laser combining lens, so as to change polarization directions of the blue laser beam and the green laser beam, so that the polarization directions of the blue laser beam and the green laser beam are the same as a polarization direction of the red laser beam, which solves the color cast phenomenon in the projected image due to different polarization directions.

Figure 11A:
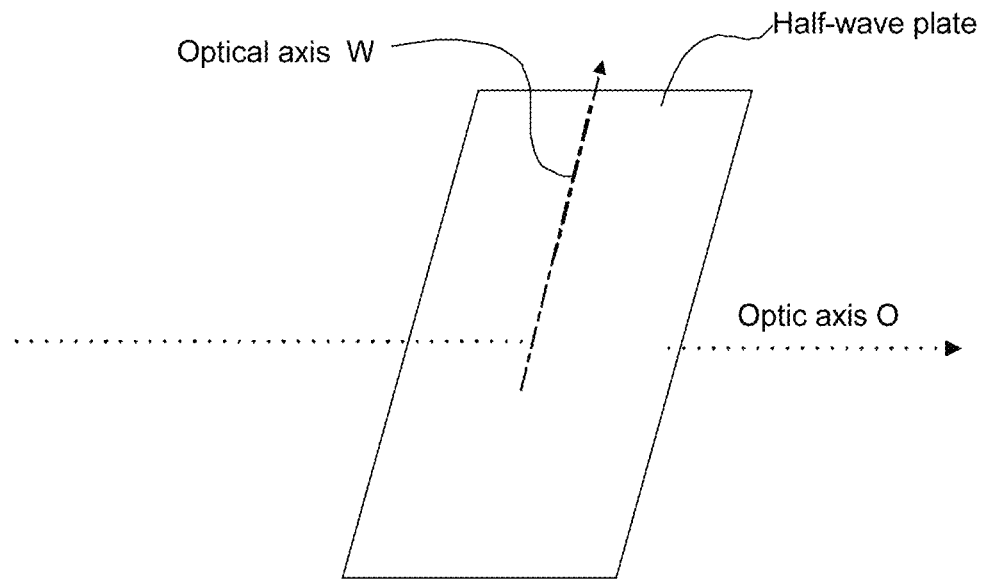
FIG. 11A is a schematic diagram of an optical axis of a half-wave plate, in accordance with some embodiments of the present disclosure.

First, a working principle of the phase retarder is introduced. The phase retarder corresponds to a wavelength of a certain color and affects a phase change degree of a laser beam transmitted through a thickness of a crystal. In some embodiments of the present disclosure, the phase retarder is a half-wave plate, also referred to as a $\lambda/2$ wave plate. The phase retarder may change a phase of a laser beam of a corresponding color and a corresponding wavelength by π, i.e., 180 degrees, and makes a polarization direction of the laser beam of the corresponding color and the corresponding wavelength rotate by 90 degrees. For example, the P-polarized laser beam is changed to the S-polarized laser beam, or the S-polarized laser beam is changed to the P-polarized laser beam. As shown in FIG. 11A, the half-wave plate is a crystal, and the crystal has its own optical axis W, which is located in a plane where the half-wave plate is located. The half-wave plate is disposed in the laser path and is perpendicular to an optical axis O of the laser beam. Therefore, the optical axis W of the half-wave plate and the optical axis O of the laser beam are perpendicular to each other.

Figure 11B:
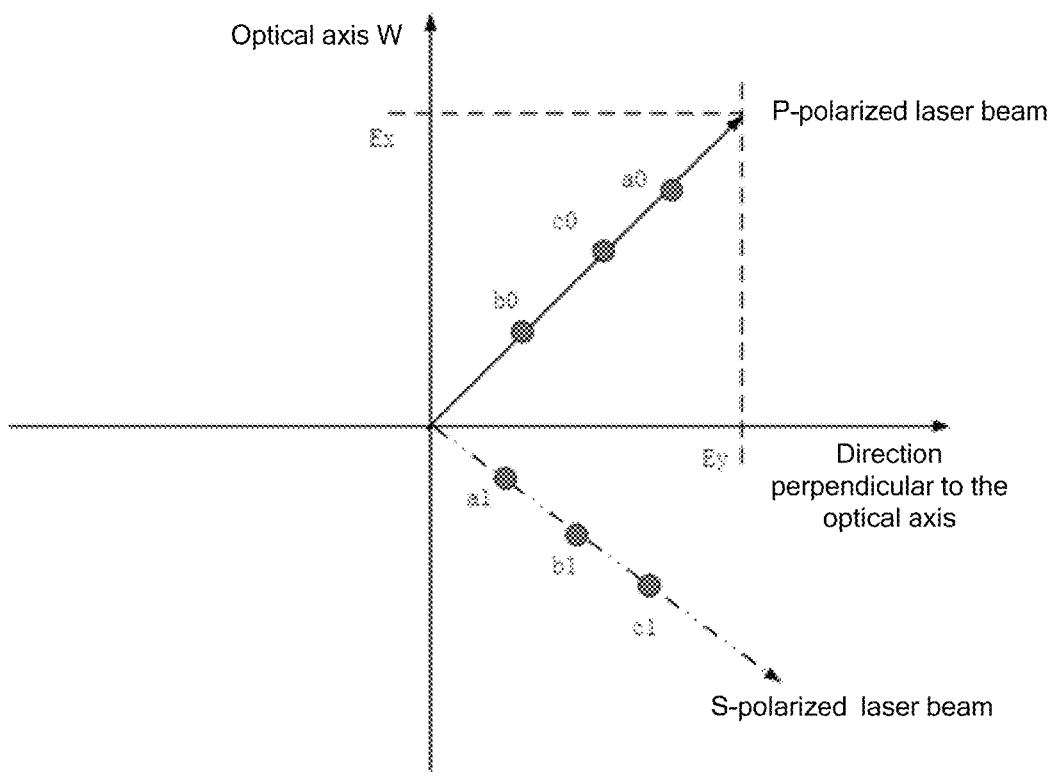
FIG. 11B is a schematic diagram showing a principle that a linearly polarized laser beam changes by 90 degrees, in accordance with some embodiments of the present disclosure.

As shown in FIG. 11B, a coordinate system is established with the optical axis W of the half-wave plate and a direction perpendicular to the optical axis W. The P-polarized laser beam has components Ex and Ey, along the optical axis W and the direction perpendicular to the optical axis W respectively. Both of Ex and Ey may be expressed by a laser wave formula. The P-polarized laser beam may be regarded as a spatial synthesis of a two-dimensional wave of components Ex and Ey.

When the P-polarized laser beam passes through the half-wave plate, the phase is changed by π, i.e., 180 degrees, and phase constants of Ex and Ey both have a change amount of π. After phases of laser waves b0, c0, and a0 at a certain point in an original polarization direction are changed by 180 degrees, and after laser waves of the components in two directions are superposed, polarization positions of the laser waves in space are changed so as to form b1, c1, and a1, thereby becoming laser beams in an S polarization direction. The changes of spatial positions of b0, c0, a0 and b1, c1, a1 described above are merely examples.

Figure 11C:
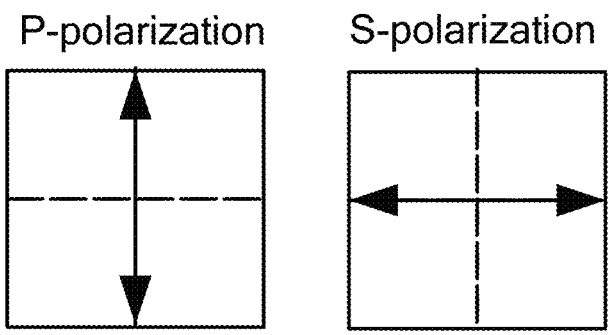
FIG. 11C is a schematic diagram of polarization directions of a P-polarized laser beam and an S-polarized laser beam, in accordance with some embodiments of the present disclosure.

After passing through the half-wave plate, laser beams originally in a P polarization direction become the laser beams in the S polarization direction. As shown in FIG. 11C, the two polarization directions are perpendicular to each other.

Figure 12A:
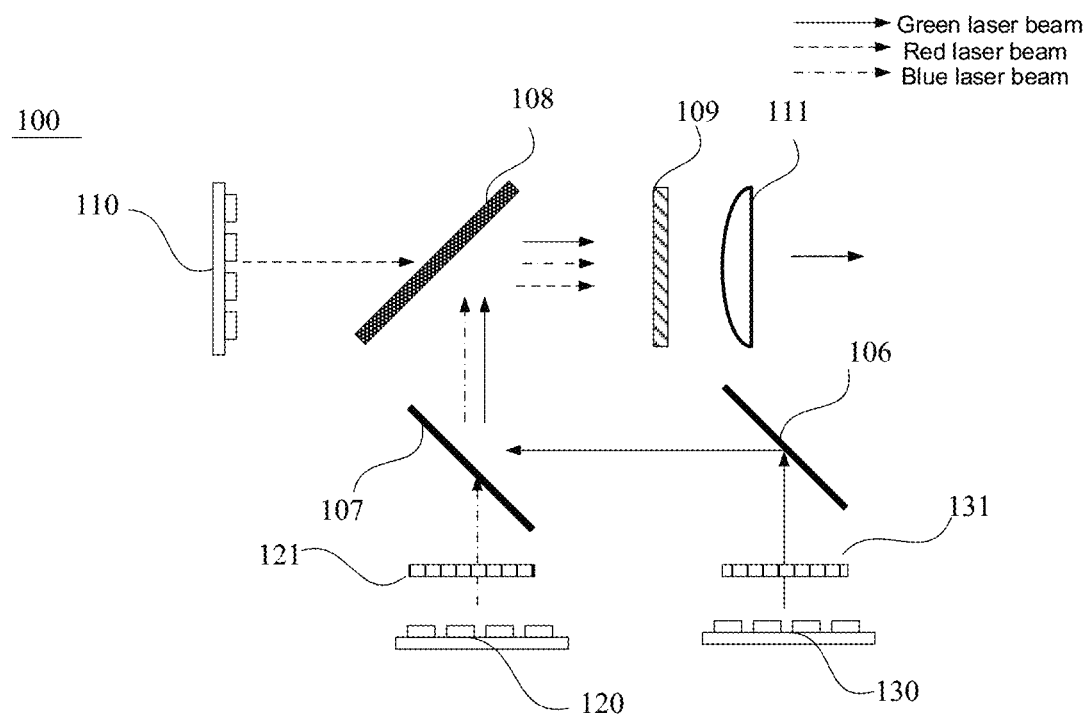
FIG. 12A is a schematic diagram showing a principle of a laser path, in accordance with some embodiments of the present disclosure.

Based on the above description, as shown in a schematic diagram showing a principle of the laser path shown in FIG. 12A, phase retarders of corresponding wavelengths are respectively disposed in laser-emitting paths of the blue laser assembly and the green laser assembly. The phase retarders are, for example, half-wave plates. In some embodiments of the present disclosure, a center wavelength of the blue laser beam is approximately 465 nm, and a center wavelength of the green laser beam is approximately 525 nm. In the schematic diagram showing the principle of the laser path shown in FIG. 12A, a first half-wave plate 121 (i.e., a first phase retarder) is located in the laser-emitting path of the blue laser beam, and is disposed corresponding to the center wavelength of the blue laser beam. A second half-wave plate 131 (i.e., a second phase retarder) is located in the laser-emitting path of the green laser beam, and is disposed corresponding to the center wavelength of the green laser beam. In this way, the polarization directions of the green laser beam and the blue laser beam may both be changed by 90 degrees, and may both be changed from the S-polarized laser beams to the P-polarized laser beams.

Based on the above principle of the laser path, in some examples, the half-wave plates (for example, the first half-wave plate 121 and the second half-wave plate 131) are disposed in the laser source housing, and are located between an inner side of the laser source housing and laser combining lenses corresponding to the laser assemblies. The half-wave plates are fixed by providing lens bases on the bottom wall of the laser source housing.

In some other examples, the half-wave plates (for example, the first half-wave plate 121 and the second half-wave plate 131) are disposed on inner sides of the openings provided for the laser assemblies on the laser source housing. For example, the half-wave plates are fixed on the inner sides of the openings by an adhesive or fixed supports.

In yet some other examples, the half-wave plates (for example, the first half-wave plate 121 and the second half-wave plate 131) are disposed between the laser assemblies and outer sides of the openings of the laser source housing. For example, the half-wave plates are installed or fixed on the outer sides of the openings, and the laser assemblies (including the fixed support) are installed at mounting positions on the outer sides of the openings through the fixed support.

In yet some other examples, in a case where the openings are provided with the sealing glasses, the half-wave plates (for example, the first half-wave plate 121 and the second half-wave plate 131) may be located between the sealing glasses and the laser-emitting surfaces of the laser assemblies. As shown in an exploded structure of a laser assembly shown in FIG. 5E-2, a support table (not shown in FIG. 5E-2) is disposed on the front side of the laser-transmissive opening frame 1041 of the fixed support 104 of the laser assembly, and the half-wave plates 141 may be fixed on the support table by an adhesive. An accommodating groove is also disposed around the support table for accommodating the first sealing member 1051. FIG. 5C-2 shows that the half-wave plate is installed on a front side of the fixed support 104. The half-wave plate 141 is installed at a position of laser-transmissive opening frame 1041 of the fixed support 104, and is fixed through adhesive dispensing of adhesive dispensing grooves 104A on a periphery. A length range of the half-wave plate 141 is 25 mm to 30 mm, and a width range of the half-wave plate 141 is 21 mm to 28 mm. A length range of the laser-transmissive opening frame 1041 of the fixed support 104 is 20 mm to 24 mm, and a width range of the laser-transmissive opening frame 1041 of the fixed support 104 is 18 mm to 20 mm. For example, in one embodiment, a size of the half-wave plate is selected to be 30 mm×28 mm, and a size of the laser-transmissive opening frame is 24 mm×20 mm.

After the half-wave plate 141 is fixed on the fixed support 104, the half-wave plate 141 is installed on the mounting position of the opening 1021 of the laser source housing 102 together with the MCL laser assembly installed on the fixed support 104. As mentioned above, the mounting position of the opening 1021 of the laser source housing is further provided with the second accommodating groove for accommodating the second sealing member 1052, and the sealing glass 105 is clamped between the first sealing member 1051 and the second sealing member 1052 on the laser assembly. Based on the above structure, after a laser beam is emitted from laser-emitting chips of the laser assembly, the laser beam is sequentially transmitted through the half-wave plate 141 and the sealing glass 105, and then enters the laser source housing through the opening 1021 of the laser source housing after.

In the above laser source, half-wave plates corresponding to different colors are installed on the fixed supports of the blue laser assembly and the green laser assembly, so that after passing through a corresponding half-wave plate, a polarization direction of the laser beam is changed by 90 degrees. The green laser beam is already a P-polarized laser beam when the green laser beam enters the first laser combining lens, and the blue laser beam is already a P-polarized laser beam when the blue laser beam enters the second laser combining lens. Therefore, after the second laser combining lens combines the blue laser beam and the green laser beam, laser beams output are both P-polarized laser beams. That is, a polarization direction of the laser beams output is the same as the polarization direction of the red laser beam. The third laser combining lens combines the laser beams of the three colors having a same polarization direction and then outputs a combined laser beam. Then, the combined laser beam is performed processes of homogenization, shrinking and so on, enters the illumination laser path of the optical engine. Then the laser beam is reflected into the lens through the DMD chip and is projected on the screen by the lens to form an image. Since the polarization directions of the laser beams of the three colors are the same, the uneven chromaticity phenomena such as the "color spots" and the "color blocks" of the projected image may be eliminated or greatly alleviated.

Figure 12B:
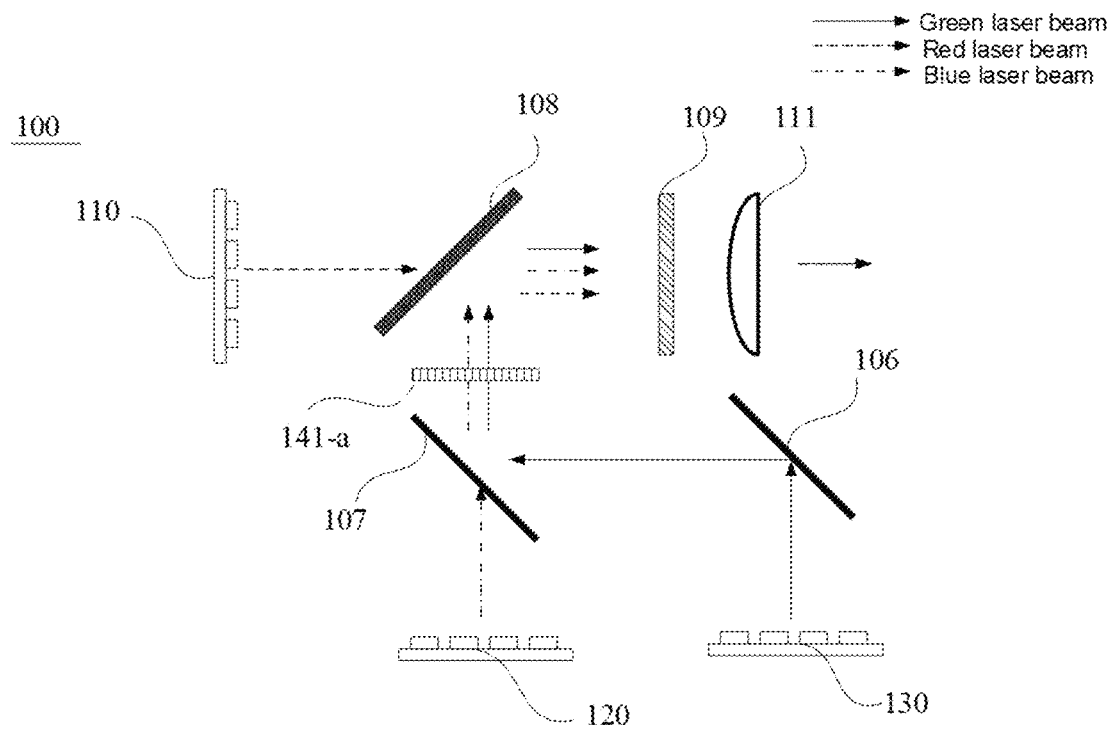
FIG. 12B is a schematic diagram showing a principle of another laser path, in accordance with some embodiments of the present disclosure.

As a modification of the above embodiments, in some other embodiments, the blue laser beam and the green laser beam are combined first, and then a combined laser beam is combined with the red laser beam. In this case, a half-wave plate may also be provided in a laser path after the blue laser beam and the green laser beam are combined and before the combined laser beam is combined with the red laser beam. For example, as shown in FIG. 12B, a schematic diagram showing a principle of a laser path of another laser source is provided. A fourth half-wave plate 141-*a* (i.e., a fourth phase retarder) may be disposed between the second laser combining lens 107 and the third laser combining lens 108, and the fourth half-wave plate 141-*a* transmits the combined laser beam of the blue laser beam and the green laser beam emitted from the second laser combining lens 107. Based on the principle of the above laser path, the green laser and the blue laser respectively output S-polarized laser beams. A green S-polarized laser beam is incident on the first laser combining lens 106 and is reflected, and a blue S-polarized laser beam is incident on the second laser combining lens 107 and is transmitted. The second laser combining lens 107 further reflects the green S-polarized laser beam. Here, the second laser combining lens 107 is a dichroic film selected based on wavelengths rather than polarization natures. The blue laser beam and the green laser beam that are both S-polarized laser beams are combined by the second laser combining lens 107, and the combined laser beam passes through the fourth half-wave plate 141-*a*. The polarization directions of the green laser beam and the blue laser beam are changed by the fourth half-wave plate 141-*a*, and then the changed laser beams are incident on the third laser combining lens 108.

It will be noted that, in the schematic diagram showing the principle of the laser path shown in FIG. 12B, the fourth half-wave plate 141-*a* may be provided for a wavelength of a laser beam of blue color or green color. For example, the fourth half-wave plate 141-*a* may be provided for a wavelength of the green laser beam. After the green laser beam transmits the fourth half-wave plate 141-*a*, the polarization direction of the green laser beam is deflected by 90 degrees, that is, the green laser beam is changed from an original S-polarized laser beam to a P-polarized laser beam. After the blue laser beam transmits the fourth half-wave plate 141-*a*, since the fourth half-wave plate is not set to correspond to a wavelength of the blue laser beam, the polarization direction of the blue laser beam is not deflected by 90 degrees, but is close to the P polarization direction. Since the human eyes have a low visual function for the blue and a low sensitivity to the blue, a visual discomfort for the blue is not as obvious as that of the red and that of the green. For another example, the fourth half-wave plate 141-*a* is set to correspond to a middle value of the center wavelengths of the blue laser beam and the green laser beam, so that the polarization directions of the green laser beam and the blue laser beam are not changed by 90 degrees, but are close to 90 degrees. Although neither the blue laser beam nor the green laser beam is deflected from the S-polarized laser beam to the P-polarized laser beam, neither the blue laser beam nor the green laser beam is in a polarization state of an original S-polarized laser beam. A consistency of processes of processing the laser beams of the three primary colors by the entire system may also be improved, technical problems of uneven chromaticity such as the "color spots" and the "color blocks" presented in a local region on the projected image may be solved, and a principle is not described again.

In the above examples, the half-wave plate 141 may be fixed through a fixed base disposed on the bottom wall of the laser source housing.

Figure 12C:
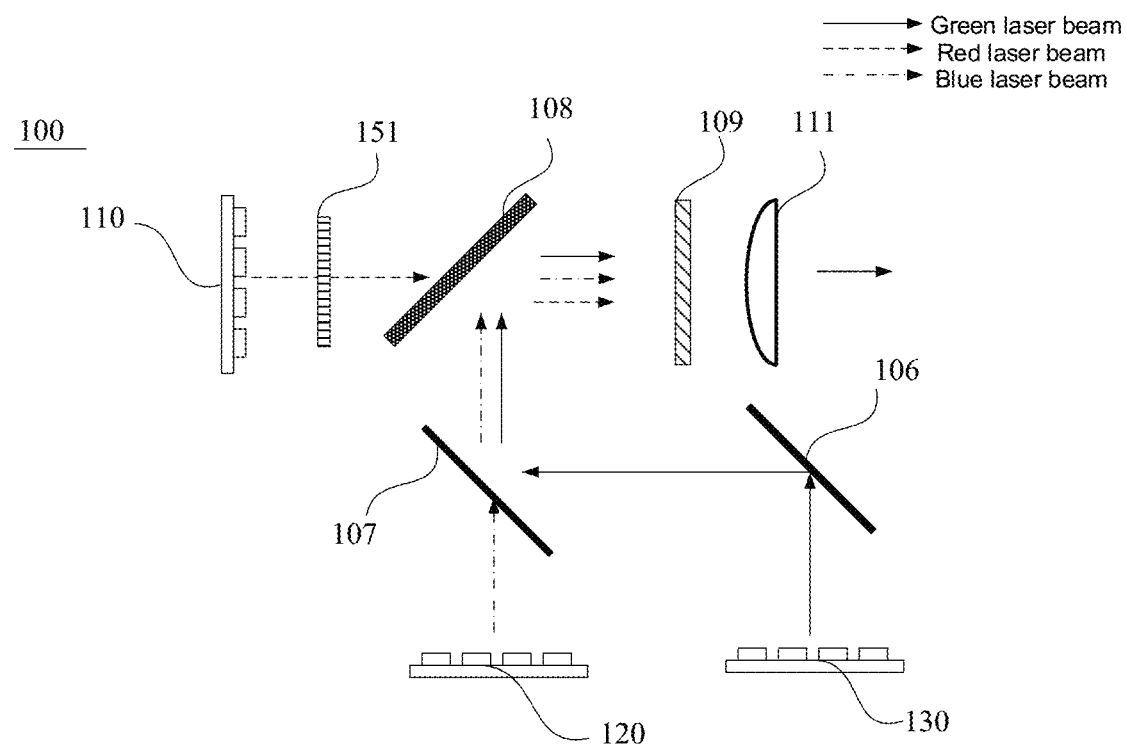
FIG. 12C is a schematic diagram showing a principle of yet another laser path, in accordance with some embodiments of the present disclosure.
Figure 12D:
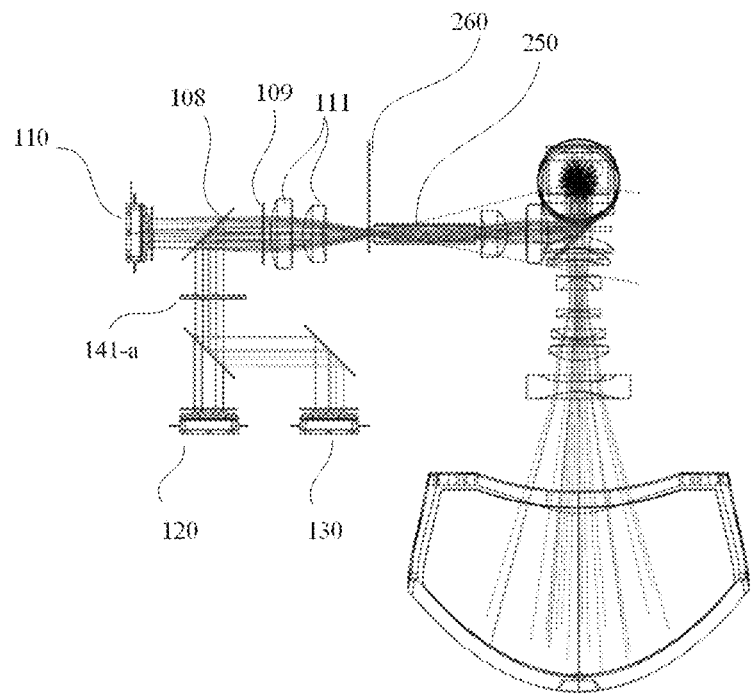
FIG. 12D is a schematic diagram showing an optical principle of another laser projection apparatus, in accordance with some embodiments of the present disclosure.

Based on the schematic diagram showing the principle of the laser path of the laser source shown in FIG. 12B, a schematic diagram showing an optical principle of a laser projection apparatus may be shown in FIG. 12D. For a working process, reference may be made to the foregoing description, and details are not described again. It should be noted that, in the schematic diagram showing the optical principle shown in FIG. 12D, the fourth half-wave plate 141-*a* is provided in the combined laser path of the blue laser beam and the green laser beam. Here, the third diffusion sheet 112 may be simultaneously provided, or the third diffusion sheet 112 may not be provided. In an example of FIG. 12D, an arrangement relationship between the blue laser assembly and the green laser assembly is not limited. That is, positions of the blue laser assembly and the green laser assembly are interchangeable.

It will be noted that, a solution for providing the half-wave plates shown in FIGS. 12B and 12D is also applicable to an architecture of the laser path provided by a schematic diagram showing a principle of the laser path shown in FIG. 5G, 5H, 8A, 8B, or 8C. A working principle is the same as above and will not be described again.

In the optical system, as for different wavelengths, a same optical lens has a slight difference in transmittances of the P-polarized laser beam and the S-polarized laser beam that have different wavelengths, and the same optical lens also has a slight difference in reflectivities of the P-polarized laser beam and the S-polarized laser beam. The optical lens here refers to any one of various optical lenses in the laser projection apparatus, such as an optical lens in the converging lens group, an optical lens in a lens group in the illumination laser path of the optical engine, or an optical lens in the refractive lens group in the lens. Therefore, in a case where the laser beams emitted by the laser source pass through the entire projection optical system, the differences in the transmittances and the reflectivities are a result of a superposition of the entire system, which may be more obvious.

In some examples, without the half-wave plate, the red laser beam is the P-polarized laser beam, and the blue laser beam and green laser beam are S-polarized laser beams. In this case, both the optical lenses of the optical system and the projection screen selectively transmit the P-polarized laser beam and the S-polarized laser beams obviously. For example, with different incident angles of the projected beam, a transmittance and a reflectivity of the projection screen for the P-polarized laser beam (the red laser beam) is significantly greater than those for the S-polarized laser beams (the green laser beam and the blue laser beam), which causes a problem of uneven local chromaticity of the projected image, i.e., the phenomena such as the "color spots" and the "color blocks" on the image.

In some embodiments provided above, by providing the half-wave plate(s) in the laser-emitting paths of the blue laser beam and the green laser beam, for example, in a case of providing half-wave plates respectively corresponding to wavelengths of the blue laser beam and the green laser beam, the polarization directions of the blue laser beam and the green laser beam may be changed by 90 degrees in a targeted manner. In some embodiments, polarization directions of the blue laser beam and the green laser beam are changed from the S polarization direction to the P polarization direction, which is the same as the polarization direction of red laser beam. Therefore, in a process in which the laser beams pass through a same optical imaging system and are reflected into the human eyes through the projection screen, the transmittances of the blue laser beam and the green laser beam that are changed to be the P-polarized laser beams in optical lenses are close to the transmittance of the red laser beam that is originally the P-polarized laser beam, and laser processing processes are very consistent. A difference in reflectivities of the projection screen to the laser beams of the three colors is also reduced, and the consistency of the processes of processing the laser beams of the three primary colors by the entire projection system is improved, the color cast phenomena such as the "color spots" and the "color blocks" in a local region on the projected image may be fundamentally eliminated, and the display quality of the projected image is improved.

In some embodiments provided above, in a case where a single half-wave plate is provided in the combined laser path of the blue laser beam and the green laser beam, a polarization direction of one of the green laser beam or the blue laser beam may be changed by 90 degrees. Or, the polarization directions of the green laser beam and the blue laser beam are not changed by 90 degrees, but both are changed to be close to 90 degrees. In this way, a polarization difference between the S-polarized laser beams (the blue laser beam and the green laser beam) and the P-polarized laser beam (the red laser beam) may also be reduced. Based on the above principle, the consistency of the processes of processing the laser beams of the three primary colors by the entire system may also be improved, and the technical problems of uneven chromaticity such as the "color spots" and the "color blocks" presented in a local region on the projected image may be solved.

Since the optical lenses in the optical system usually have a higher transmittance for the P-polarized laser beam than the S-polarized laser beam, and the projection screen used in some examples of the present disclosure has a higher reflectivity for the P-polarized laser beam than the S-polarized laser beam. Therefore, by converting the blue laser beam and the green laser beam that are the S-polarized laser beams to the P-polarized laser beams, the red laser beam, the green laser beam and the blue laser beam are all P-polarized laser beams, A laser transmission efficiency of the projected beam in the entire system may also be improved, a luminance of an entire projected image may be improved, and the quality of the projected image may be improved.

As another method for solving the technical problems of uneven chromaticity such as the "color spots" and the "color blocks" on the projected image, some embodiments of the present disclosure provide a laser projection apparatus, to which the laser source shown in FIG. 12C is applied. In some embodiments, a half-wave plate corresponding to a wavelength of the red laser beam is provided in a laser path where the red laser beam is transmitted before being combined with the blue laser beam and green laser beam. For example, a third half-wave plate 151 (i.e., a third phase retarder) is disposed between the red laser assembly 110 and the third laser combining lens 108.

As for an arrangement solution of the third half-wave plate 151, reference may be made to solutions in which the half-wave plates respectively corresponding to the wavelengths of the blue laser beam and the green laser beam are provided in previous embodiments.

In some examples, the third half-wave plate 151 is disposed in the laser source housing, and is located in a laser path between the inner side of the laser source housing and the third laser combining lens. By providing a lens base on the bottom wall of the laser source housing, the third half-wave plate 151 is fixed.

In some other examples, the third half-wave plate 151 is disposed on an inner side of an opening provided for the red laser assembly on the laser source housing. For example, the third half-wave plate 151 is fixed on the inner side of the opening by a adhesive or the fixed support.

In yet some other examples, the third half-wave plate 151 is disposed between the red laser assembly and an outer side of the opening of the laser source housing. For example, the third half-wave plate 151 is installed or fixed on the outer side of the opening, and the laser assembly (including the fixed support) is then installed on a mounting position outside the opening through the fixed support.

In yet some other examples, in a case where the opening is provided with the sealing glass, the third half-wave plate 151 may be located between the sealing glass and the laser-emitting surface of the laser assembly. As for a specific installation manner, reference may be made to the introduction of FIG. 5E-2, which will not be repeated here.

The third half-wave plate 151 is set to correspond to the wavelength of the red laser beam. That is, the polarization direction of the red laser beam may be deflected by 90 degrees through the third half-wave plate 151, and the red laser beam is changed from the P-polarized laser beam to the S-polarized laser beam.

It will be noted that, the above solution for providing the half-wave plate corresponding to the wavelength of the red laser beam is also applicable to the schematic diagram showing the principle of the laser path shown in FIG. 5G, 5H, 8A, 8B, or 8C of some embodiments of the present disclosure, which will not be repeated here.

In the above example, by providing the third half-wave plate 151 in an output path of the red laser beam, the red laser beam that is originally the P-polarized laser beam is converted into the S-polarized laser beam, the polarization direction of which is the same as the polarization directions of the blue laser beam and the green laser beam. In this way, the laser beams of the three colors in the system have the same polarization direction. Referring to the description of the principle in the foregoing embodiments, a difference in transmittances of the projection optical system to the red laser beam, the blue laser beam, and the green laser beam that are all S-polarized laser beams is less than a difference in transmittances of the projection optical system to the red laser beam, the blue laser beam, and the green laser beam that are polarized laser beams having different polarization directions. And reflectivities of the ultra-short-focus projection screen to the laser beams of the three colors that are all S-polarized laser beams are also substantially the same.

Therefore, the consistency of processing the laser beams of respective primary colors is improved, and the uneven chromaticity phenomena such as the "color spots" and the "color blocks" in the projected image may be eliminated or solved.

In the above embodiments, the laser-emitting surface of the laser has a rectangular shape. Correspondingly, the phase retarder(s) are provided in output path(s) of laser beam(s) of one or two of the three colors, and the phase retarder(s) also have a rectangular shape. A long side and a short side of a rectangular laser-emitting region of the laser are parallel to long side(s) and short side(s) of rectangular laser-receiving region(s) of the phase retarder(s) respectively.

Due to high energy of the laser beam, performances of the optical lenses (such as the lenses and the prisms) will vary with the temperature during a working process. For example, internal stresses of the optical lenses are formed during a manufacturing process. The internal stresses are released with a temperature change, and a stress birefringence may be formed. This kind of stress birefringence may cause different phase retardations for laser beams with different wavelengths, which may be regarded as secondary phase retardations. Therefore, in an actual laser path, a phase change of a laser beam is based on a superimposed effect of the half-wave plate and the stress birefringence of the optical lenses, and an amount of retardations inherent to the optical lenses may vary according to designs of the system. In a case where the above embodiments are applied, the secondary phase retardations to an actual system may be corrected to approach or reach a theoretical value of a 90-degree change of the polarization direction of the laser beam.

Figure 11D:
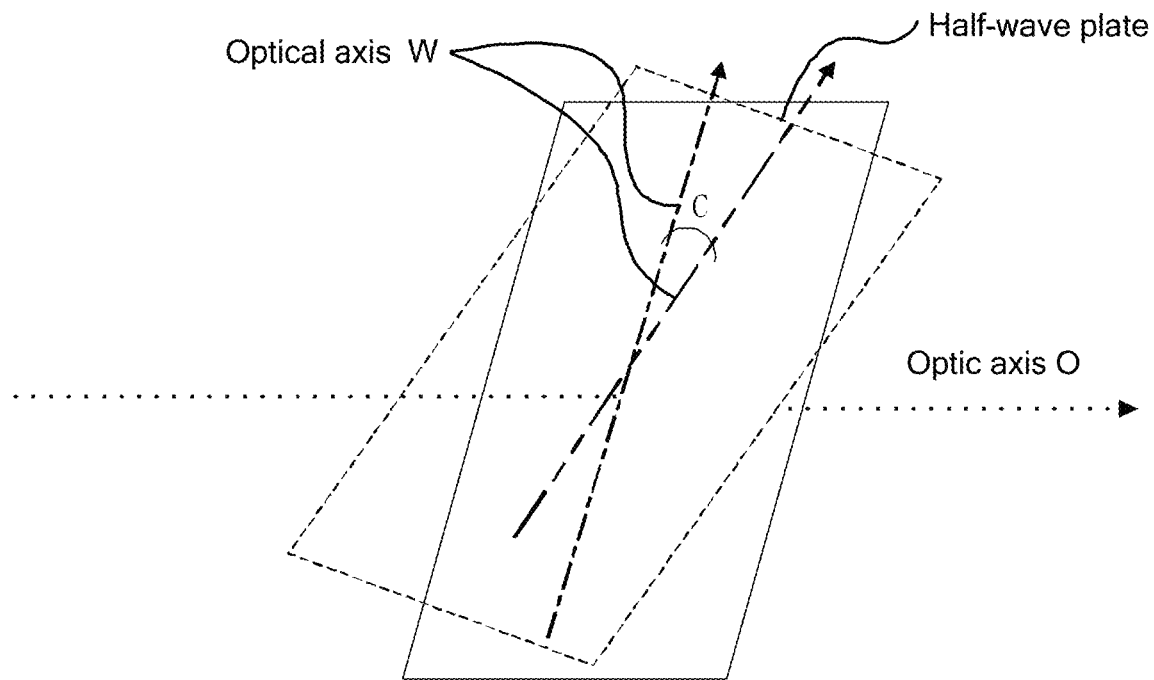
FIG. 11D is a schematic diagram showing a rotation of a half-wave plate, in accordance with some embodiments of the present disclosure.

Each half-wave plate has an optical axis in a plane where the half-wave plate is located. As shown in FIG. 11A, the optical axis W of the half-wave plate is perpendicular to the optical axis O of the system. The optical axis of the half-wave plate is parallel to a long side or a short side of the half-wave plate. In a case where the above solution is applied, as shown in FIG. 11D, the half-wave plate is configured such that the half-wave plate is rotated by a preset angle, for example, C degrees, in a direction of the long side or the short side of the rectangular half-wave plate, as shown by the dotted lines in FIG. 11D. After a rotation by the above degrees, the optical axis of the half-wave plate is also rotated by approximately plus or minus C degrees, and the phase change of the laser beam is approximately in a range of a difference of 180 degrees and 2 C degrees to a sum of 180 degrees and 2 C degrees (i.e., 180 degrees±2 C degrees). After a superposition with the secondary phase retardation of the optical lens of the system, the polarization direction of the laser beam is changed to approximately 90 degrees, so as to approach the theoretical design value. In the above embodiments of the present disclosure, a value of C may be 10.

In one or more of the above embodiments, as for a situation in which the laser source of the laser projection apparatus may emit the laser beams with the three primary colors and different polarization directions, by providing half-wave plate(s) in the output path of the laser beam(s) of one or two of the three colors in the laser source of the laser projection apparatus, polarization direction(s) of the laser beam(s) of one or two colors transmitted may be changed, so that the laser beam(s) of one or two colors have the same polarization direction as laser beam(s) of remaining color(s) of the three colors, and the laser beams of the three primary colors output by the laser projection apparatus have the same polarization direction. Therefore, in the process in which the laser beams emitted by the laser source of the laser projection apparatus pass through the same optical imaging system and are reflected by the projection screen into the human eyes, the transmittances of the optical system to the laser beams of the three colors are close, and the difference in the reflectivities of the projection screen to the laser beams of the three colors is reduced. The consistency of the processes of processing the laser beams of the three primary colors by the entire projection system is improved, the uneven chromaticity phenomena such as the "color spots" and the "color blocks" presented in a local region on the projected image may be fundamentally eliminated, and the display quality of the projected image is improved.

Those skilled in the art may understand that, in the above embodiments, in a case of solving a display problem of the projected image due to different polarization directions of the laser beams of the three primary colors and an apparent difference in the transmittances of the projection screen to the laser beams having different polarization directions, an example in which the red laser beam is the P-polarized laser beam, and the blue laser beam and the green laser beam are the S-polarized laser beams is taken for illustration. It is not limited to this combination of the P-polarized laser beam and the S-polarized laser beam, and those skilled in the art may make adaptive modifications according to colors and polarization directions of actual laser beams in combination with a core principle embodied in the embodiments of the present disclosure, and the above modifications shall also be within the protection scope of the present disclosure.

Finally, it will be noted that, the above embodiments are only used to illustrate the technical solutions of the present disclosure, but not to limit the same. Although the present disclosure are described in detail with reference to the foregoing embodiments, those of ordinary skill in the art will understand that the technical solutions described in the foregoing embodiments may still be modified, or some or all of the technical features may be equivalently replaced, and these modifications or replacements do not deviate essences of corresponding technical solutions from the scope of the technical solutions of the embodiments of the present disclosure.

What is claimed is:

1. A laser projection apparatus, comprising:
an apparatus housing;
a laser source system disposed in the apparatus housing, including:
a first laser assembly disposed on a first plane and configured to emit a first laser beam,
a second laser assembly disposed on a second plane perpendicular to the first plane and configured to emit a second laser beam,
a third laser assembly arranged side by side with the second laser assembly on the second plane, wherein the second laser assembly is more proximate to the first laser assembly than the third laser assembly, and the third laser assembly is configured to emit a third laser beam,
a first laser combining lens disposed at a position opposite to the third laser assembly, and configured to reflect the third laser beam,
a second laser combining lens disposed at a junction of the second laser beam and the third laser beam, and configured to transmit the second laser beam and reflect the third laser beam, and
a third laser combining lens disposed at a junction of the first laser beam and both the second laser beam and the third laser beam propagating from the second laser combining lens, the third laser combining lens configured to transmit the first laser beam and reflect the second laser beam and the third laser beam, so that the first laser beam, the second laser beam and the third laser beam are directed toward a laser outlet of the laser source system;

an optical illumination system disposed in the apparatus housing and configured to modulate laser beams emitted from the laser source system to generate a modulated beam; and a lens system disposed in the apparatus housing and configured to project the modulated beam onto a projection screen.

2. The laser projection apparatus according to claim 1, wherein:

the first laser assembly includes a red laser assembly, and the first laser beam includes a red laser beam;

the second laser assembly includes a green laser assembly, and the second laser beam includes a green laser beam; and the third laser assembly includes a blue laser assembly, and the third laser beam includes a blue laser beam.

3. The laser projection apparatus according to claim 1, wherein:

a laser reflectivity of the second laser combining lens is greater than a laser transmittance of the second laser combining lens; and a laser reflectivity of the third laser combining lens is greater than a laser transmittance of the third laser combining lens.

4. The laser projection apparatus according to claim 1, wherein:

the first laser combining lens and the second laser combining lens are parallel to each other; and the second laser combining lens and the third laser combining lens are perpendicular to each other.

5. The laser projection apparatus according to claim 1, wherein the laser source system further comprises:

a homogenizing element disposed in a laser path from the third laser combining lens to the laser outlet; and a converging lens group disposed in a laser path from the homogenizing element to the laser outlet; or a homogenizing element disposed in a laser path from the third laser combining lens to the laser outlet; a converging lens group disposed in a laser path from the homogenizing element to the laser outlet; and a diffusion wheel disposed in a laser path from the converging lens group to the laser outlet.

6. The laser projection apparatus according to claim 5, wherein the homogenizing element comprises at least one of the following:

a homogenizing diffusion sheet having micro-structures that are regularly arranged thereon; or a diffraction element.

7. The laser projection apparatus according to claim 5, wherein the converging lens group includes a combination of two convex lenses, and any one of the two convex lenses includes at least one of a plano-convex lens, a biconvex lens, or a meniscus lens.

8. The laser projection apparatus according to claim 1, wherein:

the first laser assembly includes a red laser assembly, and the first laser beam includes a red laser beam;

the second laser assembly includes a blue laser assembly, and the second laser beam includes a blue laser beam; and the third laser assembly includes a green laser assembly, and the third laser beam includes a green laser beam.

9. The laser projection apparatus according to claim 8, the laser source system further comprises at least one of the following:

a first diffusion sheet disposed in a laser path of the blue laser beam and configured to diffuse and transmit the blue laser beam, and a second diffusion sheet disposed in a laser path of the green laser beam and configured to diffuse and transmit the green laser beam; or a telescope system disposed in a laser path of the red laser beam and configured to transmit the red laser beam and shrink the red laser beam.

10. The laser projection apparatus according to claim 9, wherein the telescope system includes a convex lens and a concave lens, and the convex lens is more proximate to the red laser assembly than the concave lens.

11. The laser projection apparatus according to claim 8, the laser source system further comprises:

a third diffusion sheet disposed in a laser path from the second laser combining lens to the third laser combining lens, and the third diffusion sheet configured to diffuse and transmit the green laser beam and the blue laser beam.

12. The laser projection apparatus according to claim 8, wherein:

the blue laser beam has a same polarization direction as the green laser beam, and the red laser beam has a different polarization direction from the green laser beam; and the laser source system further comprises:

a first phase retarder disposed in a laser path of the blue laser beam and configured to change a polarization direction of the blue laser beam, and a second phase retarder disposed in a laser path of the green laser beam and configured to change a polarization direction of the green laser beam.

13. The laser projection apparatus according to claim 12, wherein:

the first phase retarder is configured to correspond to a wavelength of the blue laser beam; and the second phase retarder is configured to correspond to a wavelength of the green laser beam.

14. The laser projection apparatus according to claim 12, wherein the first phase retarder includes a first half-wave plate; and the second phase retarder includes a second half-wave plate.

15. The laser projection apparatus according to claim 8, wherein:

the blue laser beam has a same polarization direction as the green laser beam, and the red laser beam has a different polarization direction from the green laser beam; and the laser source system further includes:

a fourth phase retarder disposed in a laser path from the second laser combining lens to the third laser combining lens, and the fourth phase retarder configured to:

correspond to a wavelength of the green laser beam, or correspond to a wavelength between a wavelength of the green laser beam and a wavelength of the blue laser beam.

16. The laser projection apparatus according to claim 8, wherein:
- a luminous power of the green laser assembly is less than a luminous power of the red laser assembly and a luminous power of the blue laser assembly; and
- the luminous power of the red laser assembly is less than the luminous power of the blue laser assembly.

17. The laser projection apparatus according to claim 8, wherein:
- a luminous power of the green laser assembly is in a range of 12 W to 28 W;
- a luminous power of the red laser assembly is in a range of 24 W to 56 W; and
- a luminous power of the blue laser assembly is in a range of 48 W to 11 5W.

18. The laser projection apparatus according to claim 8, wherein:
- the blue laser beam has a same polarization direction as the green laser beam, and the red laser beam has a different polarization direction from the green laser beam;
- the laser source system further includes a third phase retarder, wherein:
  - the third phase retarder is disposed in a laser path of the red laser beam, and configured to change a polarization direction of the red laser beam, and
  - the third phase retarder comprises a third half-wave plate that is configured to correspond to a wavelength of the red laser beam.

19. The laser projection apparatus according to claim 1, wherein:
- the laser source system further comprises a laser source housing comprising a bottom wall, a top cover, and a plurality of side walls disposed between the bottom wall and the top cover;
- the first laser assembly is disposed on a first side wall of the plurality of side walls, the second laser assembly and the third laser assembly are arranged side by side on a second side wall of the plurality of side walls, and the second side wall is perpendicular to the first side wall; and
- laser beams reflected by the third laser combining lens are emitted to an outside of the laser source housing through the laser outlet of the laser source system.

20. The laser projection apparatus according to claim 19, wherein:
- the first side wall of the laser source housing comprises an opening corresponding to the first laser assembly, and the second side wall of the laser source housing includes an opening corresponding to the second laser assembly and an opening corresponding to the third laser assembly;
- the laser source system further comprises a sealing glass disposed at each of the openings; and
- each of the first laser assembly, the second laser assembly and the third laser assembly are separated from an internal cavity of the laser source housing by the sealing glass disposed at each of the openings.

* * * * *